US011333935B2

(12) United States Patent
Nakagawa

(10) Patent No.: US 11,333,935 B2
(45) Date of Patent: May 17, 2022

(54) LIQUID CRYSTAL DISPLAY PANEL

(71) Applicants: Panasonic Liquid Crystal Display Co., Ltd., Himeji (JP); Pasona Knowledge Partner Inc., Osaka (JP)

(72) Inventor: Teruhisa Nakagawa, Hyogo (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 16/777,402

(22) Filed: Jan. 30, 2020

(65) Prior Publication Data

US 2020/0271997 A1    Aug. 27, 2020

(30) Foreign Application Priority Data

Feb. 27, 2019 (JP) .............................. JP2019-033977
Feb. 27, 2019 (JP) .............................. JP2019-034631

(51) Int. Cl.
*G02F 1/1343* (2006.01)
*G02F 1/1368* (2006.01)
*G02F 1/1362* (2006.01)

(52) U.S. Cl.
CPC ...... *G02F 1/134309* (2013.01); *G02F 1/1368* (2013.01); *G02F 1/136286* (2013.01)

(58) Field of Classification Search
CPC ............. G02F 1/1368; G02F 1/136286; G02F 1/134309; G09G 3/3659; G09G 3/2011; G09G 2300/0456; G09G 2300/0809; G09G 2300/0443; G09G 2320/062
See application file for complete search history.

(56) References Cited

U.S. PATENT DOCUMENTS

| 5,745,207 A | 4/1998 | Asada et al. |
| 5,805,248 A * | 9/1998 | Sakamoto ............ G02F 1/13624 349/48 |
| 2001/0022569 A1 | 9/2001 | Ohta et al. |

(Continued)

FOREIGN PATENT DOCUMENTS

| JP | 9-105908 | 4/1997 |
| JP | 10-148826 | 6/1998 |

(Continued)

OTHER PUBLICATIONS

U.S. Appl. No. 16/781,756, filed Feb. 4, 2020.

(Continued)

*Primary Examiner* — Mariam Qureshi
(74) *Attorney, Agent, or Firm* — Hamre, Schumann, Mueller & Larson, P.C.

(57) ABSTRACT

A liquid crystal display panel having a plurality of pixels arrayed in a matrix, the liquid crystal display panel comprising: a plurality of first signal lines extending in a row direction or a column direction; a transistor provided in each of the plurality of pixels; and a pixel electrode provided in each of the plurality of pixels and connected to the first signal line corresponding to the pixel via the transistor corresponding to the pixel, wherein, in each of the plurality of pixels, the pixel electrode includes a first pixel electrode and a second pixel electrode that are separated across the first signal line corresponding to the pixel.

13 Claims, 30 Drawing Sheets

(56) References Cited

U.S. PATENT DOCUMENTS

| | | | |
|---|---|---|---|
| 2008/0117156 A1* | 5/2008 | Chen | G09G 3/3659 |
| | | | 345/92 |
| 2009/0128727 A1 | 5/2009 | Tata | |
| 2009/0256158 A1 | 10/2009 | Xue | |
| 2009/0262274 A1 | 10/2009 | Noda et al. | |
| 2014/0125899 A1 | 5/2014 | Kim et al. | |
| 2016/0026048 A1 | 1/2016 | Liu et al. | |
| 2016/0170276 A1* | 6/2016 | Okita | G02F 1/136286 |
| | | | 349/43 |
| 2017/0285380 A1 | 10/2017 | Zhou | |
| 2017/0371212 A1 | 12/2017 | Du | |
| 2018/0373105 A1* | 12/2018 | Zhang | H01L 27/124 |
| 2019/0056609 A1 | 2/2019 | Kim | |
| 2019/0108811 A1* | 4/2019 | Kim | G02F 1/136286 |
| 2019/0296048 A1* | 9/2019 | Lee | H01L 27/124 |

FOREIGN PATENT DOCUMENTS

| | | |
|---|---|---|
| JP | 2009-128466 | 6/2009 |
| JP | 2009-258729 | 11/2009 |
| JP | 2011-191791 | 9/2011 |

OTHER PUBLICATIONS

Office Action for the related U.S. Appl. No. 16/781,756, filed Jul. 10, 2020, 18 pages.
Final Office Action for the related U.S. Appl. No. 16/781,756, filed Dec. 7, 2020, 18 pages.
Notice of Allowance for the related U.S. Appl. No. 16/781,756, filed May 20, 2021, 18 pages.

* cited by examiner column direction
row direction 40  20  50

LIQUID CRYSTAL DISPLAY PANEL

CROSS-REFERENCE TO RELATED APPLICATION

This application claims priority from Japanese application JP 2019-034631, filed Feb. 27, 2019 and Japanese application JP 2019-033977, filed Feb. 27, 2019. These Japanese applications are incorporated herein by reference.

BACKGROUND

1. Technical Field

The present disclosure relates to a liquid crystal display panel.

2. Description of the Related Art

An active matrix liquid crystal display panel includes a thin film transistor (TFT) substrate in which a pixel electrode and a TFT are formed for each pixel, a counter substrate facing the TFT substrate, and a liquid crystal layer disposed between the TFT substrate and the counter substrate.

SUMMARY

In a liquid crystal display panel, it is desired to form electrodes, wirings, and the like so that the aperture ratio of the pixel does not decrease.

An object of the present disclosure is to provide a liquid crystal display panel which can suppress a decrease in aperture ratio.

A liquid crystal display device having a plurality of pixels arrayed in a matrix, the liquid crystal display panel according to a present disclosure comprises: a plurality of first signal lines extending in a row direction or a column direction; a transistor provided in each of the plurality of pixels; and a pixel electrode provided in each of the plurality of pixels and connected to the first signal line corresponding to the pixel via the transistor corresponding to the pixel, wherein, in each of the plurality of pixels, the pixel electrode includes a first pixel electrode and a second pixel electrode that are separated across the first signal line corresponding to the pixel.

The liquid crystal display device according to the present disclosure can suppress a decrease in aperture ratio.

Figure 1:
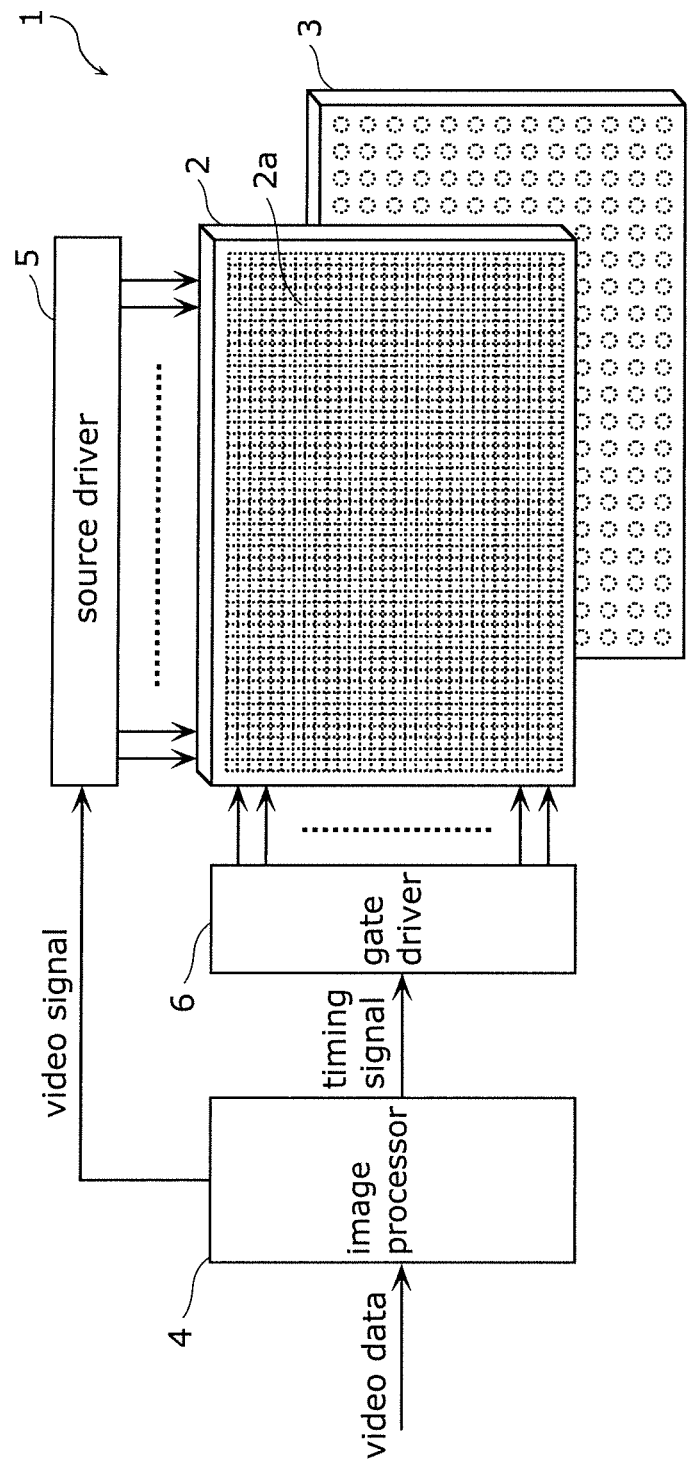
FIG. 1 is a diagram schematically showing the schematic configuration of liquid crystal display device according to the first exemplary embodiment.

Hereinafter, exemplary embodiments of the present disclosure will be described. The following exemplary embodiments illustrate a preferable specific example of the present disclosure. Thus, numerical values, shapes, materials, constituent elements, arrangement positions and connection forms of the constituent components, and the like illustrated in the following exemplary embodiments are merely examples, and are not intended to limit the present disclosure. Among the constituent elements in the following exemplary embodiments, the constituent elements not described in independent claims indicating the broadest concept of the present disclosure are described as optional constituent elements.

It should be noted that each of the diagrams is schematic, and is not necessarily strictly accurate. Accordingly, the scales and the like do not necessarily match in each drawing. In each figure, substantially the same constituent elements are denoted by the same reference numeral, and redundant description will be omitted or simplified.

[First Mode of the Present Disclosure]

First, prior to describing specific exemplary embodiments of a first mode of the present disclosure, the background of achieving the first mode of the present disclosure will be described below.

A transverse electric field mode liquid crystal display panel having wide viewing angle characteristics is known. A mode for driving liquid crystal of a transverse electric field mode liquid crystal display panel includes, for example, an in-plane switching (IPS) mode and a fringe field switching (FFS) mode. In a transverse electric field mode liquid crystal display panel, each pixel includes a comb-shaped pixel electrode and a comb-shaped common electrode.

Transverse electric field mode liquid crystal display panels employing a multi-domain mode have also been proposed in order to improve color viewing angle characteristics. Liquid crystal display panels of an intra-pixel multi-domain (one-pixel multi-domain) type in which a plurality of domains is included in one pixel and liquid crystal display panels of a pixel-basis multi-domain (two-pixel multi-domain) type in which each of two pixels includes one domain are known as transverse electric field mode liquid crystal display panels employing a multi-domain mode.

For example, Unexamined Japanese Patent Publication No. H10-148826 discloses a transverse electric field mode liquid crystal display panel of an intra-pixel multi-domain type. Unexamined Japanese Patent Publication No. H09-105908 discloses a transverse electric field mode liquid crystal display panel of a pixel-basis multi-domain type.

Although the transverse electric field mode liquid crystal display panel of an intra-pixel multi-domain type can provide excellent color viewing angle characteristics and wide viewing angle characteristics, an aperture ratio unfortunately decreases.

On the other hand, the transverse electric field mode liquid crystal display panel of a pixel-basis multi-domain type can suppress a decrease in aperture ratio, as compared to the transverse electric field mode liquid crystal display panel of an intra-pixel multi-domain type which can provide excellent color viewing angle characteristics, whereas viewing angle characteristics deteriorate.

One aspect of the first mode of the present disclosure has been made to solve such a problem, and aims to provide a liquid crystal display panel capable of suppressing a decrease in aperture ratio even when an intra-pixel multi-domain mode is employed.

In order to achieve the above object, a liquid crystal display panel according to one aspect of the first mode of the present disclosure is a liquid crystal display panel having a plurality of pixels arrayed in a matrix, the liquid crystal display panel including: a plurality of first signal lines extending in a row direction or a column direction; a transistor provided in each of the plurality of pixels; and a pixel electrode provided in each of the plurality of pixels and connected to the first signal line corresponding to the pixel via the transistor corresponding to the pixel, wherein, in each of the plurality of pixels, the pixel electrode includes a first pixel electrode and a second pixel electrode that are separated across the first signal line corresponding to the pixel, and a bridge electrode that extends over the first signal line and connects the first pixel electrode and the second pixel electrode, the first pixel electrode includes a plurality of first line electrodes extending in a first direction in a stripe pattern, and the second pixel electrode includes a plurality of second line electrodes extending in a stripe pattern in a second direction different from the first direction.

According to the first mode of the present disclosure, a decrease in aperture ratio can be suppressed even in a liquid crystal display panel of an intra-pixel multi-domain type.

Hereinafter, first to third exemplary embodiments will be described as specific examples of the first mode of the present disclosure.

FIRST EXEMPLARY EMBODIMENT

Figure 2:
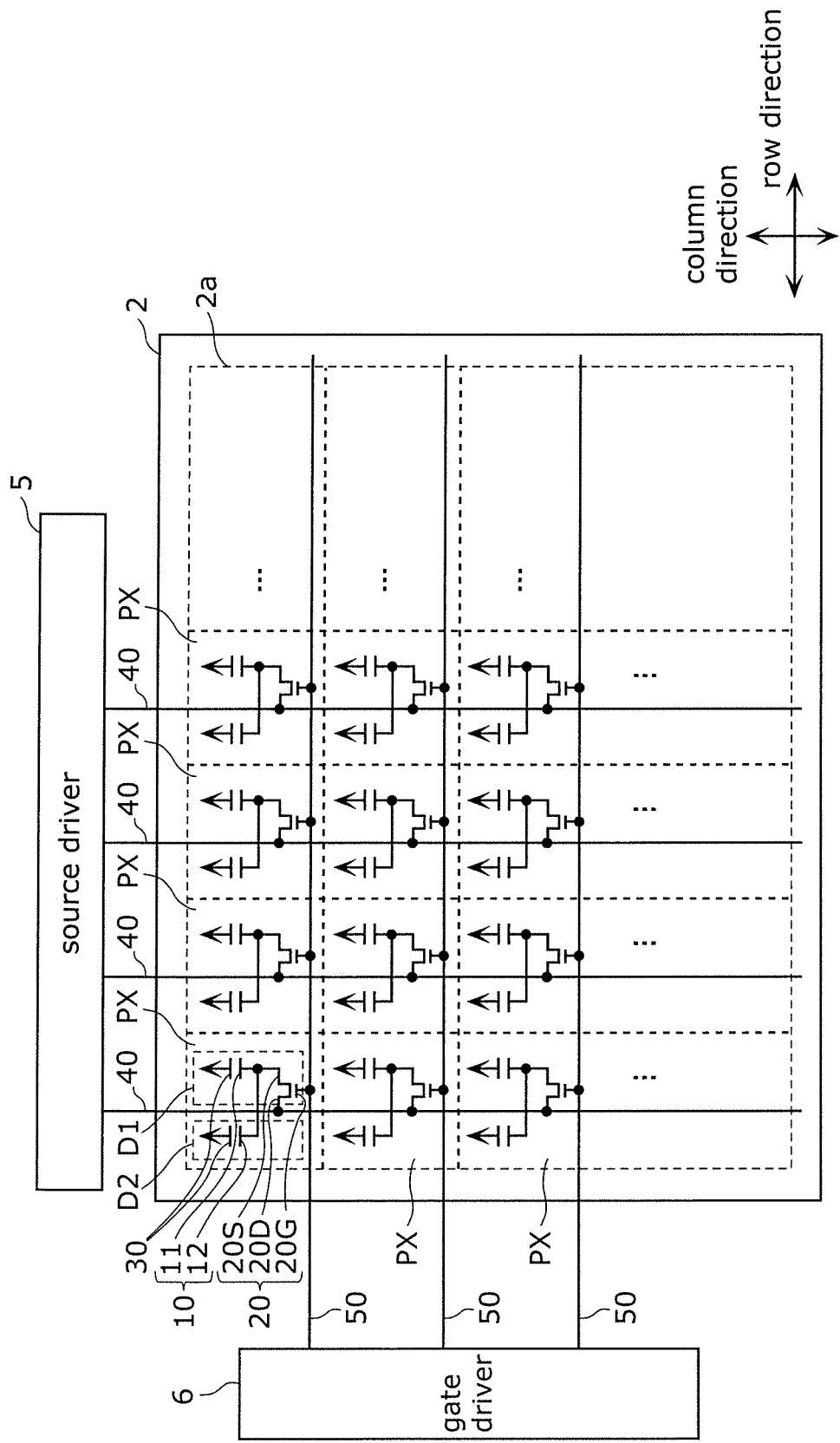
FIG. 2 is a diagram showing a pixel circuit of liquid crystal display panel according to the first exemplary embodiment.

First, a schematic configuration of liquid crystal display device 1 according to the first exemplary embodiment including liquid crystal display panel 2 will be described with reference to FIGS. 1 and 2. FIG. 1 is a diagram schematically showing the schematic configuration of liquid crystal display device 1 according to the first exemplary embodiment. FIG. 2 is a diagram showing a pixel circuit of liquid crystal display panel 2 according to the first exemplary embodiment.

Liquid crystal display device 1 is an example of an image display device, and displays a still image or a moving image (video image). As shown in FIG. 1, liquid crystal display device 1 includes liquid crystal display panel 2, backlight 3, and image processor 4.

Liquid crystal display panel 2 is disposed on the light emission side of backlight 3. Liquid crystal display panel 2 has image display region (active region) 2a in which an image is displayed. The mode for driving liquid crystal of liquid crystal display panel 2 is a transverse electric field mode such as IPS or FFS. Further, liquid crystal display panel 2 uses, for example, a normally black mode to control voltage, but the method for controlling voltage is not limited to the normally black mode.

As shown in FIGS. 1 and 2, liquid crystal display panel 2 has a plurality of pixels PX arrayed in a matrix. Image display region 2a is composed of a plurality of pixels PX.

As shown in FIG. 2, liquid crystal display panel 2 includes pixel electrodes 10 and transistors 20 respectively provided in the plurality of pixels PX, and common electrode 30 facing pixel electrodes 10. Liquid crystal display panel 2 also includes video signal lines (data lines) 40 that are a plurality of first signal lines extending in the column direction and scanning lines (gate lines) 50 that are a plurality of second signal lines extending in the row direction orthogonal to the column direction.

In each of the plurality of pixels PX, pixel electrode 10 is connected to video signal line 40 and scanning line 50 corresponding to pixel PX via transistor 20 corresponding to pixel PX.

Liquid crystal display panel 2 in the present exemplary embodiment is of an intra-pixel multi-domain type, and has a plurality of domains in one pixel PX. Specifically, each of the plurality of pixels PX has first domain D1 and second domain D2 that are separated in the row direction across video signal line 40 corresponding to pixel PX. That is, each pixel PX is divided into first domain D1 and second domain D2 across video signal line 40.

Pixel electrode 10 includes first pixel electrode 11 provided in first domain D1 and second pixel electrode 12 provided in second domain D2. That is, pixel electrode 10 is divided into first pixel electrode 11 and second pixel electrode 12 across video signal line 40. First pixel electrode 11 and second pixel electrode 12 that are separated in the row direction across video signal line 40 are connected by bridge electrode 13.

Transistors 20 of the respective pixels PX are arrayed along the direction in which scanning lines 50 extend. Specifically, each transistor 20 is provided at a position overlapping scanning line 50 in a planar view.

Transistor 20 is a thin film transistor and includes gate electrode 20G, source electrode 20S, and drain electrode 20D. Note that, in this specification, source electrode 20S and drain electrode 20D may be collectively referred to as a source/drain electrode, and the source/drain electrode refers to at least one of source electrode 20S and drain electrode 20D, either of source electrode 20S or drain electrode 20D, or both source electrode 20S and drain electrode 20D. In the present exemplary embodiment, each pixel PX has one transistor 20.

Similar to pixel electrode 10, common electrode 30 may be provided in each of the plurality of pixels PX, or may be provided to extend through the plurality of pixels PX. In the present exemplary embodiment, common electrode 30 is provided to extend through all pixels PX in image display region 2a. For example, common electrode 30 is a single planar electrode common to all pixels PX, and is formed over entire image display region 2a.

The plurality of video signal lines 40 is respectively connected to the source/drain electrodes of the transistors 20 of the plurality of pixels PX arrayed in the column direction. In the present exemplary embodiment, each video signal line 40 is connected to drain electrode 20D out of source electrode 20S and drain electrode 20D of each transistor 20. That is, in the present exemplary embodiment, video signal lines 40 are drain lines.

The plurality of scanning lines 50 is respectively connected to transistors 20 of the plurality of pixels PX arrayed in the row direction. Specifically, each scanning line 50 is connected to gate electrode 20G of each transistor 20.

As shown in FIG. 1, liquid crystal display panel 2 includes source driver 5 and gate driver 6 as a liquid crystal display panel drive circuit in order to display an image corresponding to an input video signal. Source driver 5 and gate driver 6 are driver ICs (IC packages), for example, and are mounted on a flexible wiring board such as a flexible flat cable (FFC) or a flexible printed circuit (FPC). For example, the flexible wiring board on which source driver 5 and gate driver 6 are mounted by chip on film (COF) is connected to an electrode terminal of liquid crystal display panel 2 by thermocompression using an anisotropic conductive film (ACF).

As shown in FIG. 2, source driver 5 is connected to video signal lines 40 of liquid crystal display panel 2. Source driver 5 supplies a voltage (data voltage) corresponding to the video signal input from image processor 4 to video signal lines 40 in accordance with the selection of scanning line 50 by gate driver 6.

Gate driver 6 is connected to scanning lines 50. Gate driver 6 selects pixel PX into which a video signal is written in accordance with a timing signal input from image processor 4, and supplies a voltage (gate-on voltage) that turns on transistor 20 of selected pixel PX to scanning line 50. As a result, the data voltage is supplied to pixel electrode 10 of selected pixel PX via transistor 20. Common electrode 30 is supplied with a common voltage from a common driver (not illustrated).

Thus, when the gate-on voltage is supplied from gate driver 6 to scanning line 50, transistor 20 of selected pixel PX is turned on, and the data voltage is supplied from video signal line 40 connected to transistor 20 to pixel electrode 10. An electric field is generated in a liquid crystal layer due to the difference between the data voltage supplied to pixel electrode 10 and the common voltage supplied to common electrode 30. This electric field changes the alignment state of the liquid crystal molecules in the liquid crystal layer in each pixel PX, and the transmittance of light which comes from backlight 3 and passes through liquid crystal display panel 2 is controlled for each pixel PX. As a result, a desired image is displayed in image display region 2a of liquid crystal display panel 2.

As shown in FIG. 1, backlight 3 is disposed on the back surface side of liquid crystal display panel 2, and irradiates liquid crystal display panel 2 with light. In the present exemplary embodiment, backlight 3 is an LED backlight including a light emitting diode (LED) as a light source. However, backlight 3 is not limited thereto. Backlight 3 is a direct LED backlight in which LEDs are two-dimensionally arrayed on a substrate so as to face liquid crystal display panel 2. However, backlight 3 may be of an edge type. Backlight 3 is a surface emitting unit that emits planar uniform scattered light (diffused light). Note that backlight 3 may have an optical member such as a diffusion plate (diffusion sheet) in order to diffuse light from the light source.

Image processor 4 is a control device that includes a computing processing circuit such as a CPU and a memory such as a ROM and a RAM. Video data to be displayed on liquid crystal display panel 2 is input to image processor 4. In image processor 4, the CPU reads out and executes a program stored in the memory, thereby executing various processes. Specifically, image processor 4 performs various image signal processes such as color adjustment on video data input from an external system (not illustrated) to generate a video signal indicating a gradation value of each pixel PX and a timing signal indicating a timing at which the video signal is written on each pixel PX, outputs the video signal to source driver 5, and outputs the timing signal to gate driver 6.

Figure 3:
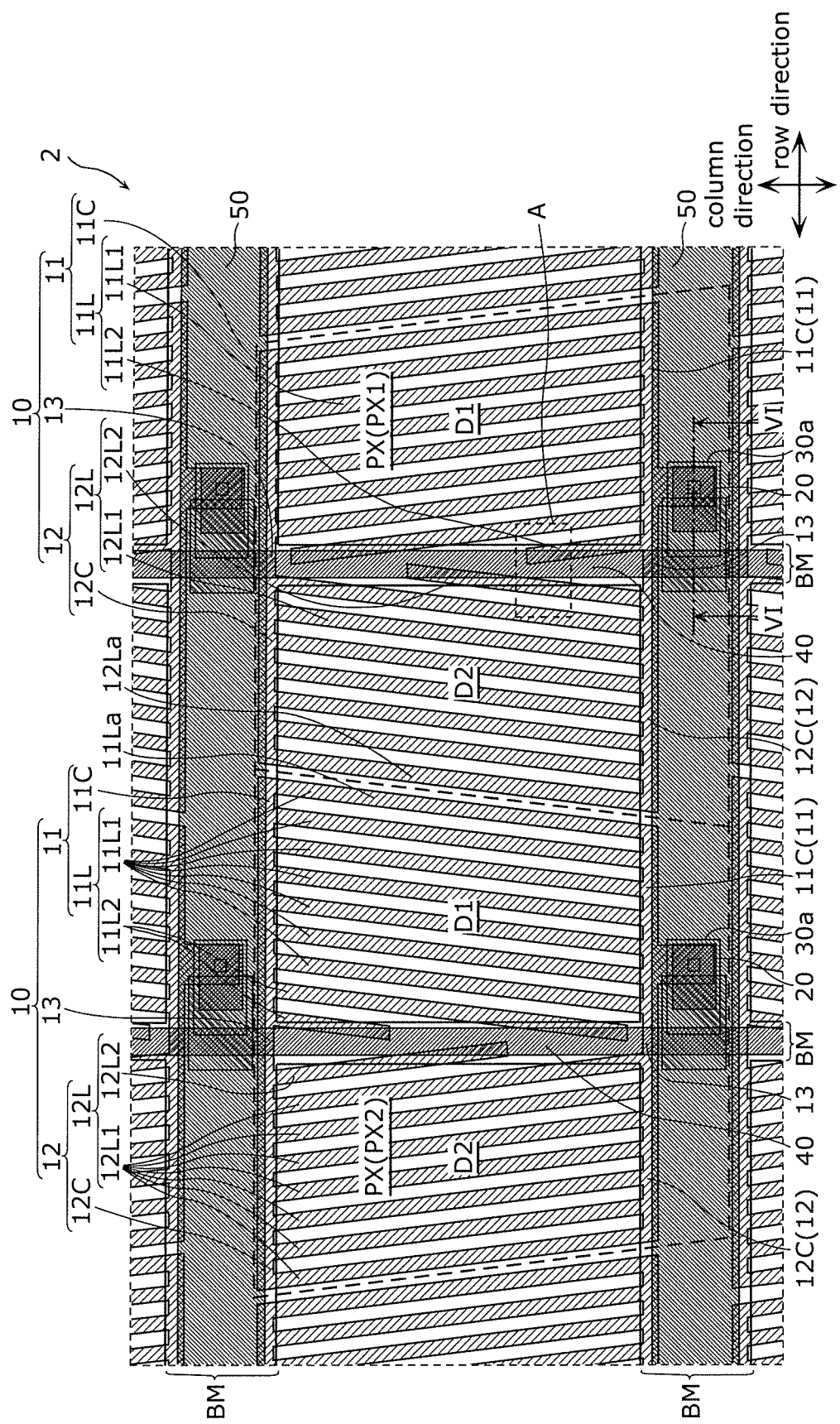
FIG. 3 is a plan view showing a layout of pixels of liquid crystal display panel according to the first exemplary embodiment.
Figure 4:
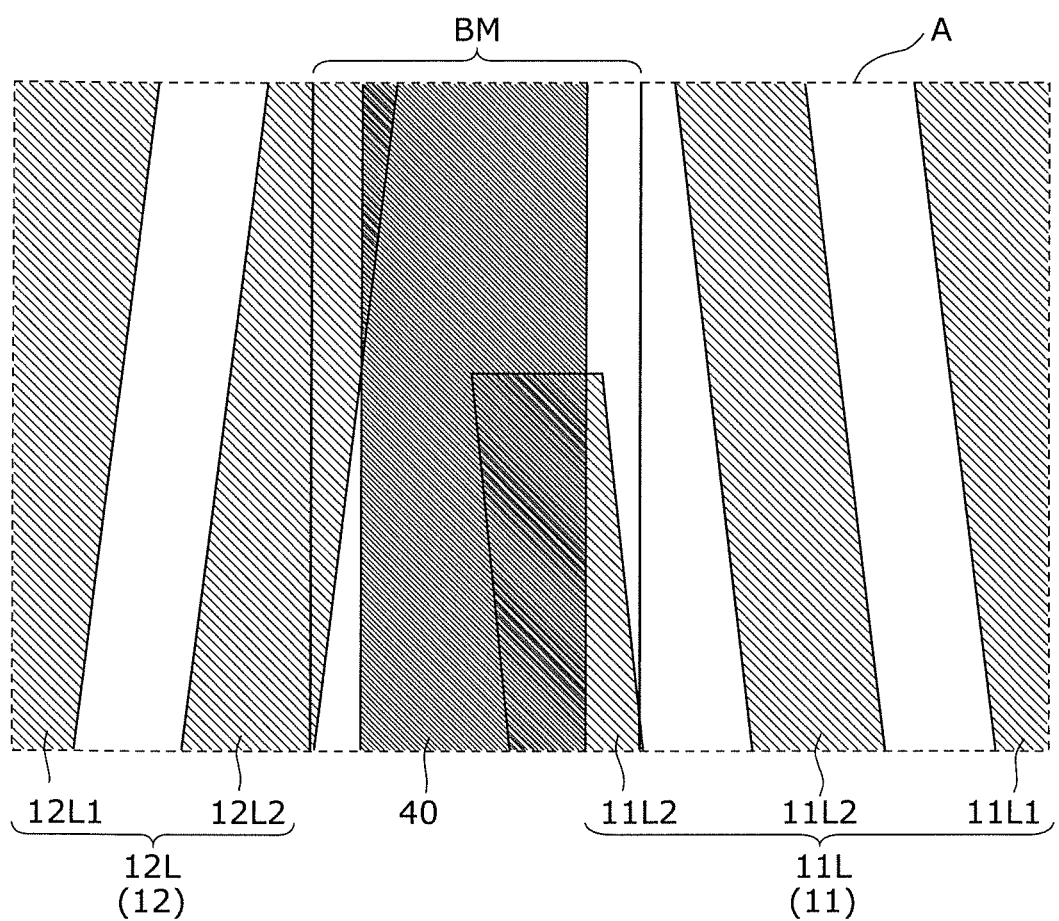
FIG. 4 is a partial enlarged view of pixels in liquid crystal display panel according to the first exemplary embodiment.

Next, a specific structure of liquid crystal display panel 2 according to the first exemplary embodiment will be described. First, the layout of pixels PX of liquid crystal display panel 2 will be described with reference to FIGS. 3 and 4 while referring to FIG. 2. FIG. 3 is a plan view showing a layout of pixels PX of liquid crystal display panel 2 according to the first exemplary embodiment. FIG. 4 is a partial enlarged view of liquid crystal display panel 2, and shows an enlarged view of region A enclosed by a dashed line in FIG. 3. In FIG. 3, one pixel PX is indicated by a region enclosed by a dashed trapezoid. When liquid crystal display panel 2 displays a color image, each of the plurality of pixels PX is any one of a red pixel, a green pixel, and a blue pixel. As an example, a red pixel, a green pixel, and a blue pixel are repeatedly arrayed in the row direction in a set of three.

As shown in FIG. 3, the video signal lines 40 extending in the column direction are each linear and formed so as to be parallel to each other. In the present exemplary embodiment, the plurality of video signal lines 40 has the same width.

Further, scanning lines 50 extending in the row direction are each linear and formed so as to be parallel to each other. In the present exemplary embodiment, the plurality of scanning lines 50 has the same width. Note that the width of one scanning line 50 is larger than the width of one video signal line 40.

Video signal lines 40 and scanning lines 50 are covered with black matrix BM. That is, video signal lines 40 and scanning lines 50 are not open at their tops.

As described above, each of the plurality of pixels PX includes first domain D1 and second domain D2 that are separated in the row direction across video signal line 40. Therefore, the boundary (domain boundary) between first domain D1 and second domain D2 overlaps black matrix BM (non-opening portion) that covers video signal lines 40.

As shown in FIG. 3, in each of the plurality of pixels PX, pixel electrode 10 includes first pixel electrode 11 and second pixel electrode 12 that are separated in the row direction across one video signal line 40 corresponding to pixel PX, and bridge electrode 13 that connects first pixel electrode 11 and second pixel electrode 12 over video signal line 40.

In each pixel PX, first pixel electrode 11 is provided in first domain D1, and second pixel electrode 12 is provided in second domain D2. First pixel electrode 11 provided in first domain D1 and second pixel electrode 12 provided in second domain D2 are connected by bridge electrode 13 that extends over video signal line 40. That is, video signal line 40 and bridge electrode 13 intersect in three dimensions.

In the present exemplary embodiment, first pixel electrode 11 and second pixel electrode 12 are connected by two bridge electrodes 13. However, the present disclosure is not limited thereto. For example, first pixel electrode 11 and second pixel electrode 12 may be connected using one bridge electrode 13, or may be connected using three or more bridge electrodes 13.

First pixel electrode 11 and second pixel electrode 12 are respectively formed with a plurality of slits, and thus, first pixel electrode 11 includes a plurality of first line electrodes 11L extending in a stripe pattern in a first direction, and second pixel electrode 12 includes a plurality of second line electrodes 12L extending in a stripe pattern in a second direction different from the first direction.

In other words, a plurality of first line electrodes 11L each have a strip shape, and are formed into a stripe pattern by forming a plurality of slits extending in the first direction in first pixel electrode 11. Similarly, a plurality of second line electrodes 12L each have a strip shape, and are formed into a stripe pattern by forming a plurality of slits extending in the second direction in second pixel electrode 12.

Further, in each pixel PX, the first direction that is an extending direction of first line electrodes 11L and the second direction that is an extending direction of second line electrodes 12L are not parallel to each other but intersect each other. In the present exemplary embodiment, the first direction that is the extending direction of first line electrodes 11L and the second direction that is the extending direction of second line electrodes 12L are inclined with respect to the row direction and the column direction.

In the present exemplary embodiment, in each pixel PX, the first direction that is the extending direction of the plurality of first line electrodes 11L and the second direction that is the extending direction of the plurality of second line electrodes 12L are line symmetric with respect to one video signal line 40 corresponding to pixel PX. That is, if the angle smaller than 90 degrees of the angles formed by the first direction and the column direction is θ, the angle smaller than 90 degrees of the angles formed by the second direction and the column direction is also θ.

The plurality of first line electrodes 11L include first ladder electrode portions 11L1 in which both ends in the longitudinal direction are connected in a ladder pattern by a pair of first connection electrodes 11C, and first finger electrode portions 11L2 in which one of both ends in the longitudinal direction is open without being connected by first connection electrode 11C. The pair of first connection electrodes 11C extends in the row direction in the vicinity of scanning lines 50.

Specifically, one ends in the longitudinal direction of first ladder electrode portions 11L1 are connected to each other by first connection electrode 11C on one side, and the other ends in the longitudinal direction are connected to each other by first connection electrode 11C on the other side.

On the other hand, one ends in the longitudinal direction of first finger electrode portions 11L2 are connected to each other by first connection electrode 11C on one side, while the other ends in the longitudinal direction are not connected to each other by first connection electrode 11C on the other side.

In the present exemplary embodiment, in the plurality of first line electrodes 11L, the number of first ladder electrode portions 11L1 is greater than the number of first finger electrode portions 11L2. First finger electrode portions 11L2 are first line electrodes 11L located on the video signal line 40 side from among the plurality of first line electrodes 11L. That is, first finger electrode portions 11L2 are first line electrodes 11L which extend over video signal line 40 when first line electrodes 11L extend from first connection electrode 11C on one side to first connection electrode 11C on the other side.

Similarly, the plurality of second line electrodes 12L include second ladder electrode portions 12L1 in which both ends in the longitudinal direction are connected in a ladder pattern by a pair of second connection electrodes 12C, and second finger electrode portions 12L2 in which one of both ends in the longitudinal direction is open without being connected by second connection electrode 12C. The pair of second connection electrodes 12C extends in the row direction in the vicinity of scanning lines 50.

Specifically, one ends in the longitudinal direction of second ladder electrode portions 12L1 are connected to each other by second connection electrode 12C on one side, and the other ends in the longitudinal direction are connected to each other by second connection electrode 12C on the other side.

On the other hand, one ends in the longitudinal direction of second finger electrode portions 12L2 are connected to each other by second connection electrode 12C on one side, while the other ends in the longitudinal direction are not connected to each other by second connection electrode 12C on the other side.

In the present exemplary embodiment, in the plurality of second line electrodes 12L, the number of second ladder electrode portions 12L1 is greater than the number of second finger electrode portions 12L2. Second finger electrode portions 12L2 are second line electrodes 12L located on the video signal line 40 side from among the plurality of second line electrodes 12L. That is, second finger electrode portions 12L2 are second line electrodes 12L which extend over video signal line 40 when second line electrodes 12L extend from second connection electrode 12C on one side to second connection electrode 12C on the other side.

In each of the plurality of pixels PX, the tip of at least one of the plurality of first line electrodes 11L from among the plurality of first line electrodes 11L and the tip of at least one of the plurality of second line electrodes 12L from among the plurality of second line electrodes 12L overlap video signal line 40 corresponding to pixel PX, when viewed in a planar view.

Specifically, as shown in FIGS. 3 and 4, the tip of first finger electrode portion 11L2 of the plurality of first line electrodes 11L overlaps video signal line 40 located on the boundary between first pixel electrode 11 and second pixel electrode 12. That is, the tip of first finger electrode portion 11L2 is located at the boundary (domain boundary) between first domain D1 and second domain D2, and thus, overlaps black matrix BM (non-opening portion) covering video signal line 40.

Similarly, the tip of second finger electrode portion 12L2 of the plurality of second line electrodes 12L overlaps video signal line 40 located on the boundary between first pixel electrode 11 and second pixel electrode 12. That is, the tip of second finger electrode portion 12L2 is located at the boundary (domain boundary) between first domain D1 and second domain D2, and thus, overlaps black matrix BM (non-opening portion) covering video signal line 40.

Figure 5:
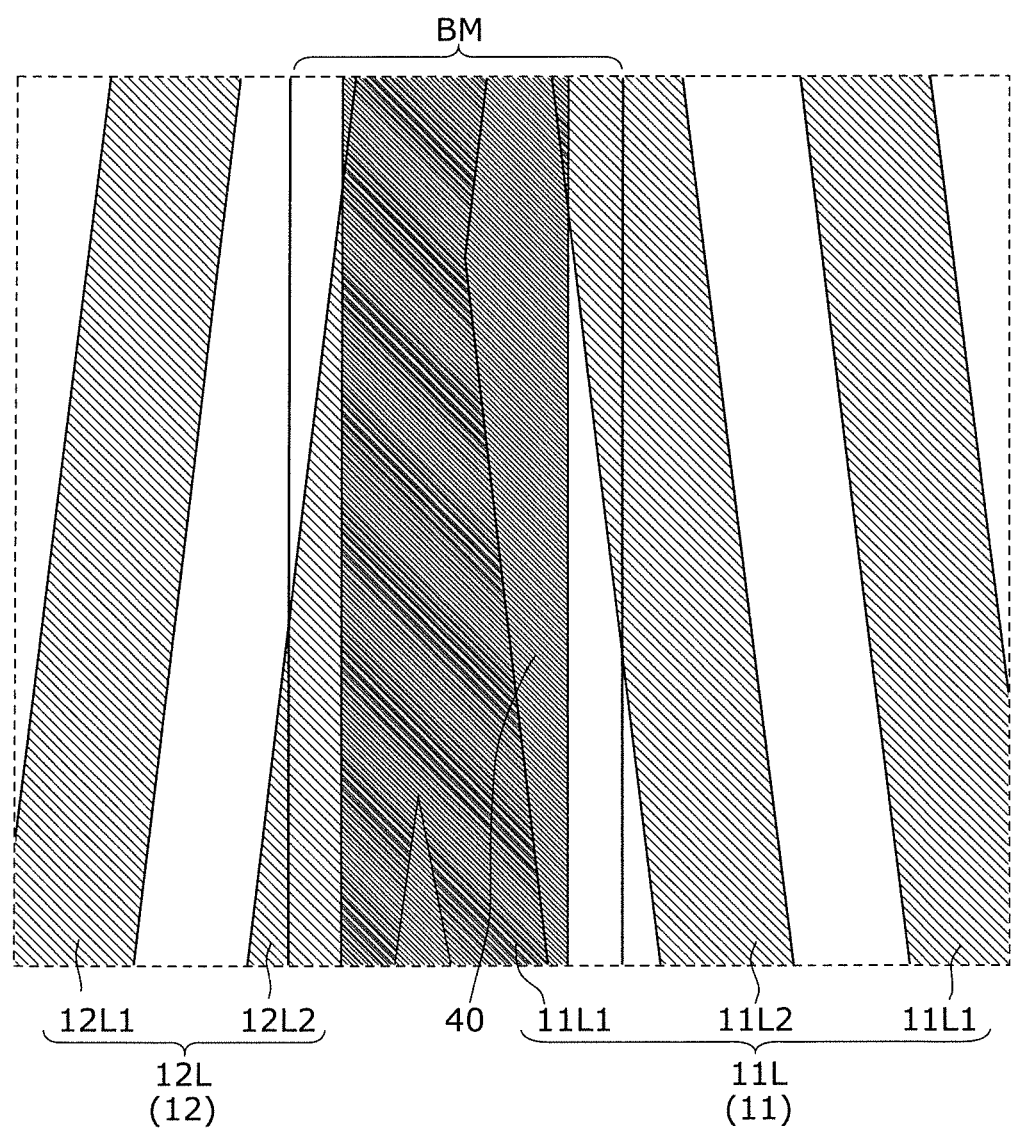
FIG. 5 is a partial enlarged view of another example of pixels in liquid crystal display panel according to the first exemplary embodiment.

In the present exemplary embodiment, first line electrode 11L of first pixel electrode 11 and second line electrode 12L of second pixel electrode 12 in each pixel PX are not connected to each other at a position overlapping video signal line 40 as shown in FIG. 4. However, the present disclosure is not limited thereto. For example, first line electrode 11L of first pixel electrode 11 and second line electrode 12L of second pixel electrode 12 in each pixel PX may be connected to each other at a position overlapping video signal line 40 as shown in FIG. 5. For example, first finger electrode portion 11L2 of first pixel electrode 11 and second finger electrode portion 12L2 of second pixel electrode 12 may be connected to each other.

In the present exemplary embodiment, in each pixel PX, all of first line electrodes 11L in first pixel electrode 11 are linearly formed with the same width, and are parallel to each other, as shown in FIG. 3. In first pixel electrode 11, the distance (slit width) between two adjacent first line electrodes 11L is constant. That is, all of first line electrodes 11L have the same pitch.

Similarly, in each pixel PX, all of second line electrodes 12L in second pixel electrode 12 are linearly formed with the same width, and are parallel to each other. In second pixel electrode 12, the distance (slit width) between two adjacent second line electrodes 12L is constant. That is, all of second line electrodes 12L have the same pitch.

In each pixel PX, first line electrodes 11L in first pixel electrode 11 and second line electrodes 12L in second pixel electrode 12 have the same width, and the pitch of first line electrodes 11L and the pitch of second line electrodes 12L are the same.

As shown in FIG. 3, when one pixel PX (right pixel in FIG. 3) of two pixels PX adjacent to each other in the row direction is defined as first pixel PX1, and the other pixel PX (left pixel in FIG. 3) of two pixels PX adjacent to each other in the row direction is defined as second pixel PX2, second pixel electrode 12 of first pixel PX1 and first pixel electrode 11 of second pixel PX2 are located between two adjacent video signal lines 40. That is, the plurality of second line electrodes 12L of first pixel PX1 and the plurality of first line electrodes 11L of second pixel PX2 are provided between two adjacent video signal lines 40.

In this case, second end electrode 12La located closest to first line electrodes 11L of second pixel PX2 from among the plurality of second line electrodes 12L in first pixel PX1 and first end electrode 11La located closest to second line electrodes 12L of first pixel PX1 from among the plurality of first line electrodes 11L in second pixel PX2 are adjacent to each other.

In the present exemplary embodiment, in first pixel PX1 and second pixel PX2 that are adjacent to each other in the row direction, the second direction that is the extending direction of the plurality of second line electrodes 12L in first pixel PX1 and the first direction that is the extending direction of the plurality of first line electrodes 11L in second pixel PX2 are the same. That is, in first pixel PX1 and second pixel PX2 that are adjacent to each other in the row direction, the plurality of second line electrodes 12L in first pixel PX1 and the plurality of first line electrodes 11L in second pixel PX2 are parallel to each other. Therefore, the plurality of first line electrodes 11L and the plurality of second line electrodes 12L which exist between two adjacent video signal lines 40 and which are pixel electrodes in different pixels PX are formed as a continuous pixel electrode extending in the same direction.

Note that, in two pixels which are first pixel PX1 and second pixel PX2 adjacent to each other in the row direction, the first direction that is the extending direction of the plurality of first line electrodes 11L in first pixel PX1 and the second direction that is the extending direction of the plurality of second line electrodes 12L in second pixel PX2 are also the same.

Figure 6:
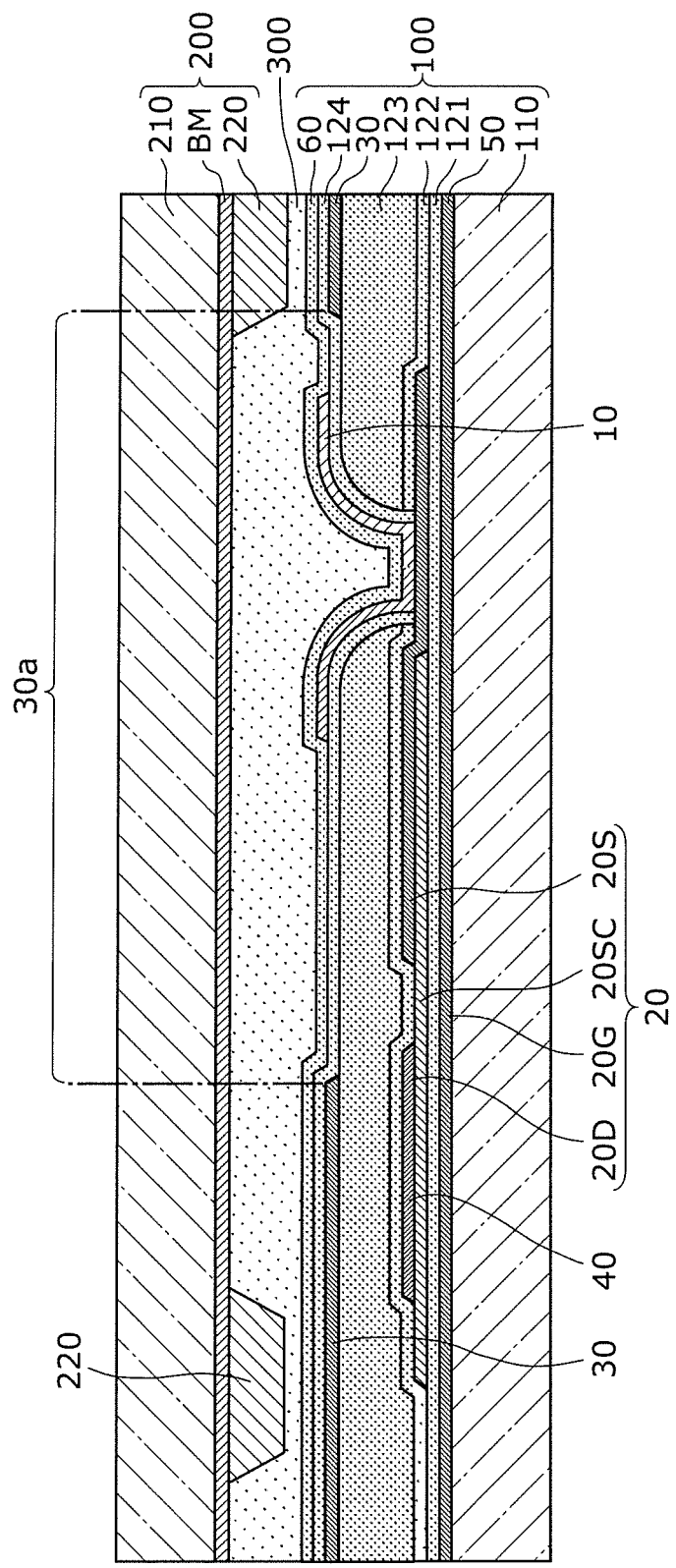
FIG. 6 is a sectional view of liquid crystal display panel according to the first exemplary embodiment.

Next, the cross-sectional structure of liquid crystal display panel 2 will be described with reference to FIG. 6 while referring to FIGS. 2 and 3. FIG. 6 is a sectional view of liquid crystal display panel 2 taken along line VI-VI in FIG. 3.

As shown in FIG. 6, liquid crystal display panel 2 includes first substrate 100, second substrate 200 facing first substrate 100, and liquid crystal layer 300 disposed between first substrate 100 and second substrate 200. Although not shown, liquid crystal layer 300 is sealed between first substrate 100 and second substrate 200 by a frame-shaped sealing member.

First substrate 100 is a TFT substrate having TFTs as transistors 20. Specifically, first substrate 100 is an active matrix substrate in which a plurality of transistors 20 is arranged in a matrix. First substrate 100 includes not only transistors 20 but also various wirings such as video signal lines 40 and scanning lines 50, an interlayer insulating film that insulates these wirings from each other, pixel electrodes 10, common electrode 30, alignment film 60, etc. These components are formed on first transparent base 110. First transparent base 110 is a transparent substrate such as a glass substrate, for example.

Each of transistors 20 formed on first transparent base 110 includes gate electrode 20G, source electrode 20S, drain electrode 20D, and semiconductor layer 20SC serving as a channel layer. In the present exemplary embodiment, transistor 20 is a TFT having a bottom gate structure, and includes gate electrode 20G formed on first transparent base 110, first insulating film 121 formed on gate electrode 20G and serving as a gate insulator, and semiconductor layer 20SC formed above gate electrode 20G with first insulating film 121 interposed therebetween. Source electrode 20S and drain electrode 20D are formed on semiconductor layer 20SC.

For example, gate electrode 20G may be formed of a metal film having a two-layer structure of a molybdenum film and a copper film, or may be formed of a single-layer metal film made of a copper film or the like. First insulating film 121 may be formed of, for example, an insulating film having a two-layer structure of a silicon oxide film and a silicon nitride film, or may be formed of a single-layer insulating film made of a silicon oxide film or a silicon nitride film. Semiconductor layer 20SC may be formed of, for example, a semiconductor film having a two-layer structure of an i-amorphous silicon film and an n-amorphous silicon film, or may be formed of a single-layer semiconductor film. Source electrode 20S and drain electrode 20D may be formed of, for example, a metal film having a two-layer structure of a molybdenum film and a copper film, or may be formed of a single-layer metal film made of a copper film or the like.

Note that the materials of gate electrode 20G, source electrode 20S, drain electrode 20D, semiconductor layer 20SC, and first insulating film 121 are not limited to the materials described above. For example, as a material of semiconductor layer 20SC, an In—Ga—Zn—O oxide semiconductor may be used.

As shown in FIG. 6, video signal lines 40 and scanning lines 50 are formed on first substrate 100. Video signal line 40 is formed in the same metal layer as source electrode 20S and drain electrode 20D. That is, video signal line 40, source electrode 20S, and drain electrode 20D are formed by patterning the same metal film. On the other hand, scanning line 50 is formed in the same metal layer as gate electrode 20G. That is, scanning line 50 and gate electrode 20G are formed by patterning the same metal film.

As shown in FIG. 6, in the present exemplary embodiment, source electrode 20S of transistor 20 is connected to pixel electrode 10 through a contact hole. Specifically, source electrode 20S is connected to first pixel electrode 11 of pixel electrode 10. Drain electrode 20D of transistor 20 is connected to video signal line 40.

Second insulating film 122 is formed on first transparent base 110 so as to cover transistors 20, video signal lines 40, and scanning lines 50. Second insulating film 122 is formed of, for example, an inorganic insulating film made of an inorganic material such as a silicon nitride film. Second insulating film 122 which is an inorganic insulating film can be formed by, for example, a chemical vapor deposition (CVD) method.

Further, third insulating film 123 is formed so as to cover second insulating film 122. In the present exemplary embodiment, the thickness of third insulating film 123 is greater than the thickness of second insulating film 122. Specifically, the thickness of third insulating film 123 is four times or more the thickness of second insulating film 122, and is 3000 nm, for example. Thus, the distance in the thickness direction between the wirings such as video signal line 40 and scanning line 50 and common electrode 30 can be increased, so that the parasitic capacitance formed by the wirings such as video signal line 40 and scanning line 50 and common electrode 30 can be reduced. In addition, when the thickness of third insulating film 123 is increased, unevenness of the TFT layer caused by forming transistors 20, video signal lines 40, and scanning lines 50 is reduced, whereby the TFT layer can be flattened. As a result, third insulating film 123 having a flattened surface can be formed, so that common electrode 30 immediately above third insulating film 123 can be formed in a flat planar shape.

In the present exemplary embodiment, third insulating film 123 is composed of an organic insulating film made of an organic material containing carbon. Third insulating film 123, which is an organic insulating film, can be formed, for example, by applying and curing a liquid organic material. Thus, third insulating film 123 can be easily thickened, and the surface of third insulating film 123 can be easily flattened throughout all pixels PX. That is, third insulating film 123 functions as a flattened layer.

Further, pixel electrode 10 and common electrode 30 are formed on first substrate 100. Specifically, pixel electrode 10 and common electrode 30 are laminated, while facing each other, with fourth insulating film 124 interposed therebetween.

In the present exemplary embodiment, common electrode 30 is formed on third insulating film 123. Fourth insulating film 124 is formed so as to cover common electrode 30, and pixel electrode 10 is formed on fourth insulating film 124. Specifically, first pixel electrode 11 and second pixel electrode 12 are formed on fourth insulating film 124 in a predetermined shape as pixel electrode 10. At this time, bridge electrode 13 is also formed together with first pixel electrode 11 and second pixel electrode 12. That is, first pixel electrode 11, second pixel electrode 12, and bridge electrode 13 are formed in the same layer, and are formed by patterning the same conductive film.

Pixel electrode 10 and common electrode 30 are transparent electrodes made of a transparent metal oxide such as indium tin oxide (ITO). Fourth insulating film 124 is made of an inorganic insulating film such as a silicon nitride film, for example. Fourth insulating film 124 that is an inorganic insulating film can be formed by, for example, a CVD method.

As described above, common electrode 30 is a planar solid electrode formed over all pixels PX. Accordingly, the wirings such as video signal lines 40 and scanning lines 50 are covered by common electrode 30, so that the electric field generated by the wirings such as video signal lines 40 and scanning lines 50 can be shielded by common electrode 30. That is, the electric field generated in the TFT layer can be shielded by common electrode 30. Accordingly, the degree of freedom in designing the shape and size of pixel electrode 10 formed on common electrode 30 is improved, whereby the light transmittance and the aperture ratio of pixel PX can be easily improved.

Opening 30a is formed in common electrode 30, which is a thin-film planar solid electrode, in an area above scanning line 50 in order to connect source electrode 20S of transistor 20 and pixel electrode 10, as shown in FIGS. 3 and 4. Therefore, opening 30a in common electrode 30 is provided with a contact hole that penetrates the three-layered insulating layer including second insulating film 122, third insulating film 123, and fourth insulating film 124, and in each pixel PX, source electrode 20S of transistor 20 and pixel electrode 10 are connected via the contact hole.

Alignment film 60 is formed on pixel electrode 10. Alignment film 60 is formed over the entire surface of fourth insulating film 124 so as to cover pixel electrode 10. Alignment film 60 is in contact with liquid crystal layer 300, and controls the initial alignment angle of liquid crystal molecules of liquid crystal layer 300. In the present exemplary embodiment, alignment film 60 is rubbed in order to align the initial alignment angles of the liquid crystal molecules in a certain direction.

Although not shown, a plurality of common lines made of a low resistance material such as copper may be provided in contact with common electrode 30. For example, the common line is formed immediately above common electrode 30. The common line made of a copper wire has a light shielding property. Therefore, the common line may be provided to overlap video signal line 40 or scanning line 50 covered with black matrix BM.

Next, second substrate 200 will be described. Second substrate 200 is a counter substrate that faces first substrate 100. Second substrate 200 includes second transparent base 210 and black matrix BM formed on second transparent base 210. Similar to first transparent base 110, second transparent base 210 is a transparent substrate such as a glass substrate, for example.

Black matrix BM is a black light shielding layer and is made of, for example, carbon black. Black matrix BM is formed on the surface of second transparent base 210 on the liquid crystal layer 300 side. In the present exemplary embodiment, black matrix BM is formed in a matrix pattern so as to cover video signal lines 40 and scanning lines 50. The width of black matrix BM is larger than the width of video signal line 40 and scanning line 50.

When liquid crystal display panel 2 displays a color image, second substrate 200 is a color filter substrate (CF substrate) having a color filter. In this case, each of the plurality of pixels PX is any one of a red pixel, a green pixel, and a blue pixel, and a red color filter, a blue color filter, and a green color filter are formed so as to respectively correspond to the red pixel, the green pixel, and the blue pixel. The color filters are formed in opening areas of black matrix BM (that is, in opening portions of black matrix BM). On the other hand, when liquid crystal display panel 2 displays a monochrome image, no color filter is formed on second substrate 200.

Second substrate 200 includes a plurality of spacers 220. Spacers 220 are formed on second transparent base 210 so as to protrude toward first substrate 100. Spacers 220 are columnar members for maintaining a constant distance (cell gap) between first substrate 100 and second substrate 200. That is, the thickness of liquid crystal layer 300 can be kept constant by spacers 220. As an example, spacers 220 have a cylindrical trapezoid shape. Spacers 220 are made of a resin material such as acrylic resin and can be elastically deformed. Spacers 220 can be patterned by, for example, photolithography.

A pair of polarizing plates (not shown) is bonded to liquid crystal display panel 2 configured as described above. For example, one of the pair of polarizing plates is formed on the outer surface of first substrate 100, and the other of the pair of polarizing plates is formed on the outer surface of second substrate 200. The pair of polarizing plates is disposed so that the polarization directions are orthogonal to each other. In addition, retardation plates may be bonded to the pair of polarizing plates.

In liquid crystal display device 1, liquid crystal display panel 2 may be disposed such that, for example, first substrate 100 is located on the backlight 3 side and second substrate 200 is located on an observer side, or vice versa.

Figure 7:
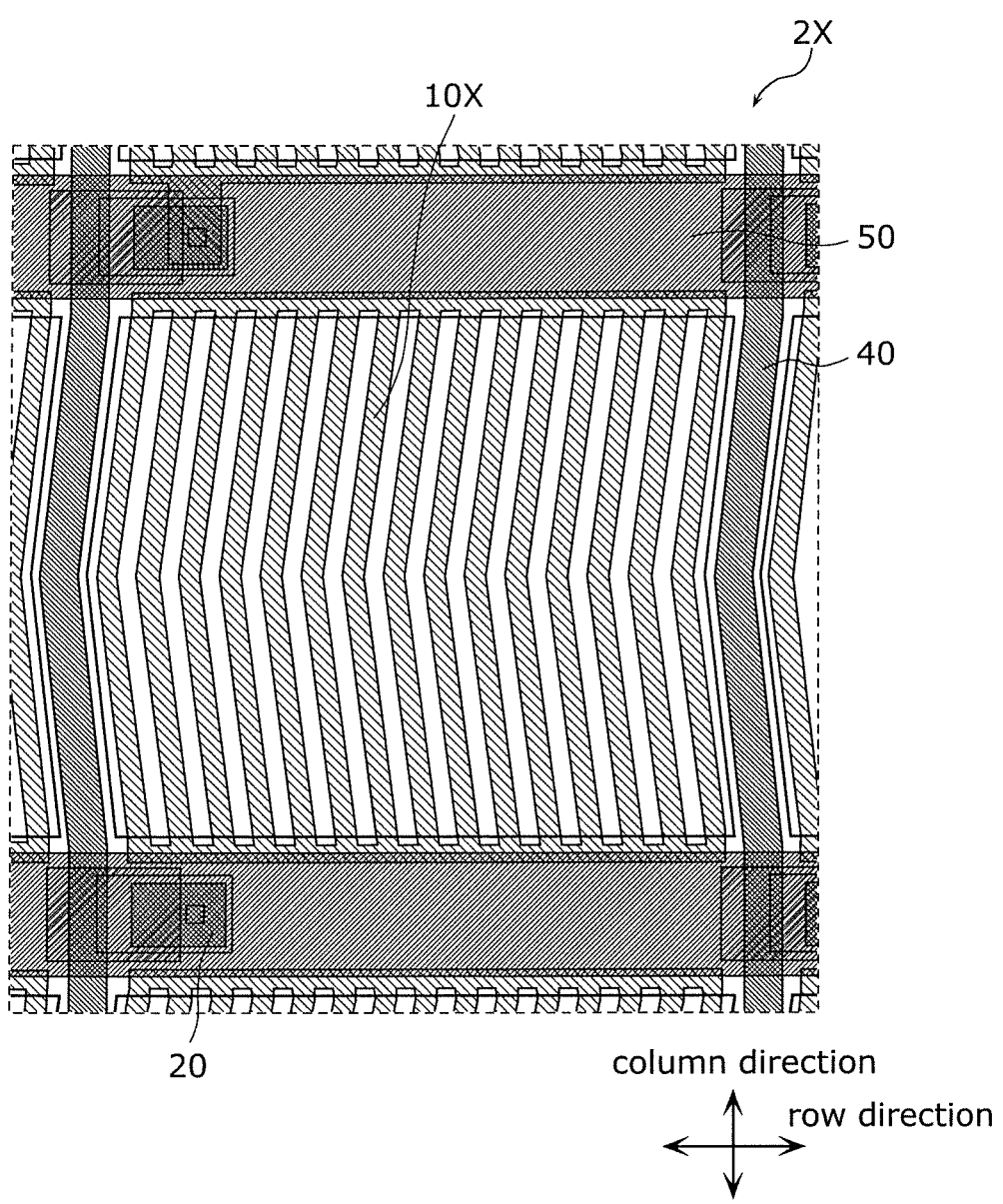
FIG. 7 is a view showing a pixel layout of liquid crystal display panel according to a first comparative example.
Figure 8:
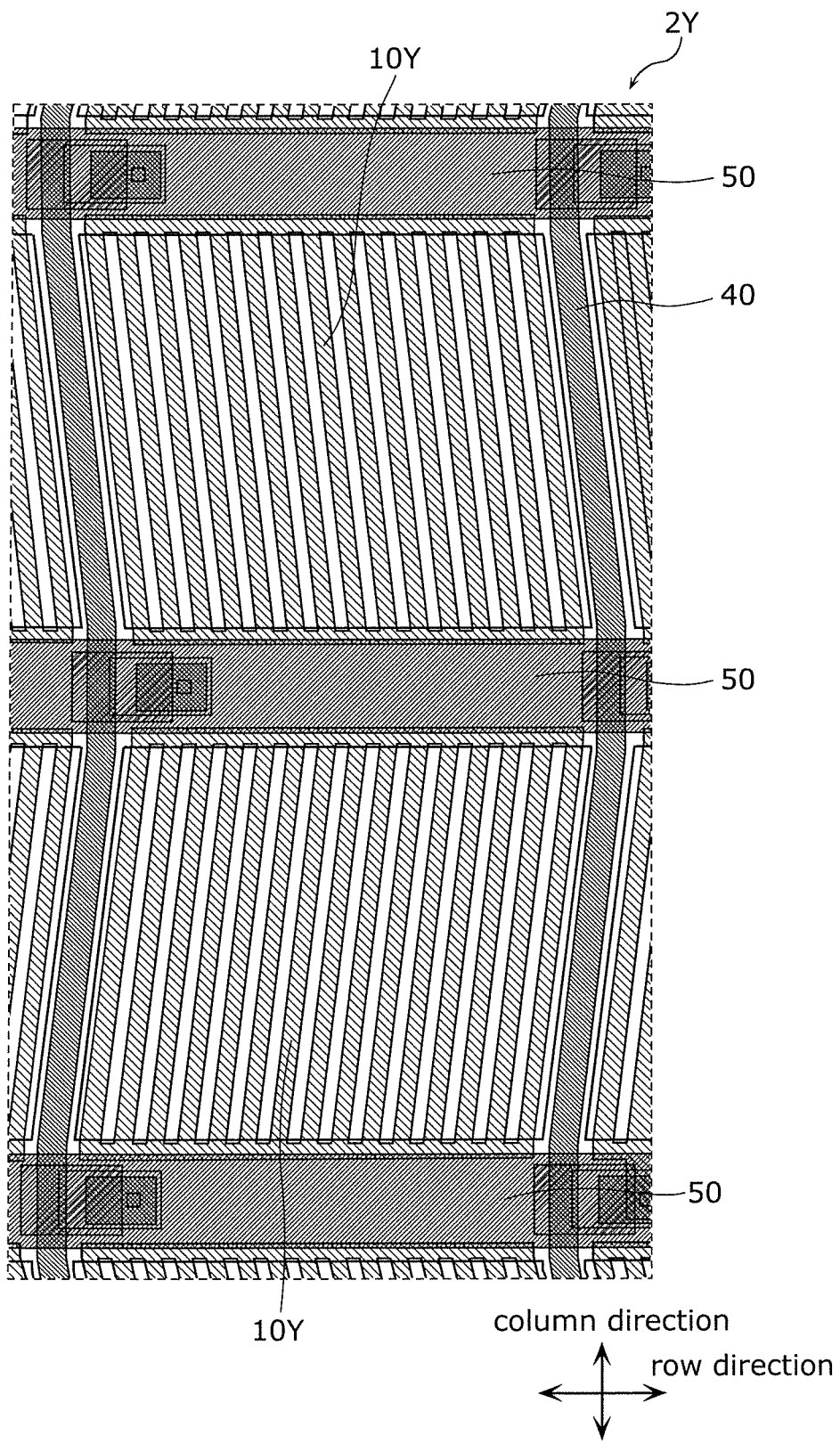
FIG. 8 is a view showing a pixel layout of liquid crystal display panel according to a second comparative example.

Next, effects of liquid crystal display panel 2 according to the first exemplary embodiment will be described with reference to FIGS. 7 and 8, along with the background of the present exemplary embodiment. FIG. 7 is a view showing a pixel layout of liquid crystal display panel 2X according to a first comparative example. FIG. 8 is a view showing a pixel layout of liquid crystal display panel 2Y according to a second comparative example.

Liquid crystal display panel 2X according to the first comparative example shown in FIG. 7 is a transverse electric field mode liquid crystal display panel of an intra-pixel multi-domain type.

As shown in FIG. 7, in transverse electric field mode liquid crystal display panel 2X of an intra-pixel multi-domain type, a bent portion is formed in a part of each pixel electrode 10X in one pixel by bending pixel electrode 10X in a "lateral-V" shape. Therefore, transverse electric field mode liquid crystal display panel 2X of an intra-pixel multi-domain type shown in FIG. 7 can achieve excellent color viewing angle characteristics and wide viewing angle characteristics. However, liquid crystal molecules are less likely to rotate at the bent portions of pixel electrodes 10X, resulting in that an aperture ratio is lower than that of a transverse electric field mode liquid crystal display panel including a plurality of linear pixel electrodes having no bent portions.

In view of this, liquid crystal display panel 2Y according to the second comparative example shown in FIG. 8 is considered. Liquid crystal display panel 2Y according to the second comparative example shown in FIG. 8 is a transverse electric field mode liquid crystal display panel of a pixel-basis multi-domain type.

Liquid crystal display panel 2Y according to the second comparative example shown in FIG. 8 is configured such that one bent portion is formed in two pixels by changing the directions of pixel electrodes 10Y of two pixels adjacent to each other, without forming bent portions in pixel electrodes 10Y within one pixel. Therefore, liquid crystal display panel 2Y according to the second comparative example shown in FIG. 8 can suppress a decrease in aperture ratio, as compared to liquid crystal display panel 2X according to the first comparative example shown in FIG. 7. However, since horizontal viewing angle characteristics are different for each row, viewing angle characteristics deteriorate.

As a result of intensive studies on such problems, the inventors of the present disclosure have found that a decrease in aperture ratio can be suppressed by designing a layout within a pixel even in a transverse electric field mode liquid crystal display panel of an intra-pixel multi-domain type.

Specifically, liquid crystal display panel 2 according to the present exemplary embodiment is a transverse electric field mode liquid crystal display panel of an intra-pixel multi-domain type, and in each of a plurality of pixels PX, pixel electrode 10 includes first pixel electrode 11 having the plurality of first line electrodes 11L extending in a first direction in a stripe pattern, and second pixel electrode 12 having the plurality of second line electrodes 12L extending in a second direction different from the first direction in a stripe pattern, as shown in FIG. 3.

In liquid crystal display panel 2 according to the present exemplary embodiment, first pixel electrode 11 provided in first domain D1 and second pixel electrode 12 provided in second domain D2 are separated across video signal line 40 in the row direction, and are connected to each other by bridge electrode 13 extending over video signal line 40.

With this configuration, the boundary (domain boundary) between first domain D1 and second domain D2 can be overlapped with black matrix BM (non-opening portion) that covers video signal line 40 (metal layer). Thus, it is possible to suppress a decrease in aperture ratio even in liquid crystal display panel 2 of an intra-pixel multi-domain type.

In this case, in each of the plurality of pixels PX, the tip of at least one of the plurality of first line electrodes 11L from among the plurality of first line electrodes 11L and the tip of at least one of the plurality of second line electrodes 12L from among the plurality of second line electrodes 12L may overlap video signal line 40 corresponding to pixel PX, as in the present exemplary embodiment. In the present exemplary embodiment, in each pixel PX, the tip of first finger electrode portion 11L2 of the plurality of first line electrodes 11L and the tip of second finger electrode portion 12L2 of the plurality of second line electrodes 12L overlap the video signal line.

With this configuration, even if pixel electrode 10 is divided into first pixel electrode 11 and second pixel electrode 12 with video signal line 40 as a boundary, first pixel electrode 11 and second pixel electrode 12 can be formed up to the edge of video signal line 40, whereby a decrease in aperture ratio can be suppressed.

Further, in the present exemplary embodiment, second pixel electrode 12 of one pixel PX (for example, pixel PX1 in FIG. 3) of two adjacent pixels PX and first pixel electrode 11 of the other pixel PX (for example, pixel PX2 in FIG. 3) of two adjacent pixels PX are provided between two adjacent video signal lines 40.

With this configuration, a boundary between two adjacent pixels PX can be positioned between two adjacent video signal lines 40.

In this case, in two adjacent pixels PX, second end electrode 12La located closest to the plurality of first line electrodes 11L of other pixel PX (for example, pixel PX2 in FIG. 3) from among the plurality of second line electrodes 12L in one pixel PX (for example, pixel PX1 in FIG. 3) is adjacent to first end electrode 11La located closest to the plurality of second line electrodes 12L of one pixel PX from among the plurality of first line electrodes 11L in other pixel PX.

With this configuration, first pixel electrode 11 and second pixel electrode 12 can be positioned up to the boundary between two adjacent pixels PX. That is, the boundary between two adjacent pixels PX can be positioned in an opening. Thus, a decrease in aperture ratio can be further suppressed.

In the present exemplary embodiment, in two adjacent pixels PX, the distance between first end electrode 11La of other pixel PX and second end electrode 12La of one pixel PX, the pitch of the plurality of first line electrodes 11L and the pitch of the plurality of second line electrodes 12L are the same.

With this configuration, in two adjacent pixels PX, the pitch of pixel electrode 10 can be made uniform not only within each pixel PX but also between two adjacent pixels PX, whereby a decrease in aperture ratio can be suppressed still further.

In two adjacent pixels PX, the distance between first end electrode 11La of other pixel PX (for example, pixel PX2 in FIG. 3) and second end electrode 12La of one pixel PX (for example, pixel PX1 in FIG. 3) may be greater than the pitch of the plurality of first line electrodes 11L and the pitch of the plurality of second line electrodes 12L.

With this configuration, in two adjacent pixels PX, pixel electrode 10 of one pixel PX and pixel electrode 10 of other pixel PX, which are at different potentials, can be moved away from each other, whereby interference of the electric field between the pixels can be suppressed. When liquid crystal display panel 2 displays a color image, two adjacent pixels PX are different in color, and with the above configuration, pixel electrodes 10 of two adjacent pixels PX can be kept away from each other, whereby color mixing can be suppressed.

Further, in two adjacent pixels PX, the second direction that is the extending direction of the plurality of second line electrodes 12L in one pixel PX (for example, pixel PX1 in FIG. 3) and the first direction that is the extending direction of the plurality of first line electrodes 11L in other pixel PX (for example, pixel PX2 in FIG. 3) are the same.

With this configuration, an ineffective region existing at the boundary between two adjacent pixels PX can be reduced, so that the decrease in aperture ratio can be further suppressed.

In the present exemplary embodiment, the plurality of pixels PX is aligned throughout the entire image display region, and transistor 20 of one pixel PX and transistor 20 of other pixel PX of two adjacent pixels PX are provided to overlap same scanning line 50. However, the present disclosure is not limited thereto.

Figure 9:
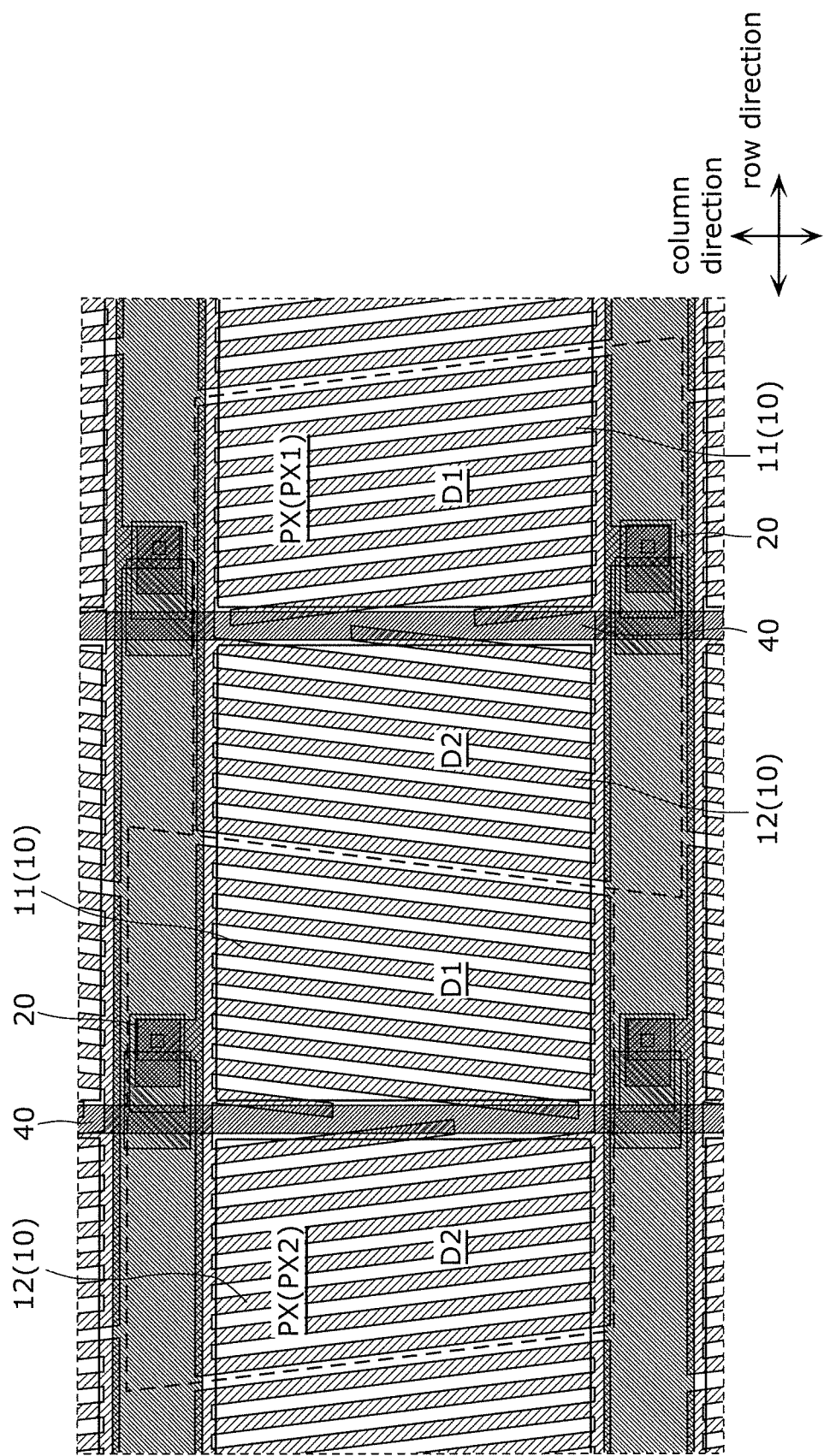
FIG. 9 is a plan view showing a layout of pixels of liquid crystal display panel according to a modification of the first exemplary embodiment.

For example, as shown in FIG. 9, transistor 20 of one pixel PX (right pixel PX1 in FIG. 9) and transistor 20 of other pixel PX (left pixel PX2 in FIG. 9) of two adjacent pixels PX may be provided to overlap different scanning lines 50. Specifically, transistors 20 of two pixels PX adjacent to each other in the row direction may be provided at positions alternately inverted in the direction in which video signal line 40 extends for each column. That is, in FIG. 9, the plurality of pixels PX and transistors 20 are arranged in a staggered manner in a vertical direction in a planar view.

With this configuration, the difference in pixel capacitance between pixel electrode 10 and common electrode 30 can be reduced for two pixels PX adjacent to each other in the row direction. For example, the pixel capacitances of two pixels PX adjacent to each other in the row direction can be made the same. Thus, the quality of a display image can be improved. In FIG. 9, one pixel PX is indicated by a region enclosed by a dashed trapezoid.

SECOND EXEMPLARY EMBODIMENT

Figure 10:
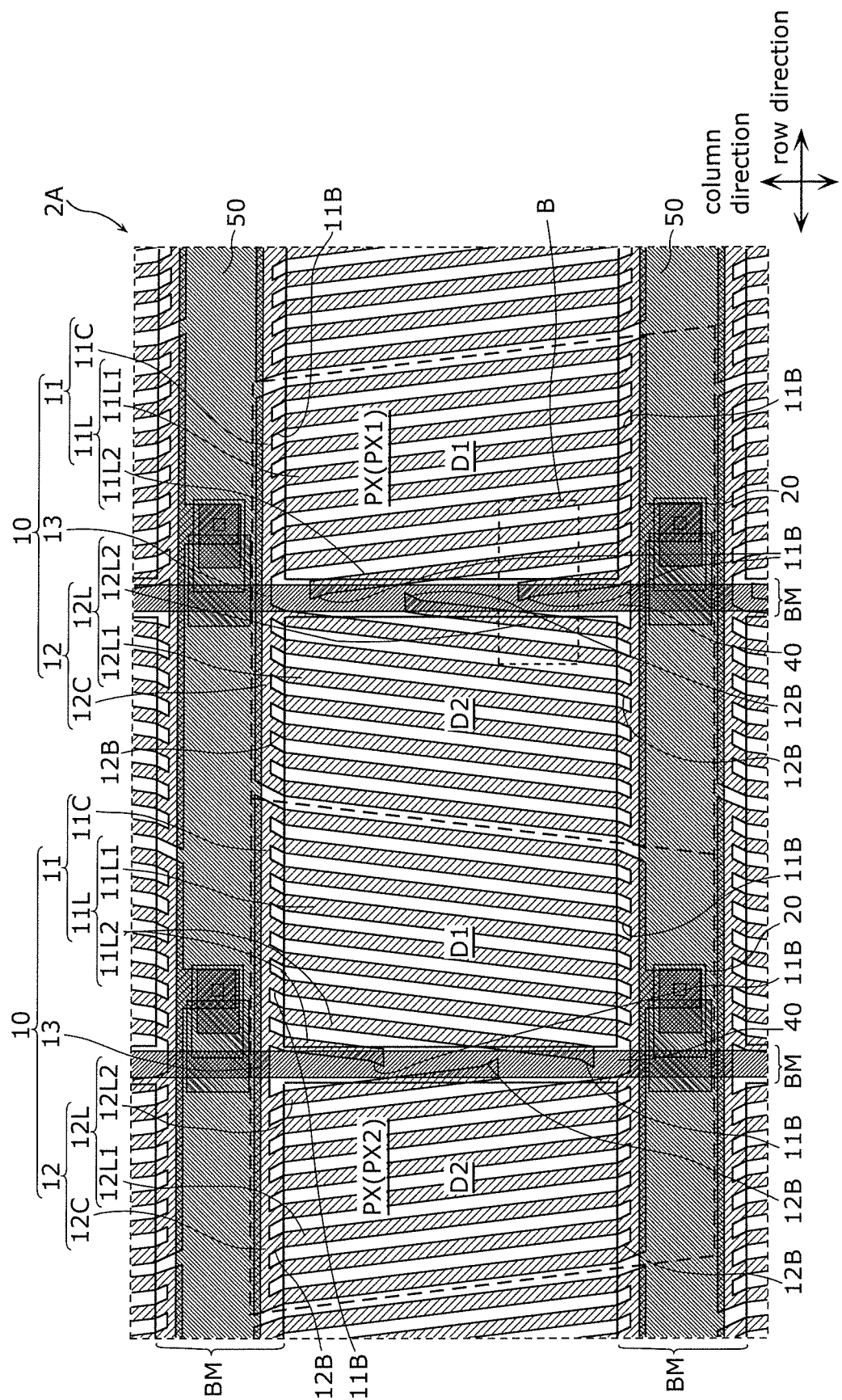
FIG. 10 is a plan view showing a layout of pixels of liquid crystal display panel according to a second exemplary embodiment.
Figure 11:
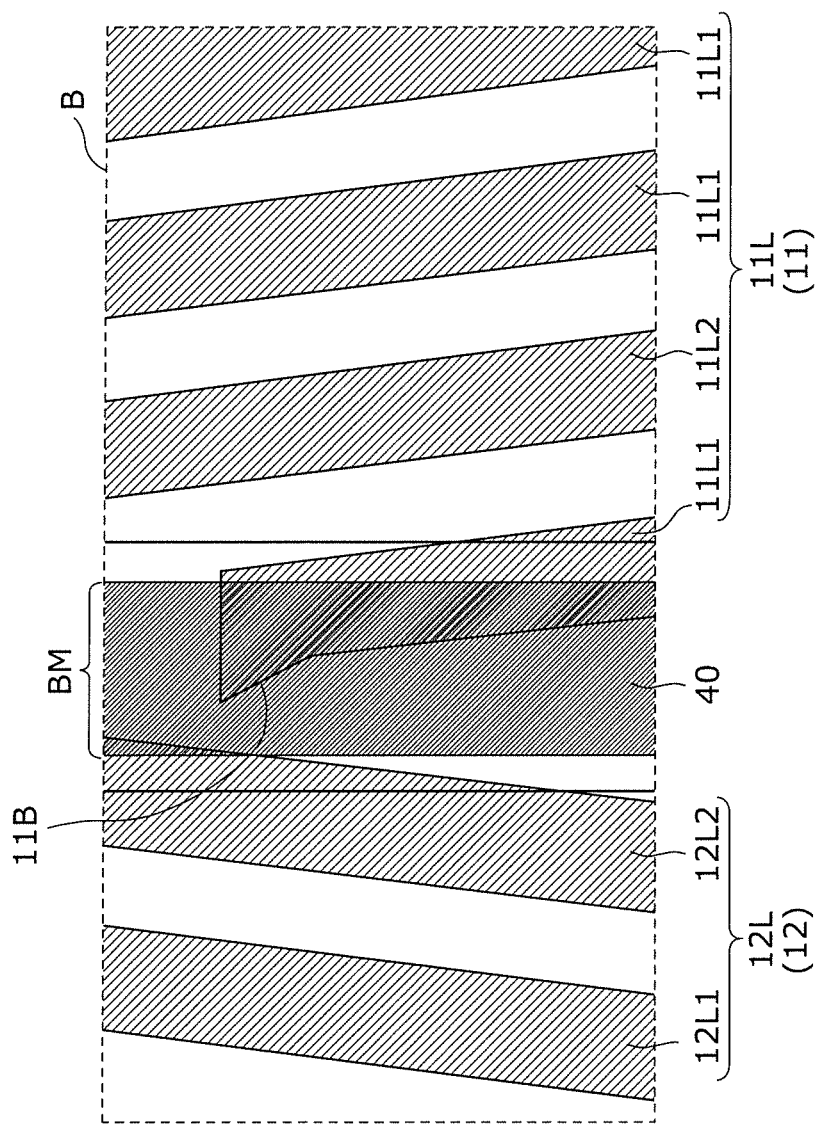
FIG. 11 is a partial enlarged view of pixels in liquid crystal display panel according to the second exemplary embodiment.

Next, a second exemplary embodiment will be described with reference to FIG. 10. FIGS. 10 and 11 are plan views showing a layout of pixels PX of liquid crystal display panel 2A used in a liquid crystal display device according to the second exemplary embodiment. FIG. 11 is an enlarged view of region B enclosed by a dashed line in FIG. 10. In FIG. 10, one pixel PX is indicated by a region enclosed by a dashed trapezoid.

Liquid crystal display panel 2A according to the present exemplary embodiment is different from liquid crystal display panel 2 according to the above exemplary embodiment in that a bent portion as a measure against pressed domain is formed in pixel electrode 10.

Specifically, in liquid crystal display panel 2A according to the present exemplary embodiment, in each pixel PX, first pixel electrode 11 has first bent portion 11B formed by bending a part of the side of at least one of the plurality of first line electrodes 11L from among the plurality of first line electrodes 11L in a direction inclined with respect to the first direction, as shown in FIG. 10. Second pixel electrode 12 includes second bent portion 12B formed by bending a part of the side of at least one of the plurality of second line electrodes 12L in a direction inclined with respect to the second direction.

First bent portion 11B is inclined more than first line electrodes 11L extending in the stripe direction (first direction), and has a greater inclination angle with respect to the column direction. That is, first bent portion 11B has an inclination angle smaller than that of first line electrodes 11L extending in the stripe direction (first direction) with respect to the row direction.

Similarly, second bent portion 12B is inclined more than second line electrodes 12L extending in the stripe direction (second direction), and has a greater inclination angle with respect to the column direction. That is, second bent portion 12B has an inclination angle smaller than that of second line electrodes 12L extending in the stripe direction (second direction) with respect to the row direction.

As shown in FIGS. 10 and 11, first bent portion 11B of first pixel electrode 11 is formed at the tip of first finger electrode portion 11L2 in which one of both ends is open. Further, second bent portion 12B of second pixel electrode 12 is formed at the tip of second finger electrode portion 12L2 in which one of both ends is open.

In each of the plurality of pixels PX, at least one of first bent portion 11B and second bent portion 12B may overlap video signal line 40 corresponding to pixel PX. In the present exemplary embodiment, both first bent portion 11B and second bent portion 12B overlap video signal line 40.

Further, in the present exemplary embodiment, first bent portions 11B are formed not only at the tip of first line electrode 11L in which one end is open without being connected to first connection electrode 11C but also at both ends of first line electrodes 11L in which both ends are connected to first connection electrodes 11C. In other words, first bent portions 11B are also formed in connection portions (base portions) of first line electrodes 11L with first connection electrodes 11C.

Similarly, second bent portions 12B are formed not only at the tip of second line electrode 12L in which one end is open without being connected to second connection electrode 12C but also at both ends of second line electrodes 12L in which both ends are connected to second connection electrodes 12C. In other words, second bent portions 12B are also formed in connection portions (base portions) of second line electrodes 12L with second connection electrodes 12C.

Figure 12:
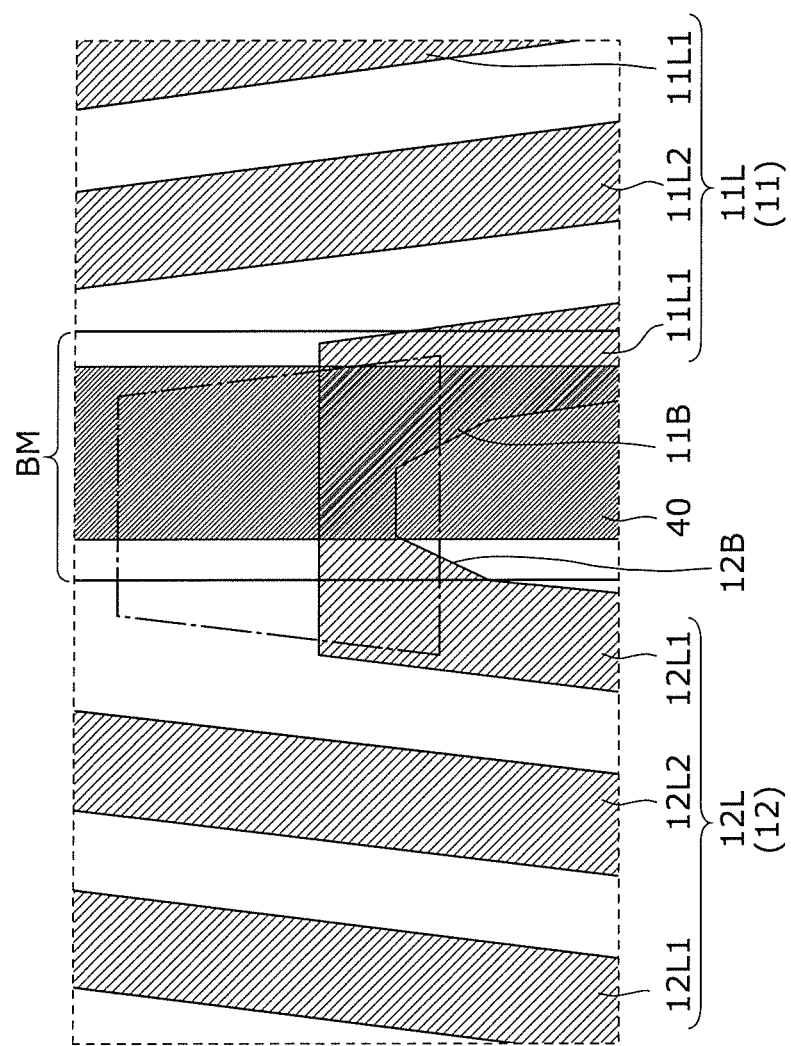
FIG. 12 is a partial enlarged view of another example of pixels in liquid crystal display panel according to the second exemplary embodiment.

In the present exemplary embodiment, first line electrode 11L of first pixel electrode 11 and second line electrode 12L of second pixel electrode 12 in each pixel PX are not connected to each other at a position overlapping video signal line 40 as shown in FIG. 11. However, the present disclosure is not limited thereto. For example, first line electrode 11L of first pixel electrode 11 and second line electrode 12L of second pixel electrode 12 in each pixel PX may be connected to each other at a position overlapping video signal line 40 as shown in FIG. 12. In FIG. 12, in a region enclosed by a dot-and-dash line, liquid crystal molecules are less likely to rotate, and light is not easily transmitted through this region.

Figure 13:
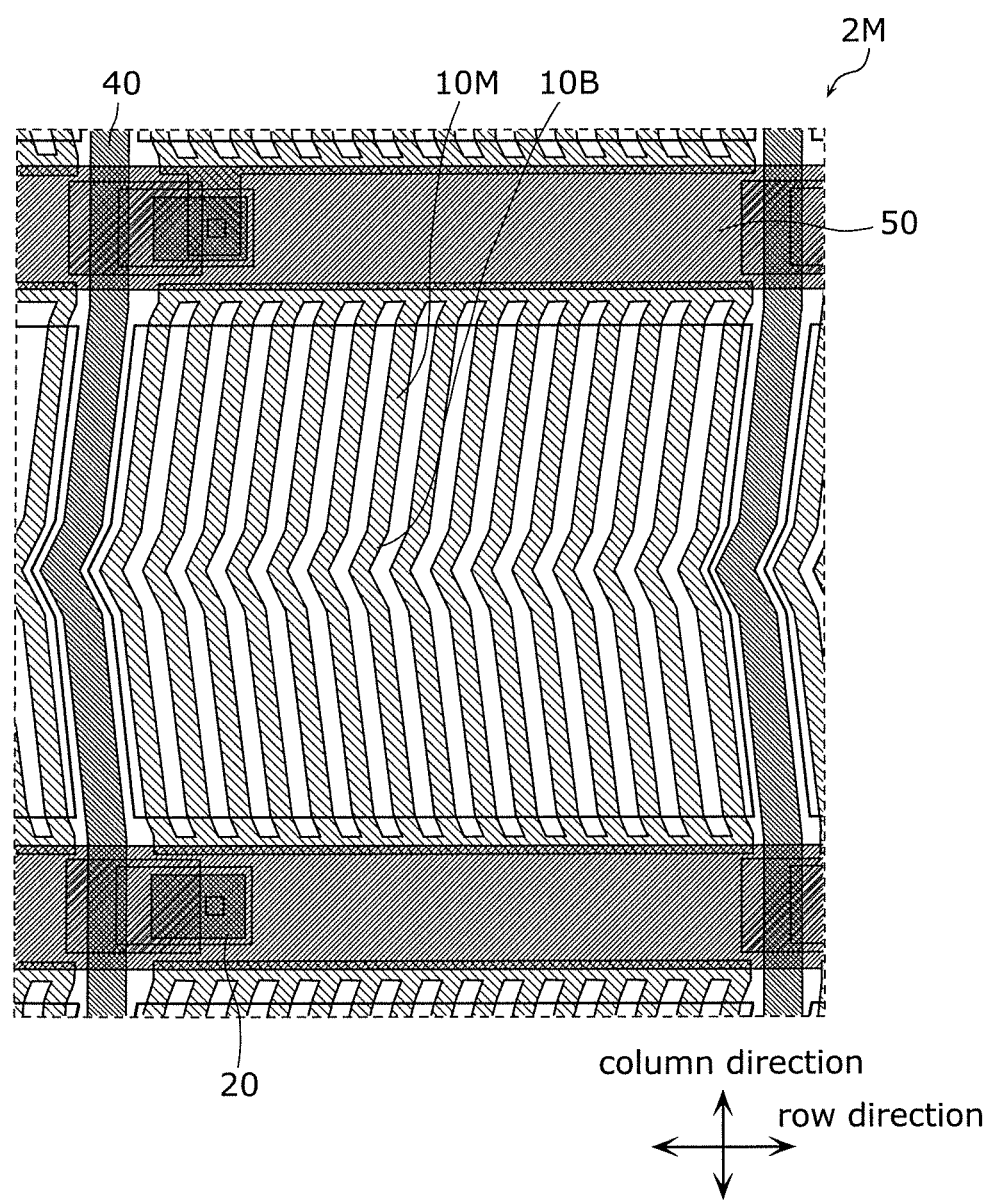
FIG. 13 is a view showing a pixel layout of liquid crystal display panel according to a third comparative example.
Figure 14:
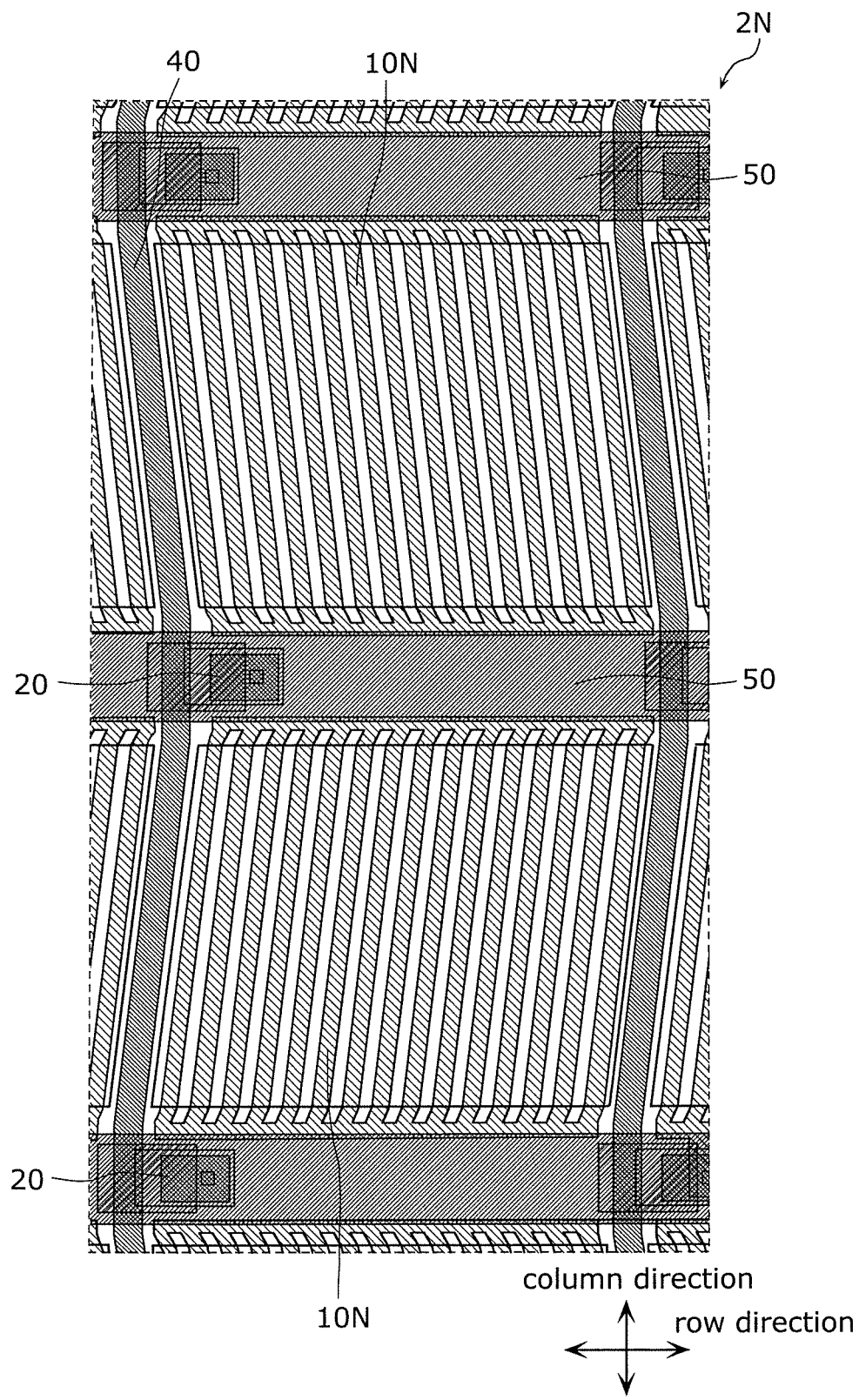
FIG. 14 is a view showing a pixel layout of liquid crystal display panel according to a fourth comparative example.

Next, effects of liquid crystal display panel 2A according to the present exemplary embodiment will be described with reference to FIGS. 13 and 14. FIG. 13 is a view showing a pixel layout of liquid crystal display panel 2M according to a third comparative example. FIG. 14 is a view showing a pixel layout of liquid crystal display panel 2N according to a fourth comparative example.

Liquid crystal display panel 2M according to the third comparative example shown in FIG. 13 is a transverse electric field mode liquid crystal display panel of an intra-pixel multi-domain type provided with a measure against pressed domain.

The pressed domain indicates a domain generated such that, when the surface of a liquid crystal display panel is pressed with a finger or the like, liquid crystal molecules rotate in the pressed portion due to, for example, a partial change in a distance (cell gap) between a TFT substrate and a counter substrate of a liquid crystal cell. For example, in a screen displaying white, the amount of transmitted backlight is reduced at a position where a pressed domain occurs, and the screen becomes dark at this position.

In view of this, in order to suppress such a pressed domain, it is conceivable to form a bent portion having a great inclination in a part of the pixel electrode. For example, liquid crystal display panel 2M shown in FIG. 13 has a multi-domain bent portion formed in pixel electrode 10M by bending pixel electrode 10M into a "lateral-V" shape in order to achieve an intra-pixel multi-domain mode, and also has bent portion 10B which is formed as a measure against pressed domain and which is inclined more than the multi-domain bent portion. In addition, in liquid crystal display panel 2M shown in FIG. 13, the bent portions as measures against pressed domain are also formed at base portions of the line electrodes.

Liquid crystal display panel 2M shown in FIG. 13 can achieve excellent color viewing angle characteristics and wide viewing angle characteristics as in liquid crystal display panel 2X shown in FIG. 7. However, in liquid crystal display panel 2M, the aperture ratio decreases because pixel electrode 10M is bent in a lateral-V shape. In addition, in liquid crystal display panel 2M shown in FIG. 13, the bent portion as a measure against pressed domain is formed in addition to the multi-domain bent portion, so that the aperture ratio is further reduced. That is, in liquid crystal display panel 2M shown in FIG. 13, the aperture ratio is significantly reduced.

In view of this, liquid crystal display panel 2N according to the fourth comparative example shown in FIG. 14 is considered. Liquid crystal display panel 2N according to the fourth comparative example shown in FIG. 14 is a transverse electric field mode liquid crystal display panel of a pixel-basis multi-domain type.

Liquid crystal display panel 2N according to the fourth comparative example shown in FIG. 14 is configured such that one bent portion is formed in two pixels by changing the directions of pixel electrodes 10N of two pixels adjacent to each other, without forming a multi-domain bent portion within one pixel. Further, in liquid crystal display panel 2N according to the fourth comparative example shown in FIG. 14, bent portions as measures against pressed domain are formed only at the base portions of line electrodes. For this reason, a decrease in the aperture ratio can be suppressed more in liquid crystal display panel 2N according to the fourth comparative example shown in FIG. 14 than in liquid crystal display panel 2M according to the third comparative example shown in FIG. 13. However, in liquid crystal display panel 2N according to the fourth comparative example shown in FIG. 14, horizontal viewing angle characteristics are different for each row, so that the viewing angle characteristics deteriorate.

In view of this, in liquid crystal display panel 2A in the present exemplary embodiment, pixel electrode 10 includes first pixel electrode 11 having the plurality of first line electrodes 11L extending in a first direction in a stripe pattern, and second pixel electrode 12 having the plurality of second line electrodes 12L extending in a second direction different from the first direction in a stripe pattern, as in liquid crystal display panel 2 in the above exemplary embodiment.

In liquid crystal display panel 2A according to the present exemplary embodiment, first pixel electrode 11 provided in first domain D1 and second pixel electrode 12 provided in second domain D2 are also separated across video signal line 40 in the row direction, and connected to each other by bridge electrode 13 extending over video signal line 40.

With this configuration, the boundary (domain boundary) between first domain D1 and second domain D2 can be overlapped with black matrix BM (non-opening portion)

that covers video signal line 40. Thus, it is possible to suppress a decrease in aperture ratio even in liquid crystal display panel 2A of an intra-pixel multi-domain type.

Further, in liquid crystal display panel 2A in the present exemplary embodiment, in each pixel PX, first pixel electrode 11 is formed with first bent portion 11B, and second pixel electrode 12 is formed with second bent portion 12B as a measure against pressed domain, first bent portion 11B and second bent portion 12B overlapping video signal line 40.

Thus, even if first bent portion 11B and second bent portion 12B are formed as measures against pressed domain, a decrease in aperture ratio can be suppressed. That is, first bent portion 11B and second bent portion 12B as measures against pressed domain can be formed without decreasing the aperture ratio.

In this case, although first bent portion 11B may be formed on both sides of each of first line electrodes 11L, first bent portion 11B is formed only on a portion overlapping video signal line 40 in both sides of first line electrode 11L and is not formed in a portion not overlapping video signal line 40 in the present exemplary embodiment as shown in FIG. 11. Similarly, second bent portion 12B is formed only in a portion overlapping video signal line 40 in both sides of second line electrode 12L, and is not formed in a portion not overlapping video signal line 40. Specifically, first bent portion 11B is formed at the tip of first finger electrode portion 11L2, and second bent portion 12B is formed at the tip of second finger electrode portion 12L2.

As a result, first bent portion 11B and second bent portion 12B overlap video signal line 40 covered with black matrix BM, and do not overlap the slit opening. Therefore, even if first bent portion 11B and second bent portion 12B are formed as measures against pressed domain, a decrease in aperture ratio can be effectively suppressed.

In the present exemplary embodiment, the plurality of pixels PX is aligned throughout the entire image display region, and transistor 20 of one pixel PX and transistor 20 of other pixel PX of two adjacent pixels PX are provided to overlap same scanning line 50. However, the present disclosure is not limited thereto.

Figure 15:
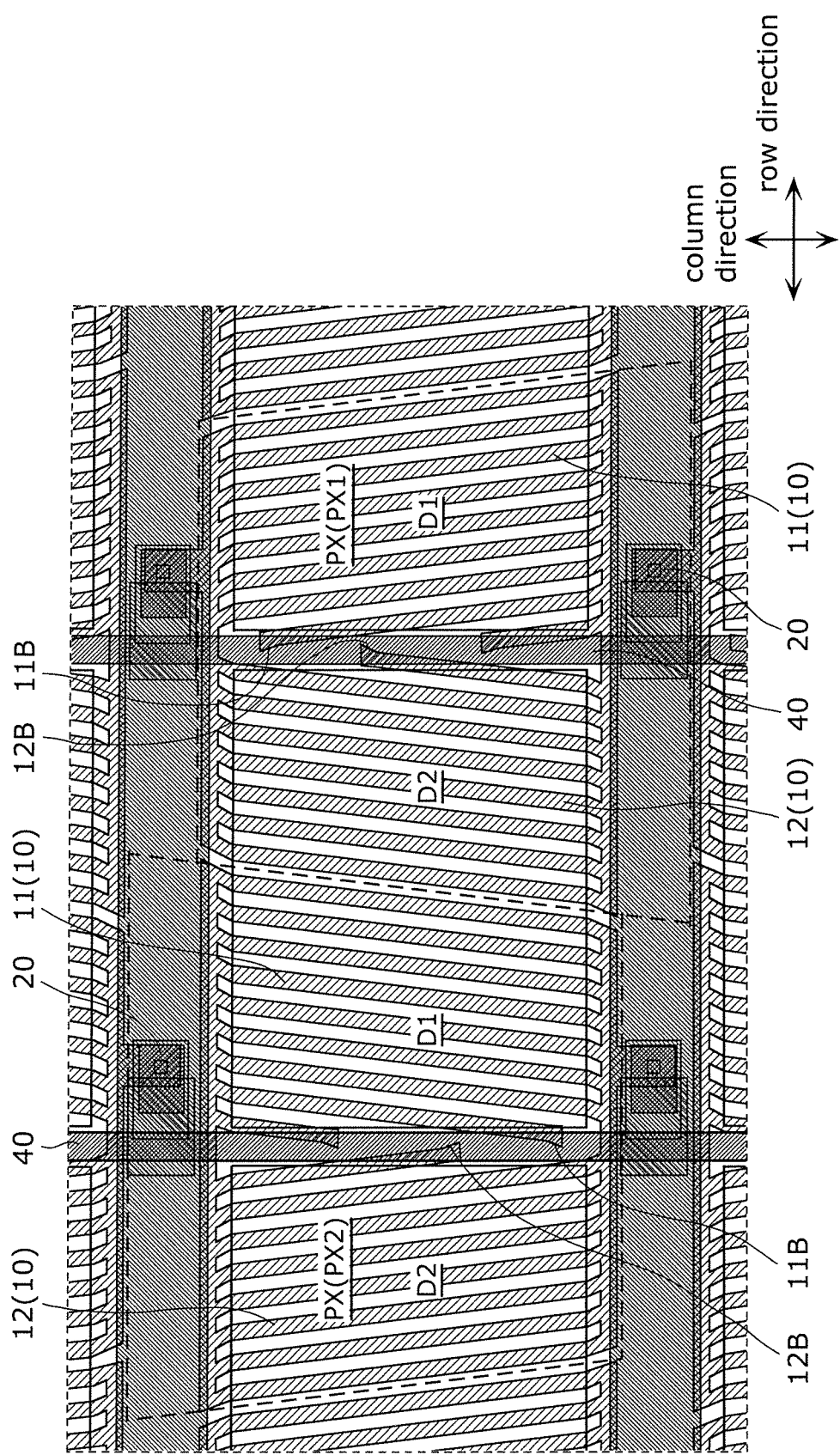
FIG. 15 is a plan view showing a layout of pixels of liquid crystal display panel according to a modification of the second exemplary embodiment.

For example, as shown in FIG. 15, transistor 20 of one pixel PX (right pixel PX1 in FIG. 15) and transistor 20 of other pixel PX (left pixel PX2 in FIG. 15) of two adjacent pixels PX may be provided to overlap different scanning lines 50. Specifically, transistors 20 of two pixels PX adjacent to each other in the row direction may be provided at positions alternately inverted in the direction in which video signal line 40 extends for each column. That is, in FIG. 15, the plurality of pixels PX and transistors 20 are arranged in a staggered manner in a vertical direction in a planar view.

With this configuration, the difference in pixel capacitance between pixel electrode 10 and common electrode 30 can be reduced for two pixels PX adjacent to each other in the row direction. For example, the pixel capacitances of two pixels PX adjacent to each other in the row direction can be made the same. Thus, the quality of a display image can be improved. In FIG. 15, one pixel PX is indicated by a region enclosed by a dashed trapezoid.

THIRD EXEMPLARY EMBODIMENT

Figure 16:
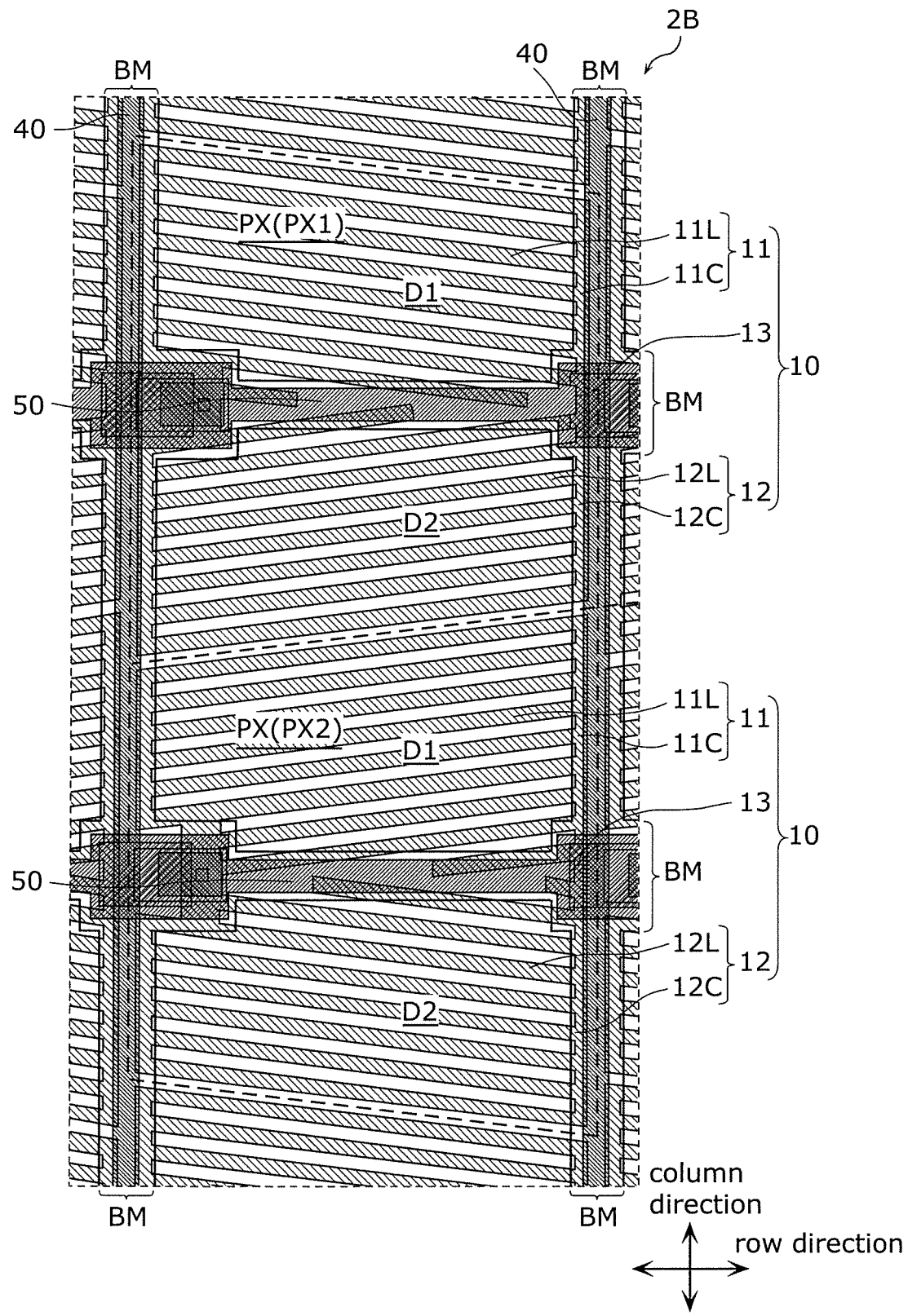
FIG. 16 is a plan view showing a layout of pixels of liquid crystal display panel according to a third exemplary embodiment.

Next, a third exemplary embodiment will be described with reference to FIG. 16. FIG. 16 is a plan view showing a layout of pixels PX of liquid crystal display panel 2B used in a liquid crystal display device according to the third exemplary embodiment. In FIG. 16, one pixel PX is indicated by a region enclosed by a dashed trapezoid.

In liquid crystal display panel 2 in the first exemplary embodiment, first pixel electrode 11 and second pixel electrode 12 are separated across video signal line 40 in each of the plurality of pixels PX. On the other hand, in liquid crystal display panel 2B in the present exemplary embodiment, first pixel electrode 11 and second pixel electrode 12 are separated across scanning line 50 in each of the plurality of pixels PX as shown in FIG. 16. Therefore, bridge electrode 13 connecting first pixel electrode 11 and second pixel electrode 12 extend over scanning line 50. That is, in the present exemplary embodiment, bridge electrode 13 and scanning line 50 intersect in three dimensions.

In liquid crystal display panel 2 in the first exemplary embodiment, the plurality of first line electrodes 11L of first pixel electrode 11 and the plurality of second line electrodes 12L of second pixel electrode 12 mainly extend in the column direction in the entire image display region. On the other hand, in the present exemplary embodiment, the plurality of first line electrodes 11L of first pixel electrode 11 and the plurality of second line electrodes 12L of second pixel electrode 12 mainly extend in the row direction in the entire image display region as shown in FIG. 16.

In liquid crystal display panel 2B according to the present exemplary embodiment, in each pixel PX, the tip of first line electrode 11L positioned closer to scanning line 50 from among the plurality of first line electrodes 11L and the tip of second line electrode 12L positioned closer to scanning line 50 from among the plurality of second line electrodes 12L overlap scanning line 50.

Further, in liquid crystal display panel 2B in the present exemplary embodiment, first pixel electrode 11 of one pixel PX of two adjacent pixels PX and second pixel electrode 12 of other pixel PX are adjacent to each other in the column direction. Therefore, in the present exemplary embodiment, first pixel electrode 11 of one pixel PX of two adjacent pixels PX and second pixel electrode 12 of other pixel PX are provided between two adjacent scanning lines 50.

Liquid crystal display panel 2B according to the present exemplary embodiment described above also provides effects similar to those provided by liquid crystal display panel 2 in the first exemplary embodiment. For example, in liquid crystal display panel 2B according to the present exemplary embodiment, the boundary (domain boundary) between first domain D1 and second domain D2 overlaps black matrix BM (non-opening portion) that covers scanning line 50. Thus, it is possible to suppress a decrease in aperture ratio even in liquid crystal display panel 2B of an intra-pixel multi-domain type.

Note that, in the present exemplary embodiment, first pixel electrode 11 and second pixel electrode 12 may be also formed with bent portions as measures against pressed domain, as in the second exemplary embodiment. In this case, the bent portions as measures against pressed domain may overlap scanning line 50 in the present exemplary embodiment. Thus, the bent portions as measures against pressed domain can be covered with scanning line 50 having a line width larger than that of video signal line 40, so that the length of the bent portions as measures against pressed domain can be increased. Accordingly, the pressed domain can be effectively suppressed as compared with the second exemplary embodiment.

In the present exemplary embodiment, the plurality of pixels PX is aligned throughout the entire image display region, and transistor 20 of one pixel PX and transistor 20 of other pixel PX of two adjacent pixels PX are provided to overlap same video signal line 40. However, the present disclosure is not limited thereto.

Figure 17:
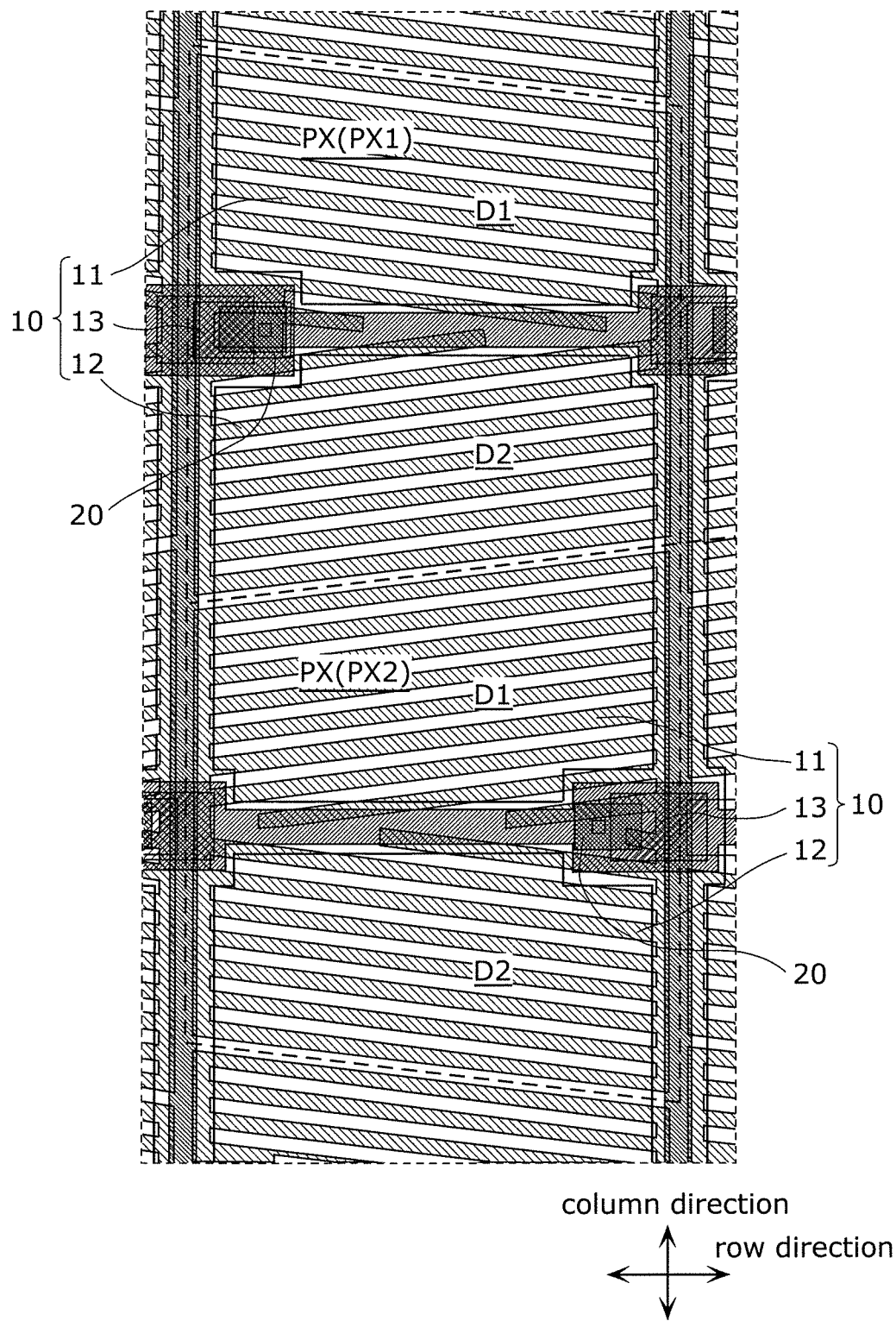
FIG. 17 is a plan view showing a layout of pixels of liquid crystal display panel according to a modification of the third exemplary embodiment.

For example, as shown in FIG. 17, transistor 20 of one pixel PX (upper pixel PX1 in FIG. 17) and transistor 20 of other pixel PX (lower pixel PX2 in FIG. 17) of two adjacent pixels PX may be provided to overlap different video signal lines 40. Specifically, transistors 20 of two pixels PX adjacent to each other in the column direction may be provided at positions alternately inverted in the direction in which scanning line 50 extends for each row. That is, in FIG. 17, the plurality of pixels PX and transistors 20 are arranged in a staggered manner in a horizontal direction in a planar view.

With this configuration, the difference in pixel capacitance between pixel electrode 10 and common electrode 30 can be reduced for two pixels PX adjacent to each other in the column direction. For example, the pixel capacitances of two pixels PX adjacent to each other in the column direction can be made the same. Thus, the quality of a display image can be improved. In FIG. 17, one pixel PX is indicated by a region enclosed by a dashed trapezoid.

(Modifications of First Mode of the Present Disclosure)

While the liquid crystal display panel and the liquid crystal display device according to the first mode of the present disclosure have been described based on the exemplary embodiments, the present disclosure is not limited to the first to third exemplary embodiments.

For example, in the first to third exemplary embodiments, first pixel electrode 11 and second pixel electrode 12 are formed with a plurality of slits, wherein both ends of ladder electrodes are connected. However, the present disclosure is not limited thereto. Specifically, first pixel electrode 11 and second pixel electrode 12 may be comb-shaped electrodes in which only one ends of all line electrodes are connected. That is, first pixel electrode 11 and second pixel electrode 12 may be composed only of finger electrodes.

In the first to third exemplary embodiments, video signal line 40 and drain electrode 20D of transistor 20 are connected, and pixel electrode 10 and source electrode 20S of transistor 20 are connected. However, the present disclosure is not limited thereto. For example, video signal line 40 and source electrode 20S of transistor 20 may be connected, and pixel electrode 10 and drain electrode 20D of transistor 20 may be connected.

In the first to third exemplary embodiments, transistor 20 is connected to first pixel electrode 11 of pixel electrode 10 in each pixel PX. However, the present disclosure is not limited thereto. For example, in each pixel PX, transistor 20 may be connected to second pixel electrode 12 of pixel electrode 10.

In the first to third exemplary embodiments, video signal lines 40 extending in the column direction are linearly formed. However, the present disclosure is not limited thereto. For example, a part of video signal lines 40 extending in the column direction may be bent in a "lateral-V" shape.

In the first to third exemplary embodiments, bridge electrode 13 is formed in the same layer as first pixel electrode 11 and second pixel electrode 12. However, the present disclosure is not limited thereto. For example, bridge electrode 13 may be formed in a different layer from first pixel electrode 11 and second pixel electrode 12. In this case, bridge electrode 13 is connected to first pixel electrode 11 and second pixel electrode 12 through contact holes. When bridge electrode 13 is formed in a different layer from first pixel electrode 11 and second pixel electrode 12, bridge electrode 13 may be formed in the same layer as an existing wiring layer such as a metal layer.

[Second Mode of the Present Disclosure]

Next, a second mode of the present disclosure will be described. First, prior to describing specific exemplary embodiments of a second mode of the present disclosure, the background of achieving the second mode of the present disclosure will be described below.

A liquid crystal display panel may have a pixel defect (dot defect) in which a black dot or a bright dot occurs in a pixel as a display defect in units of pixels. In this case, the liquid crystal display panel cannot display a desired image depending on the degree of pixel defects, and may be determined as a defective product. A bright dot caused by a pixel which is always white is a particularly significant problem in pixel defects. Therefore, a technique is known in which, when a bright dot is found at the inspection step, the pixel that causes the bright dot is converted into black so as to always display black.

Pixels that are converted into black to eliminate pixel defects due to bright spots cannot be driven. In view of this, a technique described below has conventionally been known. In this technique, one pixel is divided into two sub-pixels, and each of the two sub-pixels is provided with a pixel electrode and a thin film transistor. Thus, when a bright dot occurs in the pixel, one of the two sub-pixels is converted into black (dark dot), and the other sub-pixel is normally driven (for example, Unexamined Japanese Patent Publication No. 2011-191791).

However, when one pixel is divided into two sub-pixels and each of the two sub-pixels is provided with a pixel electrode and a thin film transistor, a lead wire drawn from a video signal line for connecting the two thin film transistors with the video signal line passes through the pixel, which may decrease the aperture ratio of the pixel. In addition, the lead wire drawn from the video signal line overlaps the pixel electrode or a scanning line, so that electrical characteristics deteriorate due to the coupling capacitance between the lead wire and the pixel electrode or the scanning line.

One aspect of the second mode of the present disclosure has been made to solve such a problem, and aims to provide a liquid crystal display panel capable of suppressing a decrease in aperture ratio and deterioration in electrical characteristics even when one pixel is divided into a plurality of sub-pixels, and a plurality of transistors is disposed in each of the sub-pixels.

In order to achieve the above object, a liquid crystal display panel according to one aspect of the second mode of the present disclosure is a liquid crystal display panel having a plurality of pixels arrayed in a matrix, the liquid crystal display panel including: a plurality of first signal lines extending in a row direction or a column direction; a first transistor and a second transistor which are provided in each of the plurality of pixels; and a pixel electrode provided in each of the plurality of pixels and connected to the first signal line corresponding to the pixel via the first transistor and the second transistor corresponding to the pixel, wherein, in each of the plurality of pixels, the pixel electrode includes a first pixel electrode and a second pixel electrode that are separated across the first signal line corresponding to the pixel, the first transistor and the second transistor are separated across the first signal line corresponding to the pixel, the first transistor is connected to the first pixel electrode, and the second transistor is connected to the second pixel electrode.

According to the second mode of the present disclosure, even when a single pixel is divided into a plurality of sub-pixels and a plurality of transistors is disposed in each of the sub-pixels, a decrease in aperture ratio and deterioration in electrical characteristics can be suppressed.

Hereinafter, fourth and fifth exemplary embodiments will be described as specific examples of the second mode of the present disclosure.

FOURTH EXEMPLARY EMBODIMENT

A liquid crystal display device according to the fourth exemplary embodiment has the same configuration as liquid crystal display device 1 according to the first exemplary embodiment shown in FIG. 1, and includes liquid crystal display panel 2C, backlight 3, image processor 4, source driver 5, and gate driver 6.

The liquid crystal display device in the present exemplary embodiment differs from liquid crystal display device 1 in the first exemplary embodiment in the configuration of liquid crystal display panel 2C. The other configurations are the same as those of the first exemplary embodiment, and therefore, the following description will focus on the differences from the first exemplary embodiment.

Figure 18:
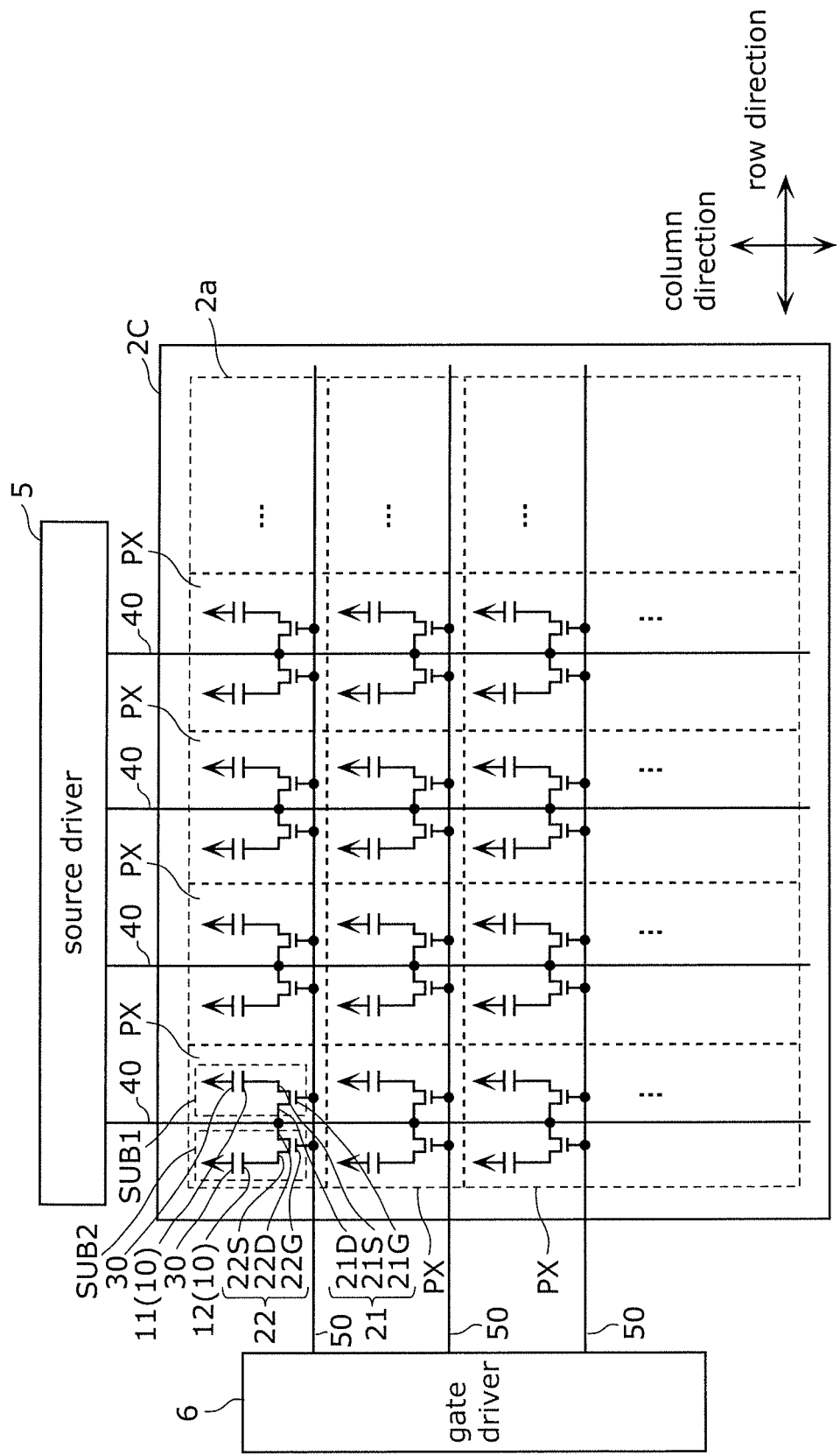
FIG. 18 is a diagram showing a pixel circuit of liquid crystal display panel according to a fourth exemplary embodiment.

First, the configuration of liquid crystal display panel 2C according to the present exemplary embodiment will be described with reference to FIG. 18. FIG. 18 is a diagram showing a pixel circuit of liquid crystal display panel 2C according to the fourth exemplary embodiment.

As shown in FIG. 18, liquid crystal display panel 2C includes pixel electrodes 10 respectively provided in a plurality of pixels PX, first transistors 21 and second transistors 22 respectively provided in the plurality of pixels PX, and common electrodes 30. Liquid crystal display panel 2C also includes video signal lines (data lines) 40 that are a plurality of first signal lines extending in a column direction and scanning lines (gate lines) 50 that are a plurality of second signal lines extending in a row direction orthogonal to the column direction.

In each of the plurality of pixels PX, pixel electrode 10 is connected to video signal line 40 and scanning line 50 corresponding to pixel PX via first transistor 21 and second transistor 22 corresponding to pixel PX.

Liquid crystal display panel 2C in the present exemplary embodiment is of a type in which a pixel is divided. Specifically, in liquid crystal display panel 2C, one pixel PX is divided into a plurality of sub-pixels (divided pixels), and pixel electrodes and transistors are provided so as to correspond to the plurality of sub-pixels, respectively. Specifically, one pixel PX is divided into two pixel regions, first sub-pixel SUB1 and second sub-pixel SUB2. First sub-pixel SUB1 includes first pixel electrode 11 and first transistor 21, and second sub-pixel SUB2 includes second pixel electrode 12 and second transistor 22. First sub-pixel SUB1 is controlled by first pixel electrode 11 and first transistor 21, and second sub-pixel SUB2 is controlled by second pixel electrode 12 and second transistor 22.

First transistors 21 and second transistors 22 of the respective pixels PX are arrayed along the direction in which scanning lines 50 extend. Specifically, first transistors 21 and second transistors 22 of respective pixels PX are provided at positions overlapping scanning lines 50 in a planar view.

First transistor 21 is a thin film transistor and includes gate electrode 21G, source electrode 21S, and drain electrode 21D. Similarly, second transistor 22 is a thin film transistor and includes gate electrode 22G, source electrode 22S, and drain electrode 22D. Note that, in this specification, source electrode 21S and drain electrode 21D may be collectively referred to as a source/drain electrode, and the source/drain electrode refers to at least one of source electrode 21S and drain electrode 21D, either of source electrode 21S or drain electrode 21D, or both source electrode 21S and drain electrode 21D. This also applies to source electrode 22S and drain electrode 22D of second transistor 22.

The plurality of video signal lines 40 is respectively connected to the source/drain electrodes of first transistors 21 and second transistors 22 of the plurality of pixels PX arrayed in the column direction. In the present exemplary embodiment, in each pixel PX, video signal line 40 is connected to drain electrode 21D out of source electrode 21S and drain electrode 21D of first transistor 21, and connected to drain electrode 22D out of source electrode 22S and drain electrode 22D of second transistor 22. That is, video signal lines 40 are also drain lines in the present exemplary embodiment.

The plurality of scanning lines 50 is respectively connected to first transistors 21 and second transistors 22 of the plurality of pixels PX arrayed in the row direction. Specifically, in each pixel PX, scanning line 50 is connected to gate electrode 21G of first transistor 21 and to gate electrode 22G of second transistor 22.

Figure 19:
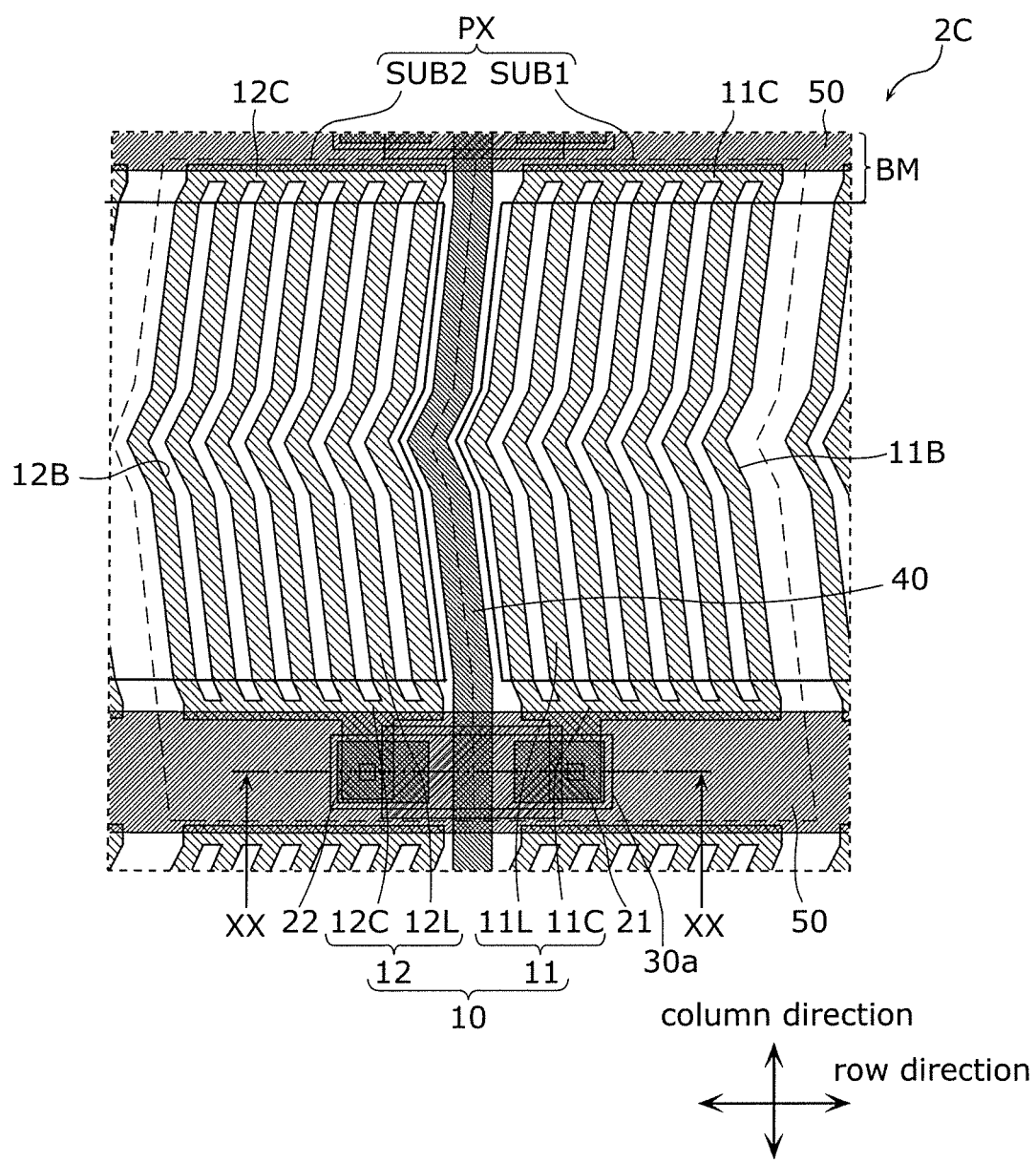
FIG. 19 is a plan view showing a layout of pixels of liquid crystal display panel according to the fourth exemplary embodiment.

Next, a specific structure of liquid crystal display panel 2C according to the fourth exemplary embodiment will be described. First, the layout of pixels PX of liquid crystal display panel 2C will be described with reference to FIG. 19 while referring to FIG. 18. FIG. 19 is a plan view showing a layout of pixels PX of liquid crystal display panel 2C according to the fourth exemplary embodiment. In FIG. 19, one pixel PX is indicated by a region enclosed by a dashed line, and a dashed line on video signal line 40 indicates a boundary between two sub-pixels in one pixel PX. When liquid crystal display panel 2C displays a color image, each of the plurality of pixels PX is any one of a red pixel, a green pixel, and a blue pixel. As an example, a red pixel, a green pixel, and a blue pixel are repeatedly arrayed in the row direction in a set of three.

As shown in FIG. 19, the plurality of video signal lines 40 extending in the column direction is formed to be partially bent in a "lateral-V" shape within each pixel PX. In the present exemplary embodiment, the plurality of video signal lines 40 has the same width. The plurality of video signal lines 40 may be linearly formed without being partially bent.

The scanning lines 50 extending in the row direction are each linear and formed so as to be parallel to each other, as in the first exemplary embodiment. In the present exemplary embodiment, the plurality of scanning lines 50 also has the same width. Note that the width of one scanning line 50 is larger than the width of one video signal line 40.

As described above, each of the plurality of pixels PX includes first sub-pixel SUB1 and second sub-pixel SUB2 as pixel regions (divided pixels) separated from each other in the row direction across video signal line 40. Therefore, the boundary between first sub-pixel SUB1 and second sub-pixel SUB2 overlaps black matrix BM (non-opening portion) that covers video signal lines 40.

As shown in FIGS. 18 and 19, in each of the plurality of pixels PX, pixel electrode 10 includes first pixel electrode 11 and second pixel electrode 12 which are separated in the row direction across video signal line 40 corresponding to pixel PX, as in the first exemplary embodiment. That is, in each pixel PX, first pixel electrode 11 and second pixel electrode 12 are separated in the row direction across one video signal line 40 corresponding to pixel PX.

Similar to first pixel electrode 11 and second pixel electrode 12, in each pixel PX, first transistor 21 and second transistor 22 are separated in the row direction across one video signal line 40 corresponding to pixel PX. That is, first transistor 21 and second transistor 22 are provided at positions facing each other across video signal line 40. Specifically, first transistor 21 and second transistor 22 are provided at positions that are symmetric with respect to video signal line 40.

First transistor 21 is connected to first pixel electrode 11 provided in first sub-pixel SUB1, and second transistor 22 is connected to second pixel electrode 12 provided in second sub-pixel SUB2. Accordingly, first pixel electrode 11 is connected to video signal line 40 via first transistor 21, and second pixel electrode 12 is connected to video signal line 40 via second transistor 22. In the present exemplary embodiment, first pixel electrode 11 and second pixel electrode 12 are not directly connected.

The mode for driving liquid crystal of liquid crystal display panel 2C in the present exemplary embodiment is a transverse electric field mode. That is, first pixel electrode 11 and second pixel electrode 12 are configured to be capable of driving the liquid crystal layer by a transverse electric field. Specifically, as shown in FIG. 19, first pixel electrode 11 and second pixel electrode 12 are respectively formed with a plurality of slits, and thus, first pixel electrode 11 includes the plurality of first line electrodes 11L, and second pixel electrode 12 includes the plurality of second line electrodes 12L.

Both ends of the plurality of first line electrodes 11L are connected by a pair of first connection electrodes 11C. Specifically, one ends in the longitudinal direction of the plurality of first line electrodes 11L are connected to each other by first connection electrode 11C on one side, and the other ends in the longitudinal direction are connected to each other by first connection electrode 11C on the other side. All of first line electrodes 11L of first pixel electrode 11 are formed in parallel. Note that one of the pair of first connection electrodes 11C may not be provided. In this case, first pixel electrode 11 has a comb shape.

First line electrodes 11L have the same width and are formed into a substantially "lateral-V" shape having a bent portion at the central portion. As a result, multi domains can be formed in first sub-pixel SUB1, so that the color viewing angle characteristics of first sub-pixel SUB1 can be improved. In first pixel electrode 11, the distance (slit width) between two adjacent first line electrodes 11L is constant.

Similarly, both ends of the plurality of second line electrodes 12L are connected by a pair of second connection electrodes 12C. Specifically, one ends in the longitudinal direction of the plurality of second line electrodes 12L are connected to each other by second connection electrode 12C on one side, and the other ends in the longitudinal direction are connected to each other by second connection electrode 12C on the other side. All of second line electrodes 12L in second pixel electrode 12 are formed in parallel. Note that one of the pair of second connection electrodes 12C may not be provided. In this case, second pixel electrode 12 has a comb shape.

Second line electrodes 12L have the same width and are formed into a substantially "lateral-V" shape having a bent portion at the central portion. As a result, multi domains can be formed in second sub-pixel SUB2, so that the color viewing angle characteristics of second sub-pixel SUB2 can be improved. In second pixel electrode 12, the distance (slit width) between two adjacent second line electrodes 12L is constant.

In the present exemplary embodiment, first pixel electrode 11 and second pixel electrode 12 have the same shape. That is, the plurality of first line electrodes 11L and the plurality of second line electrodes 12L are formed in the same pattern. Therefore, the bent portions of first line electrodes 11L and the bent portions of second line electrodes 12L are bent in the same direction. Further, the bent portions of first line electrodes 11L and the bent portions of second line electrodes 12L are provided at the same position as the bent portion of video signal line 40 and bent in the same direction as the bent portion of video signal line 40.

Further, each of first line electrodes 11L includes first bent portion 11B which is inclined more than the multi-domain bent portion formed at the central portion of first line electrode 11L. Similarly, each of second line electrodes 12L includes second bent portion 12B which is inclined more than the multi-domain bent portion formed at the central portion of second line electrode 12L.

Figure 20:
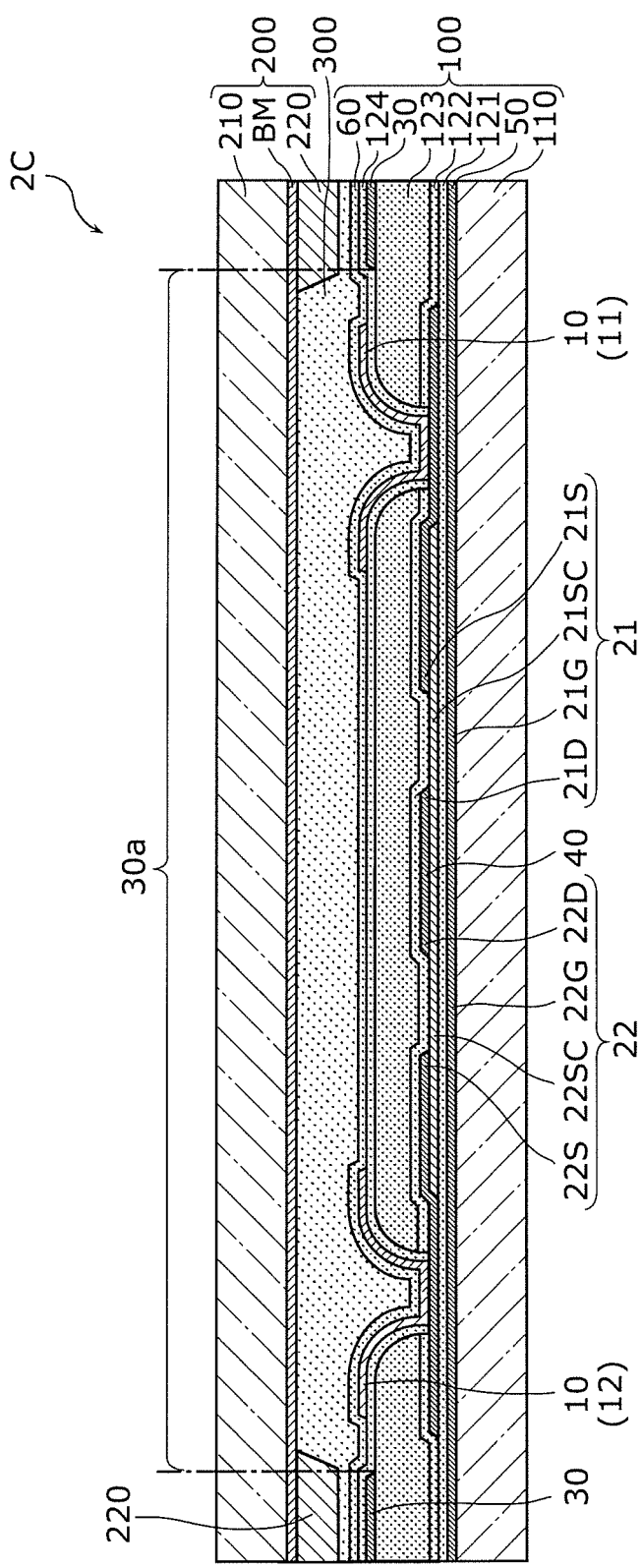
FIG. 20 is a sectional view of liquid crystal display panel according to the fourth exemplary embodiment.

Next, the cross-sectional structure of liquid crystal display panel 2C will be described with reference to FIG. 20 while referring to FIGS. 18 and 19. FIG. 20 is a sectional view of liquid crystal display panel 2C taken along line XX-XX in FIG. 19.

As shown in FIG. 20, liquid crystal display panel 2C includes first substrate 100, second substrate 200 facing first substrate 100, and liquid crystal layer 300 disposed between first substrate 100 and second substrate 200, as in liquid crystal display panel 2 in the first exemplary embodiment.

First substrate 100 is provided with TFTs as first transistors 21 and second transistors 22. Specifically, a plurality of first transistors 21 and a plurality of second transistors 22 are formed on first substrate 100 in a matrix. First substrate 100 includes not only first transistors 21 and second transistors 22 but also various wirings such as video signal lines 40 and scanning lines 50, an interlayer insulating film that insulates these wirings from each other, pixel electrode 10, common electrode 30, alignment film 60, and the like.

First transistors 21 and second transistors 22 are formed on first transparent base 110. Each of first transistors 21 includes gate electrode 21G, source electrode 21S, drain electrode 21D, and semiconductor layer 21SC serving as a channel layer. Similarly, each of second transistors 22 includes gate electrode 22G, source electrode 22S, drain electrode 22D, and semiconductor layer 22SC serving as a channel layer. In the present exemplary embodiment, first transistors 21 and second transistors 22 are TFTs having a bottom gate structure, and include gate electrodes 21G and 22G formed on first transparent base 110, first gate insulating film 121 formed on gate electrodes 21G and 22G and serving as a gate insulator, and semiconductor layers 21SC and 22SC respectively formed above gate electrodes 21G and 22G with first insulating film 121 interposed therebetween. Source electrode 21S and drain electrode 21D are formed on semiconductor layer 21SC. Source electrode 22S and drain electrode 22D are formed on semiconductor layer 22SC.

Gate electrodes 21G and 22G have the same configuration as gate electrode 20G in the first exemplary embodiment. Semiconductor layers 21SC and 22SC have the same configuration as semiconductor layer 20SC in the first exemplary embodiment. In FIG. 20, two drain electrodes are formed on one semiconductor layer. Source electrodes 21S and 22S and drain electrodes 21D and 22D have the same configuration as source electrode 20S and drain electrode 20D in the first exemplary embodiment.

As shown in FIG. 20, video signal lines 40 and scanning lines 50 are formed on first substrate 100. Video signal lines 40 are formed in the same metal layer as source electrodes 21S and 22S and drain electrodes 21D and 22D. That is, video signal lines 40, source electrodes 21S and 22S, and drain electrodes 21D and 22D are formed by patterning the same metal film. On the other hand, scanning lines 50 are formed in the same metal layer as gate electrodes 21G and 22G. That is, scanning lines 50 and gate electrodes 21G and 22G are formed by patterning the same metal film.

As shown in FIG. 20, in the present exemplary embodiment, source electrode 21S of first transistor 21 is connected to first pixel electrode 11 through a contact hole. Drain electrode 21D of first transistor 21 is connected to video signal line 40. Similarly, source electrode 22S of second transistor 22 is connected to second pixel electrode 12 through a contact hole. Drain electrode 22D of second transistor 22 is connected to video signal line 40.

Second insulating film 122 is formed on first transparent base 110 so as to cover first transistors 21, second transistors 22, video signal lines 40, and scanning lines 50.

Further, third insulating film 123 is formed so as to cover second insulating film 122 as in the first exemplary embodiment described above.

In the present exemplary embodiment, common electrode 30 is formed on third insulating film 123. Fourth insulating film 124 is formed so as to cover common electrode 30, and pixel electrode 10 is formed on fourth insulating film 124 in a predetermined pattern.

Opening 30a is formed in common electrode 30, which is a thin-film planar solid electrode, in an area above scanning line 50 in order to connect source electrode 21S of first transistor 21 and first pixel electrode 11 and to connect source electrode 22S of second transistor 22 and second pixel electrode 12, as shown in FIGS. 19 and 20. Accordingly, opening 30a in common electrode 30 is formed with a contact hole that penetrates an insulating layer with a three-layer structure having second insulating film 122, third insulating film 123, and fourth insulating film 124. Therefore, in each pixel PX, source electrode 21S of first transistor 21 and first pixel electrode 11 are connected to each other via the contact hole, and source electrode 22S of second transistor 22 and second pixel electrode 12 are connected to each other via the contact hole.

Figure 21:
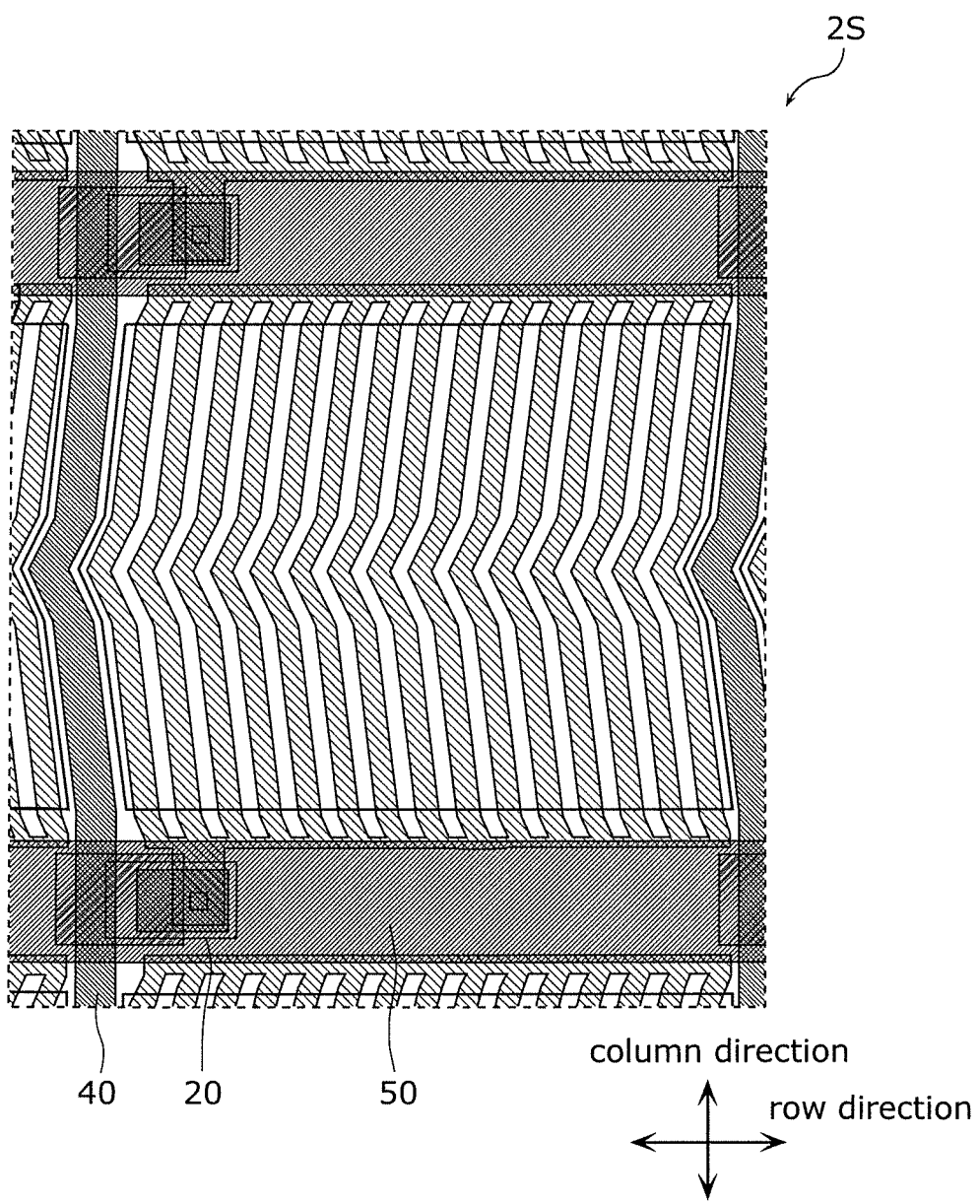
FIG. 21 is a view showing a pixel layout of liquid crystal display panel according to a fifth comparative example.
Figure 22:
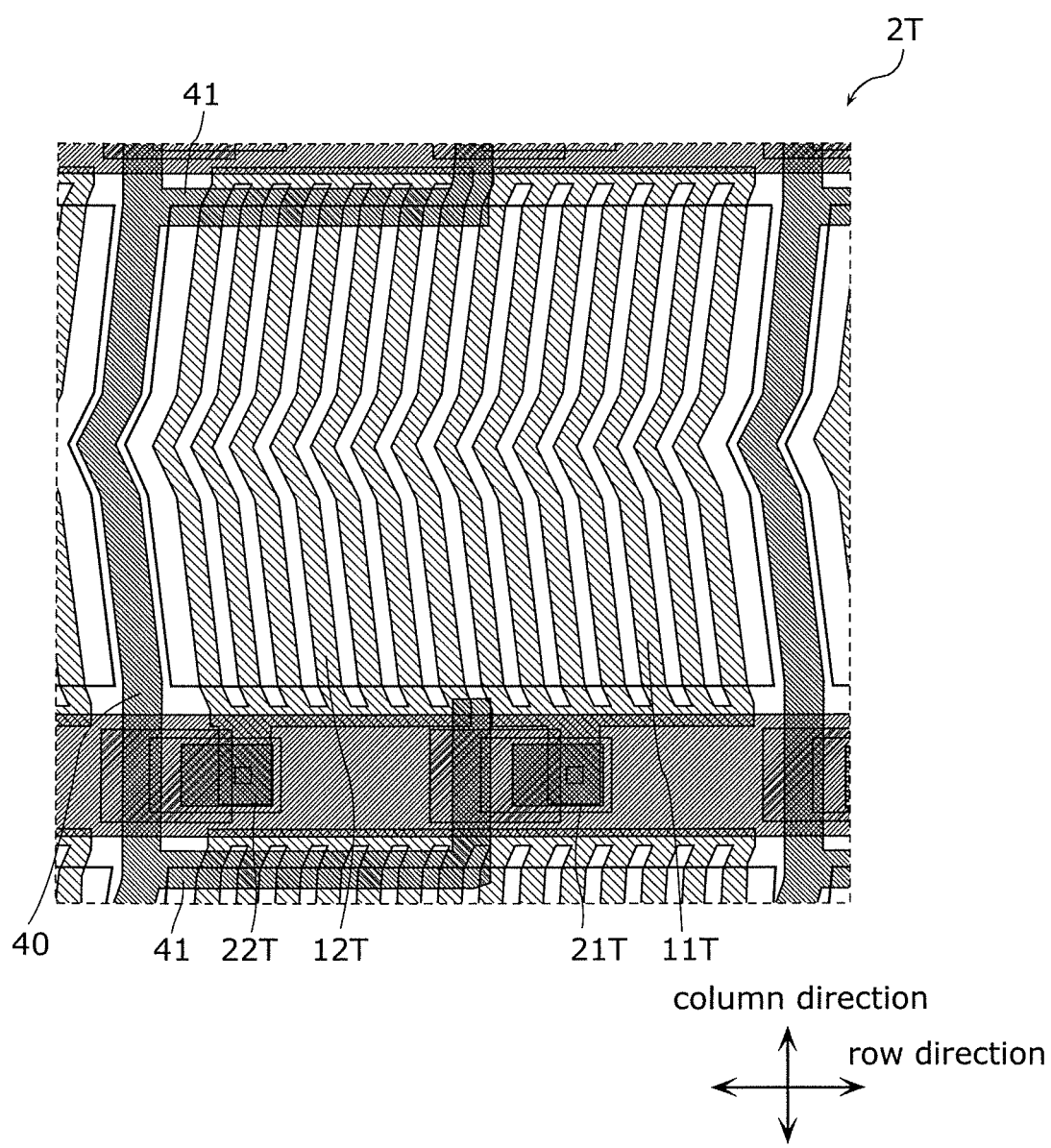
FIG. 22 is a view showing a pixel layout of liquid crystal display panel according to a sixth comparative example.

Next, effects of liquid crystal display panel 2C according to the fourth exemplary embodiment will be described with reference to FIGS. 21 and 22, along with the background of the present exemplary embodiment. FIG. 21 is a view showing a pixel layout of liquid crystal display panel 2S according to a fifth comparative example. FIG. 22 is a view showing a pixel layout of liquid crystal display panel 2T according to a sixth comparative example.

Liquid crystal display panel 2S according to the fifth comparative example shown in FIG. 21 is a transverse electric field mode liquid crystal display panel of a multi-domain type in which a pixel is not divided.

As shown in FIG. 21, if transverse electric field mode liquid crystal display panel 2S in which a pixel is not divided has a bright dot in a pixel as a pixel defect, this liquid crystal display panel may be determined to be a defective product.

In view of this, a technique of dividing one pixel into two sub-pixels and providing pixel electrodes and thin film transistors to the two sub-pixels, respectively, has been proposed. Specifically, it is considered that, as in liquid crystal display panel 2T according to the sixth comparative example shown in FIG. 22, one pixel is divided into two sub-pixels, wherein first pixel electrode 11T and first transistor 21T are provided to one of the two sub-pixels, and second pixel electrode 12T and second transistor 22T are provided to the other of the two sub-pixels. With this configuration, when a bright dot occurs in the pixel, one of the two sub-pixels is converted into black, and the other sub-pixel that does not cause a bright dot can be operated normally.

However, in the configuration like liquid crystal display panel 2T according to the sixth comparative example shown in FIG. 22, lead wire 41 drawn from video signal line 40 in order to connect two transistors, that is, first transistor 21T and second transistor 22T, to video signal line 40 passes through the pixel, resulting in that the aperture ratio of pixel PX decreases. In addition, when lead wire 41 drawn from video signal line 40 is intended to be connected to first transistor 21T which is farther from video signal line 40 than second transistor 22T, a region where lead wire 41 and the common electrode overlap each other is increased, resulting in that the electrical characteristics deteriorate due to the coupling capacitance between lead wire 41 and the common electrode.

In this case, it is possible to route lead wire 41 such that lead wire overlaps scanning line 50 without overlapping first pixel electrode 11T. However, electrical characteristics further deteriorate, because the coupling capacitance between scanning line 50 and video signal line 40 (lead wire 41) is greater than the coupling capacitance between the common electrode and video signal line 40 (lead wire 41).

As a result of intensive studies on such problems, the inventors of the present disclosure have found that a decrease in aperture ratio and deterioration in electrical characteristics can be suppressed by designing a layout within a pixel even in a transverse electric field mode liquid crystal display panel of a type in which a pixel is divided and a plurality of transistors is disposed within the pixel.

Specifically, liquid crystal display panel 2C according to the present exemplary embodiment is a transverse electric field mode liquid crystal display panel of a type in which a pixel is divided, wherein video signal line 40 crosses the central portion of one pixel PX, and one pixel PX is divided into two, first sub-pixel SUB1 and second sub-pixel SUB2, with video signal line 40 as a boundary, as shown in FIG. 19.

First pixel electrode 11 and first transistor 21 provided corresponding to first sub-pixel SUB1, and second pixel electrode 12 and second transistor 22 provided corresponding to second sub-pixel SUB2 are separated in the row direction across video signal line 40. That is, first pixel electrode 11 and first transistor 21 are provided on one side in the row direction with respect to video signal line 40, and second pixel electrode 12 and second transistor 22 are provided on the other side in the row direction with respect to video signal line 40.

With this configuration, it is possible to connect first transistor 21 and second transistor 22 to video signal line 40 without unnecessarily extending a lead wire drawn from video signal line 40. For example, even if a lead wire is drawn from video signal line 40 to connect first transistor 21 and second transistor 22 to video signal line 40, it is not necessary to overlay the lead wire with first pixel electrode 11 or second pixel electrode 12 or with scanning line 50. Alternatively, a part of video signal line 40 is used as a source/drain electrode, whereby first transistor 21 and second transistor 22 can be connected to video signal line 40 without drawing a lead wire from video signal line 40.

Thus, even when one pixel PX is divided into first sub-pixel SUB1 and second sub-pixel SUB2, first sub-pixel SUB1 is provided with first pixel electrode 11 and first transistor 21, and second sub-pixel SUB2 is provided with second pixel electrode 12 and second transistor 22, a decrease in aperture ratio and deterioration in electrical characteristics can be suppressed. That is, even in liquid crystal display panel 2C of a type in which a pixel is divided, it is possible to suppress a decrease in aperture ratio and deterioration in electrical characteristics.

Further, in liquid crystal display panel 2C in the present exemplary embodiment, a measure against pressed domain is provided in each pixel PX.

Here, the pressed domain indicates a domain generated such that, when the surface of a liquid crystal display panel is pressed with a finger or the like, liquid crystal molecules rotate in the pressed portion due to, for example, a partial change in a distance (cell gap) between a TFT substrate and a counter substrate of a liquid crystal cell. For example, in a screen displaying white, the amount of transmitted backlight is reduced at a position where a pressed domain occurs, and the screen becomes dark at this position.

Therefore, in order to suppress such a pressed domain, each pixel PX has first bent portions 11B formed on first pixel electrode 11 and second bent portions 12B formed on second pixel electrode 12 as measures against pressed domain. Thus, a pressed domain can be further suppressed.

Further, liquid crystal display panel 2C according to the present exemplary embodiment is a transverse electric field mode liquid crystal display panel of an intra-pixel multi-domain type. Specifically, first pixel electrode 11 and second pixel electrode 12 are respectively formed with multi-domain bent portions, whereby two domains are respectively formed in first sub-pixel SUB1 and second sub-pixel SUB2 which are formed by dividing one pixel PX.

Thus, liquid crystal display panel 2C having wide viewing angle characteristics and excellent color viewing angle characteristics can be achieved.

FIFTH EXEMPLARY EMBODIMENT

Figure 23:
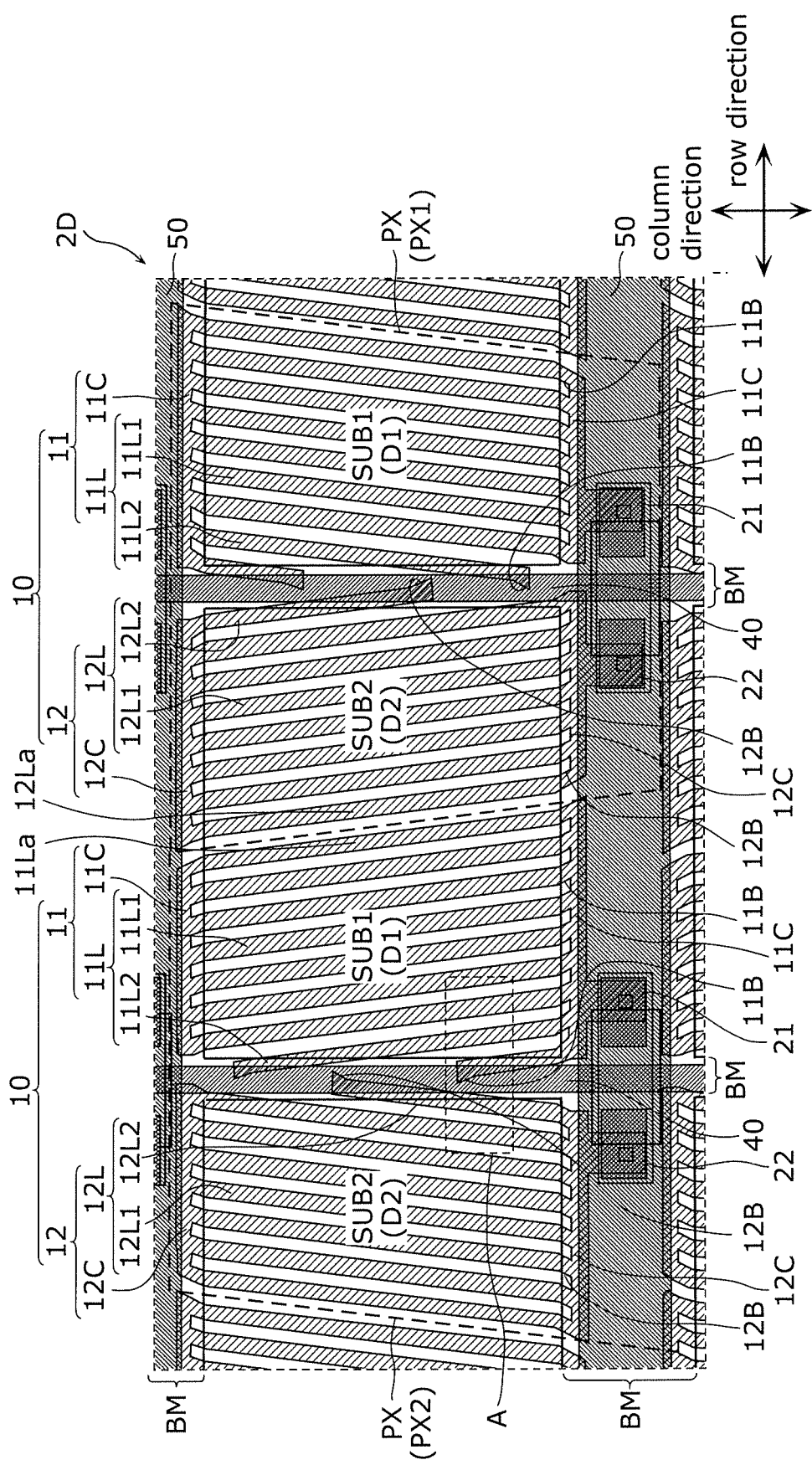
FIG. 23 is a plan view showing a layout of pixels of liquid crystal display panel according to the fifth exemplary embodiment.
Figure 24:
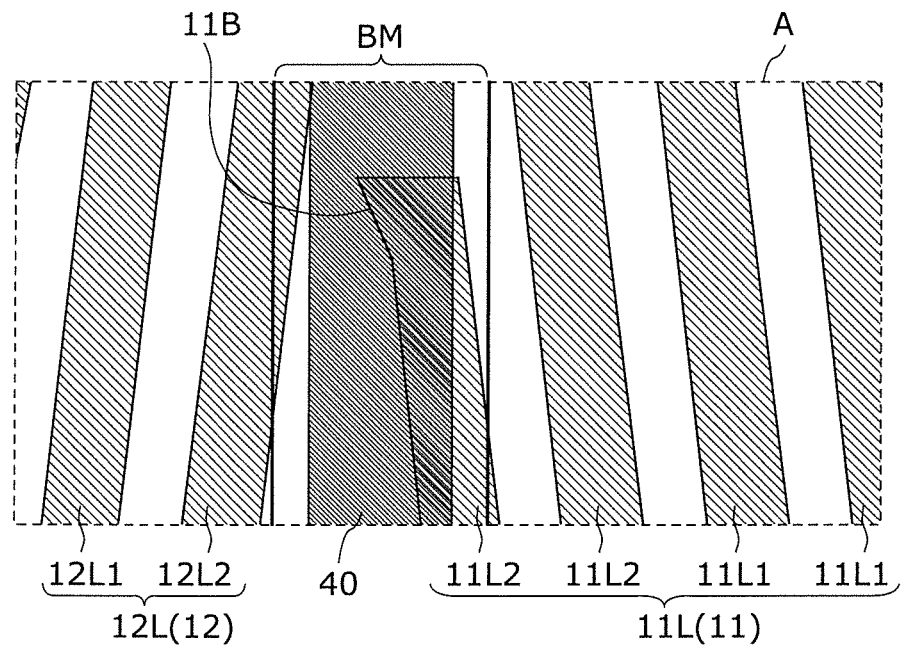
FIG. 24 is a partial enlarged view of pixels in liquid crystal display panel according to the fifth exemplary embodiment.

Next, a fifth exemplary embodiment will be described with reference to FIGS. 23 and 24. FIG. 23 is a plan view showing a layout of pixels PX of liquid crystal display panel 2D used in a liquid crystal display device according to the fifth exemplary embodiment. FIG. 24 is a partial enlarged view of liquid crystal display panel 2D, and shows an enlarged view of region A enclosed by a dashed line in FIG. 23. In FIG. 24, one pixel PX is indicated by a region enclosed by a dashed trapezoid.

Liquid crystal display panel 2D in the present exemplary embodiment is a liquid crystal display panel of a type in which a pixel is divided. Specifically, one pixel PX is divided into a plurality of sub-pixels (divided pixels) as in liquid crystal display panel 2C according to the fourth exemplary embodiment. Specifically, one pixel PX is divided into two pixel regions, first sub-pixel SUB1 and second sub-pixel SUB2. In the present exemplary embodiment, first sub-pixel SUB1 and second sub-pixel SUB2 are separated in the row direction across video signal line 40.

As in the fourth exemplary embodiment, first sub-pixel SUB1 includes first pixel electrode 11 and first transistor 21, and second sub-pixel SUB2 includes second pixel electrode 12 and second transistor 22.

Further, liquid crystal display panel 2D in the present exemplary embodiment is also a liquid crystal display panel of an intra-pixel multi-domain type as in the first exemplary embodiment shown in FIG. 3. Specifically, liquid crystal display panel 2D has a plurality of domains in one pixel PX. Specifically, one pixel PX has a first domain and a second domain.

In this case, in liquid crystal display panel 2D in the present exemplary embodiment, first sub-pixel SUB1 serves as the first domain, and second sub-pixel SUB2 serves as the second domain. Therefore, each of the plurality of pixels PX includes the first domain (first sub-pixel SUB1) and the second domain (second sub-pixel SUB2) separated from each other in the row direction across video signal line 40 corresponding to pixel PX. That is, each pixel PX is divided into first domain D1 and second domain D2 across video signal line 40.

Therefore, in the present exemplary embodiment, not only the boundary between first sub-pixel SUB1 and second sub-pixel SUB2 overlaps black matrix BM (non-opening portion) that covers video signal line 40 as in the fourth exemplary embodiment, but also the boundary (domain boundary) between the first domain and the second domain overlaps black matrix BM (non-opening portion) that covers video signal line 40.

As described above, in the present exemplary embodiment, pixel electrode 10 includes first pixel electrode 11 provided in first sub-pixel SUB1 serving as the first domain and second pixel electrode 12 provided in second sub-pixel SUB2 serving as the second domain. That is, pixel electrode 10 is divided into first pixel electrode 11 and second pixel electrode 12 across video signal line 40. First sub-pixel SUB1 serving as the first domain is controlled by first pixel electrode 11 and first transistor 21, and second sub-pixel SUB2 serving as the second domain is controlled by second pixel electrode 12 and second transistor 22.

In the present exemplary embodiment, video signal lines 40 extending in the column direction are each linear and formed so as to be parallel to each other. In the present exemplary embodiment, a plurality of video signal lines 40 also has the same width.

In the present exemplary embodiment, first pixel electrode 11 and second pixel electrode 12 are also formed with a plurality of slits as shown in FIG. 23, but the patterns of first pixel electrode 11 and second pixel electrode 12 are different from those in the fourth exemplary embodiment. Specifically, the patterns of first pixel electrode 11 and second pixel electrode 12 in the present exemplary embodiment are the same as the patterns of first pixel electrode 11 and second pixel electrode 12 in the first exemplary embodiment shown in FIG. 3. Therefore, in the present exemplary embodiment, first pixel electrode 11 includes the plurality of first line electrodes 11L extending in a stripe pattern in a first direction, and second pixel electrode 12 includes the plurality of second line electrodes 12L extending in a stripe pattern in a second direction different from the first direction.

As in the first exemplary embodiment, in each of the plurality of pixels PX, the tip of at least one of the plurality of first line electrodes 11L from among the plurality of first line electrodes 11L and the tip of at least one of the plurality of second line electrodes 12L from among the plurality of second line electrodes 12L overlap video signal line 40 corresponding to pixel PX, when viewed in a planar view.

Figure 25:
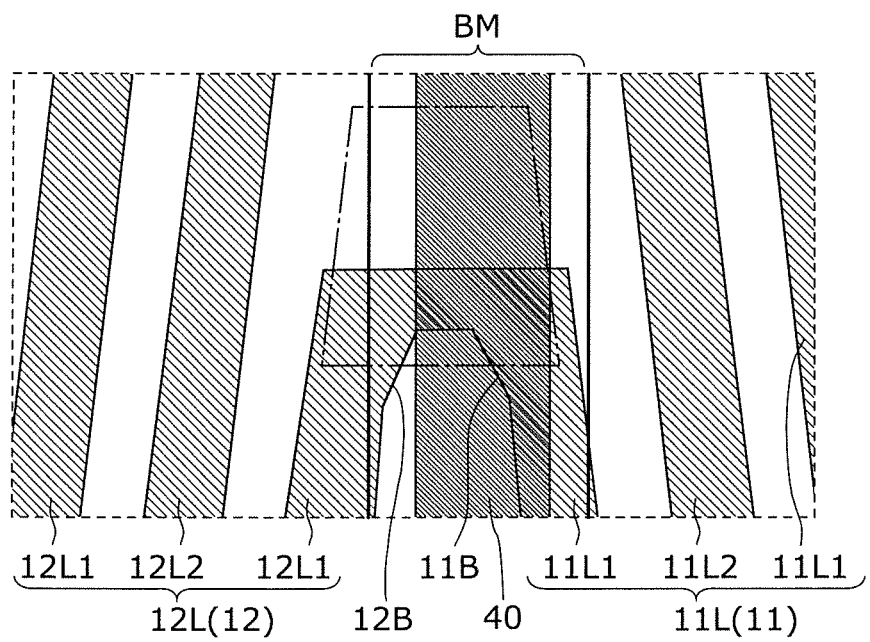
FIG. 25 is a partial enlarged view of another example of pixels in liquid crystal display panel according to the fifth exemplary embodiment.

Specifically, as shown in FIGS. 24 and 25, the tip of first finger electrode portion 11L2 of the plurality of first line electrodes 11L overlaps video signal line 40 located on the boundary between first pixel electrode 11 and second pixel electrode 12. That is, the tip of first finger electrode portion 11L2 is located at the boundary (domain boundary) between first domain D1 and second domain D2, and thus, overlaps black matrix BM (non-opening portion) covering video signal line 40.

Similarly, the tip of second finger electrode portion 12L2 of the plurality of second line electrodes 12L overlaps video signal line 40 located on the boundary between first pixel electrode 11 and second pixel electrode 12. That is, the tip of second finger electrode portion 12L2 is located at the boundary (domain boundary) between first domain D1 and second domain D2, and thus, overlaps black matrix BM (non-opening portion) covering video signal line 40.

In the present exemplary embodiment, first line electrode 11L of first pixel electrode 11 and second line electrode 12L of second pixel electrode 12 in each pixel PX are not connected to each other at a position overlapping video signal line 40 as shown in FIG. 24. However, the present disclosure is not limited thereto. For example, first line electrode 11L of first pixel electrode 11 and second line electrode 12L of second pixel electrode 12 in each pixel PX may be connected to each other at a position overlapping video signal line 40 as shown in FIG. 25. For example, first finger electrode portion 11L2 of first pixel electrode 11 and second finger electrode portion 12L2 of second pixel electrode 12 may be connected to each other. In FIG. 25, in a region enclosed by a dot-and-dash line, liquid crystal molecules are less likely to rotate, and light is not easily transmitted through this region.

In liquid crystal display panel 2D according to the present exemplary embodiment, in each pixel PX, first pixel electrode 11 has first bent portion 11B formed by bending a part of the side of at least one of the plurality of first line electrodes 11L from among the plurality of first line electrodes 11L in a direction inclined with respect to the first direction. Second pixel electrode 12 includes second bent portion 12B formed by bending a part of the side of at least one of the plurality of second line electrodes 12L in a direction inclined with respect to the second direction.

First bent portion 11B is inclined more than first line electrodes 11L extending in the stripe direction (first direction), and has a greater inclination angle with respect to the column direction. That is, first bent portion 11B has an inclination angle smaller than that of first line electrodes 11L extending in the stripe direction (first direction) with respect to the row direction.

Similarly, second bent portion 12B is inclined more than second line electrodes 12L extending in the stripe direction (second direction), and has a greater inclination angle with respect to the column direction. That is, second bent portion 12B has an inclination angle smaller than that of second line electrodes 12L extending in the stripe direction (second direction) with respect to the row direction.

As shown in FIGS. 23 and 24, first bent portion 11B of first pixel electrode 11 is formed at the tip of first finger electrode portion 11L2 in which one of both ends is open. Further, second bent portion 12B of second pixel electrode 12 is formed at the tip of second finger electrode portion 12L2 in which one of both ends is open.

In each of the plurality of pixels PX, at least one of first bent portion 11B and second bent portion 12B may overlap video signal line 40 corresponding to pixel PX. In the present exemplary embodiment, both first bent portion 11B and second bent portion 12B overlap video signal line 40.

Further, in the present exemplary embodiment, first bent portions 11B are formed not only at the tip of first line electrode 11L in which one end is open without being connected to first connection electrode 11C but also at both ends of first line electrodes 11L in which both ends are connected to first connection electrodes 11C. In other words, first bent portions 11B are also formed in connection portions (base portions) of first line electrodes 11L with first connection electrodes 11C.

Similarly, second bent portions 12B are formed not only at the tip of second line electrode 12L in which one end is open without being connected to second connection electrode 12C but also at both ends of second line electrodes 12L in which both ends are connected to second connection electrodes 12C. In other words, second bent portions 12B are also formed in connection portions (base portions) of second line electrodes 12L with second connection electrodes 12C.

As described above, according to liquid crystal display panel 2D in the present exemplary embodiment, one pixel PX is divided into two, first sub-pixel SUB1 and second sub-pixel SUB2, wherein first pixel electrode 11 and first transistor 21 which are provided corresponding to first sub-pixel SUB1 and second pixel electrode 12 and second transistor 22 which are provided corresponding to second sub-pixel SUB2 are separated from each other in the row direction across video signal line 40, as in liquid crystal display panel 2C in the fourth exemplary embodiment.

With this configuration, it is possible to connect first transistor 21 and second transistor 22 to video signal line 40 without unnecessarily extending a lead wire drawn from video signal line 40.

Thus, even when one pixel PX is divided into first sub-pixel SUB1 and second sub-pixel SUB2, first sub-pixel SUB1 is provided with first pixel electrode 11 and first transistor 21, and second sub-pixel SUB2 is provided with second pixel electrode 12 and second transistor 22, a decrease in aperture ratio and deterioration in electrical characteristics can be suppressed.

Further, liquid crystal display panel 2D according to the present exemplary embodiment is a transverse electric field mode liquid crystal display panel of an intra-pixel multi-domain type, and in each of a plurality of pixels PX, pixel electrode 10 includes first pixel electrode 11 having the plurality of first line electrodes 11L extending in a first direction in a stripe pattern, and second pixel electrode 12 having the plurality of second line electrodes 12L extending in a second direction different from the first direction in a stripe pattern.

In liquid crystal display panel 2D according to the present exemplary embodiment, first pixel electrode 11 provided in first sub-pixel SUB1 serving as first domain D1 and second pixel electrode 12 provided in second domain D2 are separated from each other in the row direction across video signal line 40.

With this configuration, the boundary (domain boundary) between first domain D1 and second domain D2 can be overlapped with black matrix BM (non-opening portion) that covers video signal line 40 (metal layer). Thus, even in liquid crystal display panel 2D of an intra-pixel multi-domain type, a decrease in aperture ratio can be suppressed.

In this case, in each of the plurality of pixels PX, the tip of at least one of the plurality of first line electrodes 11L from among the plurality of first line electrodes 11L and the tip of at least one of the plurality of second line electrodes 12L from among the plurality of second line electrodes 12L may overlap video signal line 40 corresponding to pixel PX, as in the present exemplary embodiment. In the present exemplary embodiment, in each pixel PX, the tip of first finger electrode portion 11L2 of the plurality of first line electrodes 11L and the tip of second finger electrode portion 12L2 of the plurality of second line electrodes 12L overlap the video signal line.

With this configuration, even if pixel electrode 10 is divided into first pixel electrode 11 and second pixel electrode 12 with video signal line 40 as a boundary, first pixel electrode 11 and second pixel electrode 12 can be formed up to the edge of video signal line 40, whereby a decrease in aperture ratio can be suppressed.

Further, in the present exemplary embodiment, second pixel electrode 12 of one pixel PX (for example, pixel PX1 in FIG. 23) of two adjacent pixels PX and first pixel electrode 11 of other pixel PX (for example, pixel PX2 in FIG. 23) of two adjacent pixels PX are provided between two adjacent video signal lines 40.

With this configuration, a boundary between two adjacent pixels PX can be positioned between two adjacent video signal lines 40.

In this case, in two adjacent pixels PX, second end electrode 12La located closest to the plurality of first line electrodes 11L of other pixel PX (for example, pixel PX2 in FIG. 23) from among the plurality of second line electrodes 12L in one pixel PX (for example, pixel PX1 in FIG. 23) is adjacent to first end electrode 11La located closest to the plurality of second line electrodes 12L of one pixel PX from among the plurality of first line electrodes 11L in other pixel PX.

With this configuration, first pixel electrode 11 and second pixel electrode 12 can be positioned up to the boundary between two adjacent pixels PX. That is, the boundary between two adjacent pixels PX can be positioned in an opening. Thus, a decrease in aperture ratio can be further suppressed.

In the present exemplary embodiment, in two adjacent pixels PX, the distance between first end electrode 11La of other pixel PX and second end electrode 12La of one pixel PX, the pitch of the plurality of first line electrodes 11L, and the pitch of the plurality of second line electrodes 12L are the same.

With this configuration, in two adjacent pixels PX, the pitch of pixel electrode 10 can be made uniform not only within each pixel PX but also between two adjacent pixels PX, whereby a decrease in aperture ratio can be suppressed still further.

In two adjacent pixels PX, the distance between first end electrode 11La of other pixel PX (for example, pixel PX2 in FIG. 23) and second end electrode 12La of one pixel PX (for example, pixel PX1 in FIG. 23) may be greater than the pitch of the plurality of first line electrodes 11L and the pitch of the plurality of second line electrodes 12L.

With this configuration, in two adjacent pixels PX, pixel electrode 10 of one pixel PX and pixel electrode 10 of other pixel PX, which are at different potentials, can be moved away from each other, whereby interference of the electric field between the pixels can be suppressed. Thus, electrical characteristics can be improved. When liquid crystal display panel 2A displays a color image, two adjacent pixels PX are different in color, and with the above configuration, pixel electrodes 10 of two adjacent pixels PX can be kept away from each other, whereby color mixing can be suppressed.

Further, in two adjacent pixels PX, the second direction that is the extending direction of the plurality of second line electrodes 12L in one pixel PX (for example, pixel PX1 in FIG. 23) and the first direction that is the extending direction of the plurality of first line electrodes 11L in other pixel PX (for example, pixel PX2 in FIG. 23) are the same.

With this configuration, an ineffective region existing at the boundary between two adjacent pixels PX can be reduced, so that the decrease in aperture ratio can be further suppressed.

Further, in the present exemplary embodiment, the plurality of pixels PX is aligned throughout the entire image display region, and first transistor 21 and second transistor 22 of one pixel PX and first transistor 21 and second transistor 22 of other pixel PX of two adjacent pixels PX are provided to overlap same scanning line 50. However, the present disclosure is not limited thereto.

Figure 26:
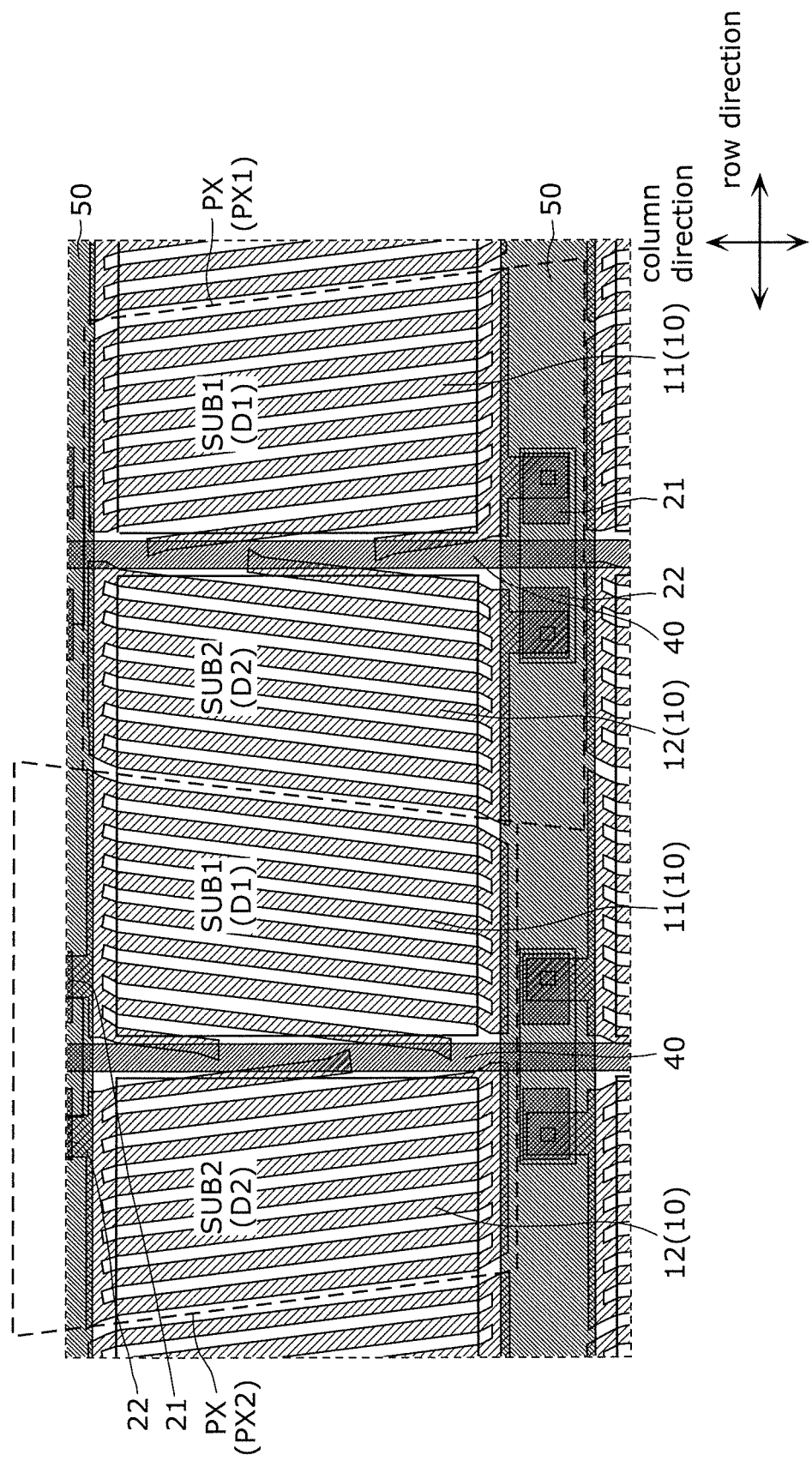
FIG. 26 is a plan view showing a layout of pixels of liquid crystal display panel according to a modification of the fifth exemplary embodiment.

For example, as shown in FIG. 26, first transistor 21 and second transistor 22 of one pixel PX (right pixel PX1 in FIG. 26) and first transistor 21 and second transistor 22 of other pixel PX (left pixel PX2 in FIG. 26) of two adjacent pixels PX may be provided to overlap different scanning lines 50. Specifically, first transistors 21 and second transistors 22 of two pixels PX adjacent to each other in the row direction may be provided at positions alternately inverted in the direction in which video signal line 40 extends for each column. That is, in FIG. 26, the plurality of pixels PX and first and second transistors 21 and 22 are arranged in a staggered manner in a vertical direction in a planar view.

With this configuration, the difference in pixel capacitance between pixel electrode 10 and common electrode 30 can be reduced for two pixels PX adjacent to each other in the row direction. For example, the pixel capacitances of two pixels PX adjacent to each other in the row direction can be made the same. Thus, the quality of a display image can be improved. In FIG. 26, one pixel PX is indicated by a region enclosed by a dashed trapezoid.

Further, in liquid crystal display panel 2D in the present exemplary embodiment, in each pixel PX, first pixel electrode 11 is formed with first bent portion 11B, and second pixel electrode 12 is formed with second bent portion 12B as measures against pressed domain, first bent portion 11B and second bent portion 12B overlapping video signal line 40.

Thus, even if first bent portion 11B and second bent portion 12B are formed as measures against pressed domain, a decrease in aperture ratio can be suppressed. That is, first bent portion 11B and second bent portion 12B as measures against pressed domain can be formed without decreasing the aperture ratio.

In this case, although first bent portion 11B may be formed on both sides of each of first line electrodes 11L, first bent portion 11B is formed only in a portion overlapping video signal line 40 in both sides of first line electrode 11L and is not formed in a portion not overlapping video signal line 40 in the present exemplary embodiment as shown in FIG. 23. Similarly, second bent portion 12B is formed only in a portion overlapping video signal line 40 in both sides of second line electrode 12L, and is not formed in a portion not overlapping video signal line 40. Specifically, first bent portion 11B is formed at the tip of first finger electrode portion 11L2, and second bent portion 12B is formed at the tip of second finger electrode portion 12L2.

As a result, first bent portion 11B and second bent portion 12B overlap video signal line 40 covered with black matrix BM, and do not overlap the slit opening. Therefore, even if first bent portion 11B and second bent portion 12B are formed as measures against pressed domain, a decrease in aperture ratio can be effectively suppressed.

(Modifications of Second Mode of the Present Disclosure)

While the liquid crystal display panel and the liquid crystal display device according to the second mode of the present disclosure have been described based on the exemplary embodiments, the present disclosure is not limited to the fourth and fifth exemplary embodiments.

For example, in the fourth and fifth exemplary embodiments, one pixel PX is divided into first sub-pixel SUB1 and second sub-pixel SUB2 across video signal line 40. However, the present disclosure is not limited thereto. Specifically, one pixel PX may be divided into first sub-pixel SUB1 and second sub-pixel SUB2 across scanning line 50. In this case, first pixel electrode 11 and first transistor 21 provided in first sub-pixel SUB1 and second pixel electrode 12 and second transistor 22 provided in second sub-pixel SUB2 are separated across scanning line 50. In the fourth and fifth exemplary embodiments, the plurality of first line electrodes 11L of first pixel electrode 11 and the plurality of second line electrodes 12L of second pixel electrode 12 mainly extend in the column direction throughout the entire image display region. On the other hand, when first sub-pixel SUB1 and second sub-pixel SUB2 are provided across scanning line 50, the plurality of first line electrodes 11L of first pixel electrode 11 and the plurality of second line electrodes 12L of second pixel electrode 12 may mainly extend in the row direction throughout the entire image display region.

The fourth and fifth exemplary embodiments describe an example where one pixel is divided into two sub-pixels. However, the present disclosure is not limited thereto. For example, one pixel may be divided into four sub-pixels as shown in FIGS. 27 to 31. In FIGS. 27 to 31, one pixel PX is indicated by a region enclosed by a dashed line.

Specifically, in FIGS. 27 to 31, when one pixel PX is divided into four quadrants about the intersection of video signal line 40 and scanning line 50, the four quadrants are assigned to first sub-pixel SUB1, second sub-pixel SUB2, third sub-pixel SUB3, and fourth sub-pixel SUB4, respectively. Pixel electrodes and transistors are respectively formed in first sub-pixel SUB1, second sub-pixel SUB2, third sub-pixel SUB3, and fourth sub-pixel SUB4. When any of the sub-pixels is converted into black, the black dot can be made imperceptible in one pixel as a whole by increasing the number of divided regions within one pixel as described above.

Figure 27:
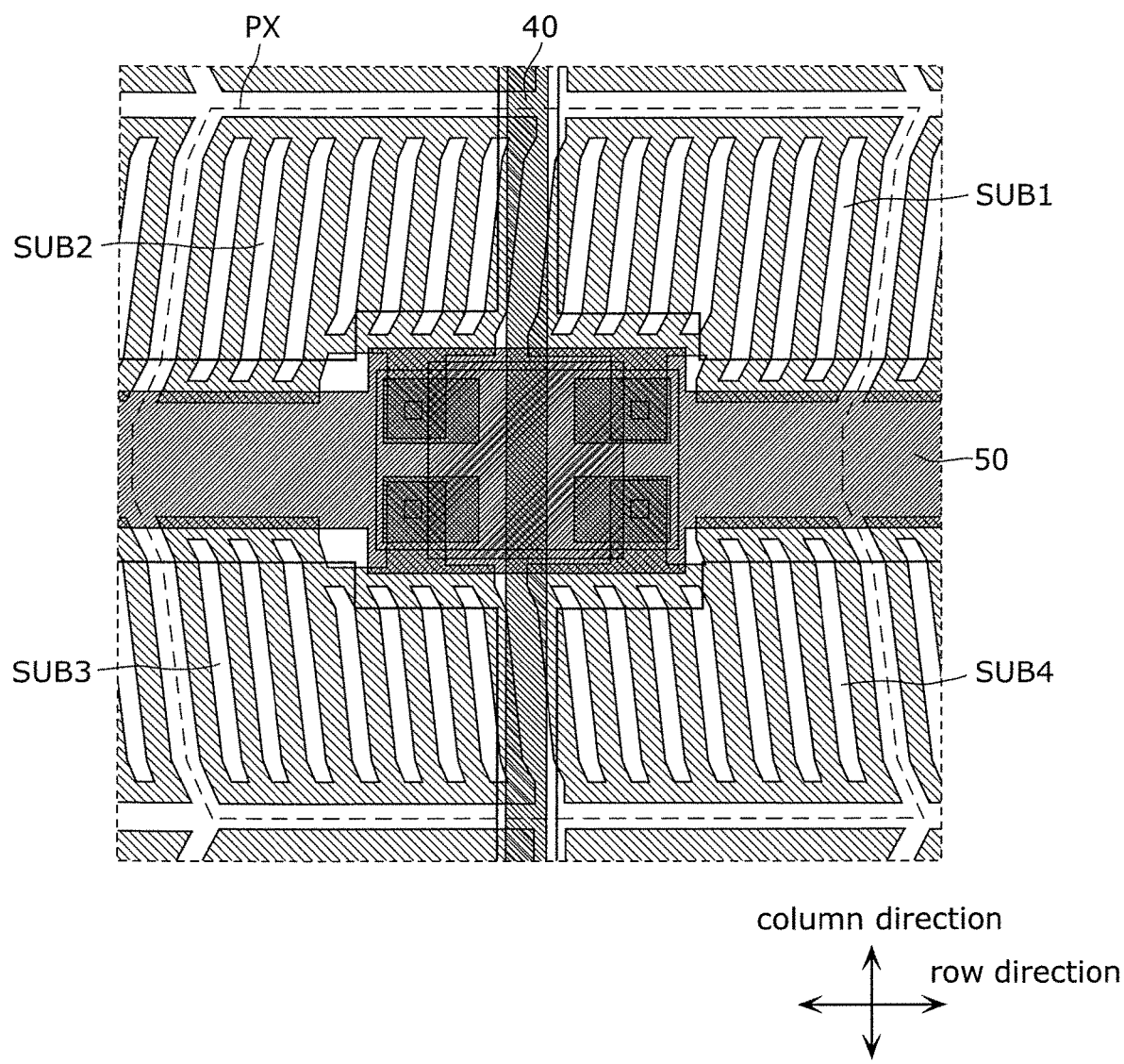
FIG. 27 is a plan view showing a layout of pixels of liquid crystal display panel according to a first modification.
Figure 28:
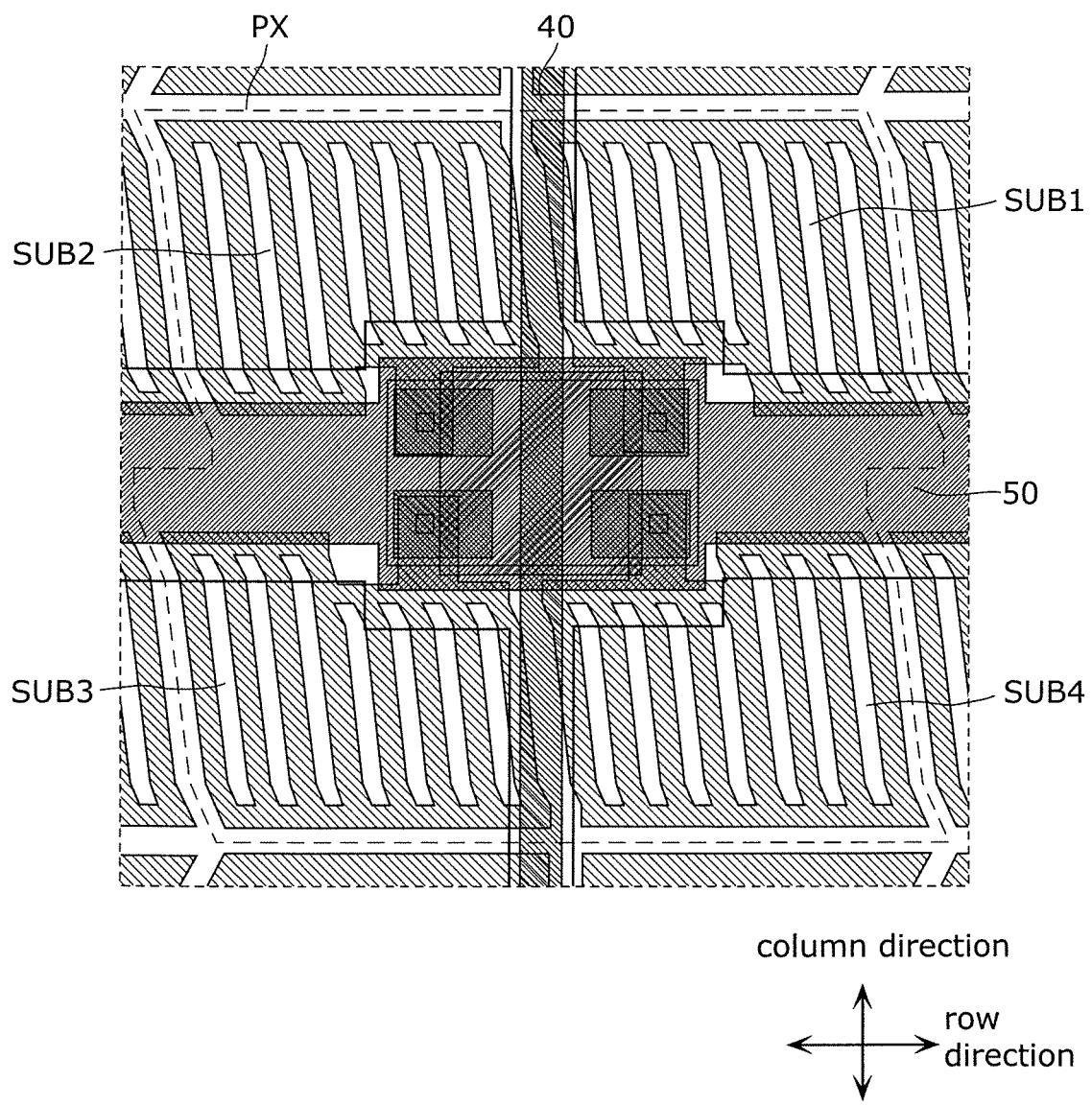
FIG. 28 is a plan view showing a layout of pixels of liquid crystal display panel according to a second modification.
Figure 29:
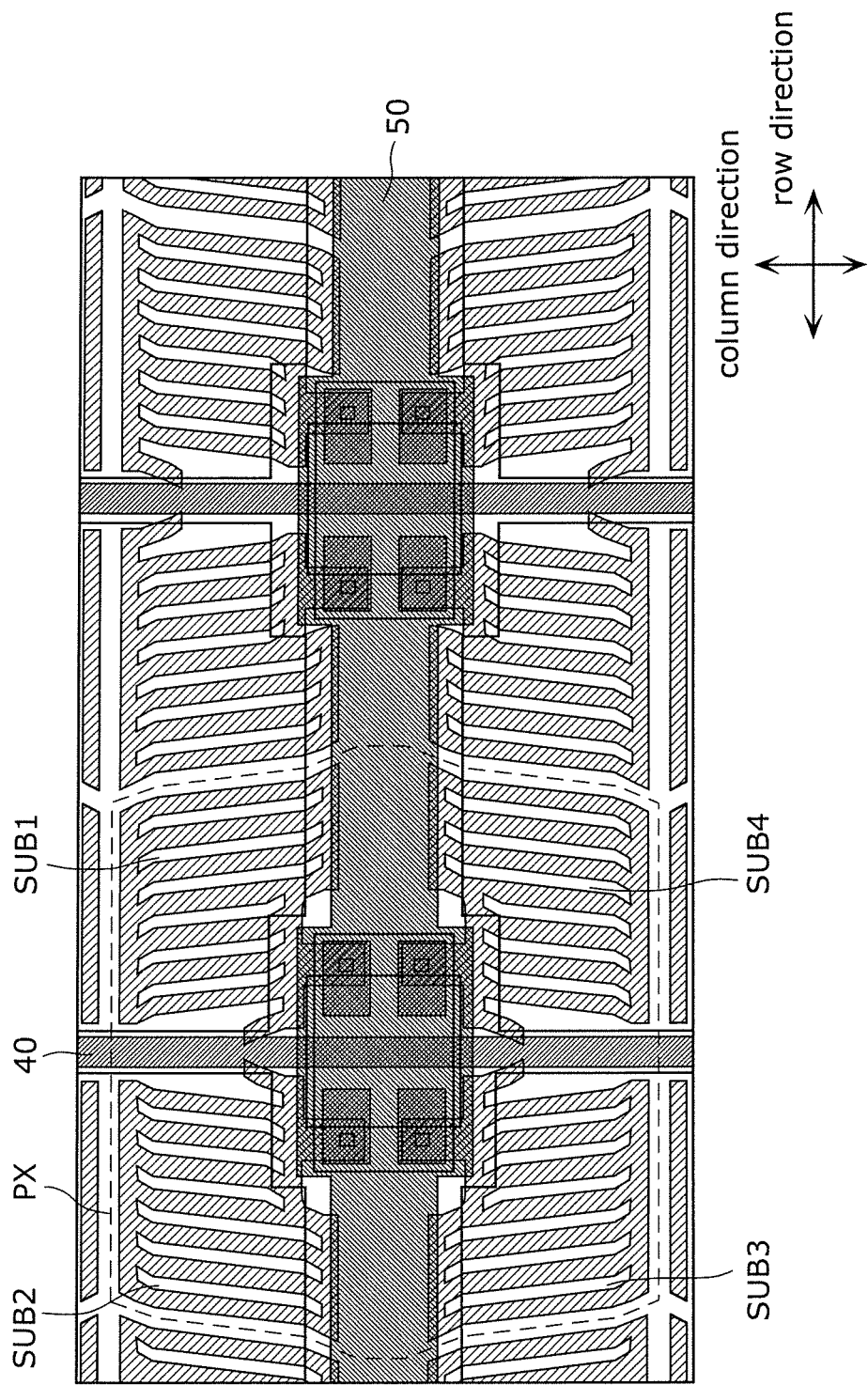
FIG. 29 is a plan view showing a layout of pixels of liquid crystal display panel according to a third modification.

In this case, in the liquid crystal display panel having the pixel layout shown in FIG. 29, line electrodes are different for each column, which may cause a difference in aperture ratio and electrical characteristics between pixels. On the other hand, in the liquid crystal display panel having the pixel layout shown in FIGS. 27 and 28, the pixel layout in each of the plurality of pixels PX is the same, and thus, there is no difference in aperture ratio and electrical characteristics between the pixels.

From another point of view, in the liquid crystal display panel having the pixel layout shown in FIG. 28, the plurality of pixels PX is arrayed in a staggered manner in a horizontal direction throughout the entire image display region, so that horizontal viewing angle characteristics are different for each row. On the other hand, in the liquid crystal display panel having the pixel layout shown in FIG. 27 and FIG. 29, a plurality of pixels PX is aligned in the entire image display region, so that excellent viewing angle characteristics can be obtained.

Figure 31:
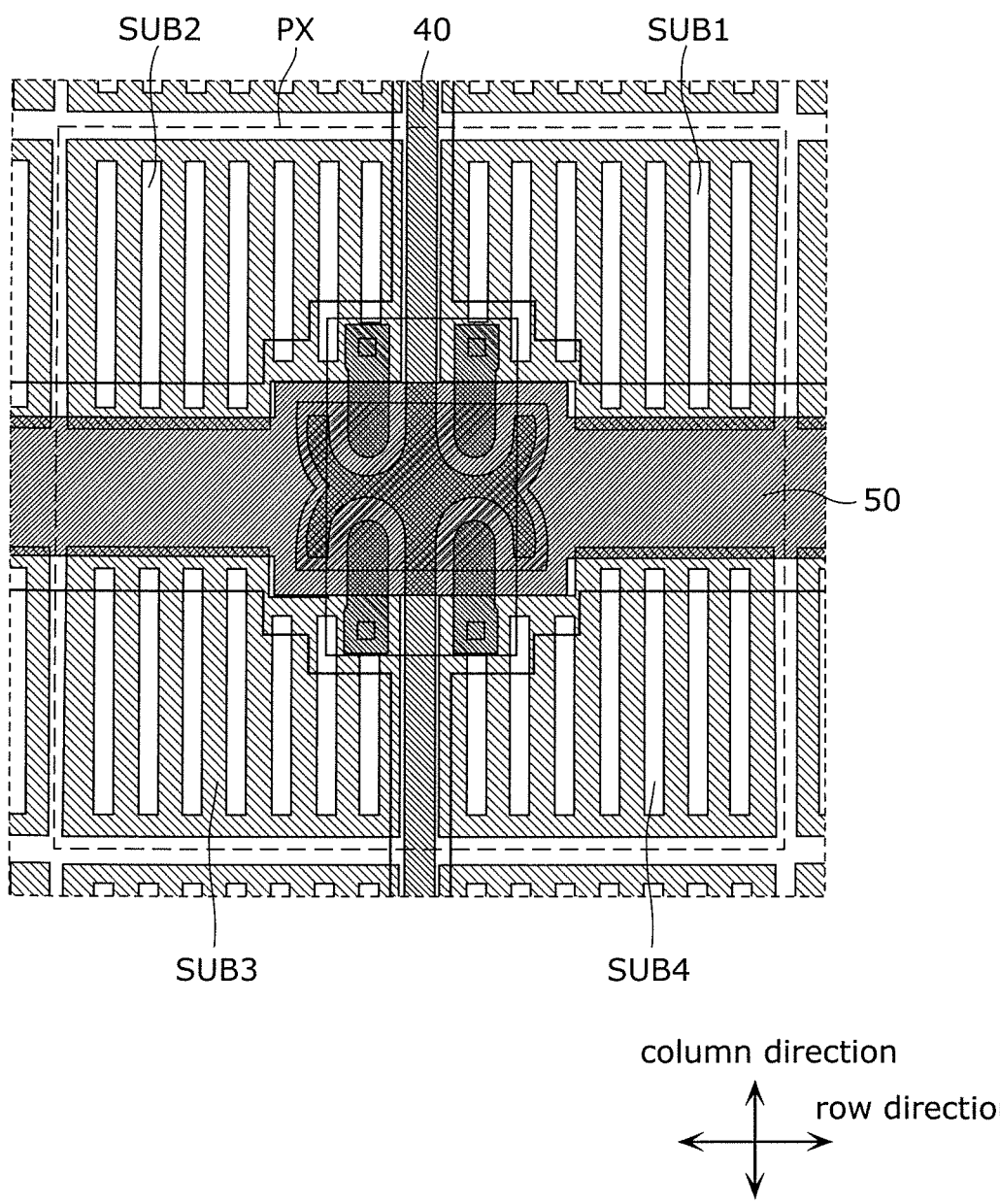
FIG. 31 is a plan view showing a layout of pixels of liquid crystal display panel according to a sixth modification.

Further, as shown in FIG. 31, a part of the source/drain electrodes of the transistors of the sub-pixels may be overlapped with each other. Specifically, in FIG. 31, the U-shaped source/drain electrodes of the four sub-pixels partially overlap each other. Note that not only the source/drain electrodes but also a part of the semiconductor layers of the sub-pixels may be overlapped. Note that the state in which the source/drain electrodes or the semiconductor layers of the transistors partially overlap with each other is not limited to the state in which they physically overlap each other. For example, such a state includes a state in which the source/drain electrodes or the semiconductor layers of the transistors are integrally formed. Specifically, when the semiconductor layers constituting the transistors of the four sub-pixels are formed in the same layer, only one semiconductor layer may be formed.

Figure 30:
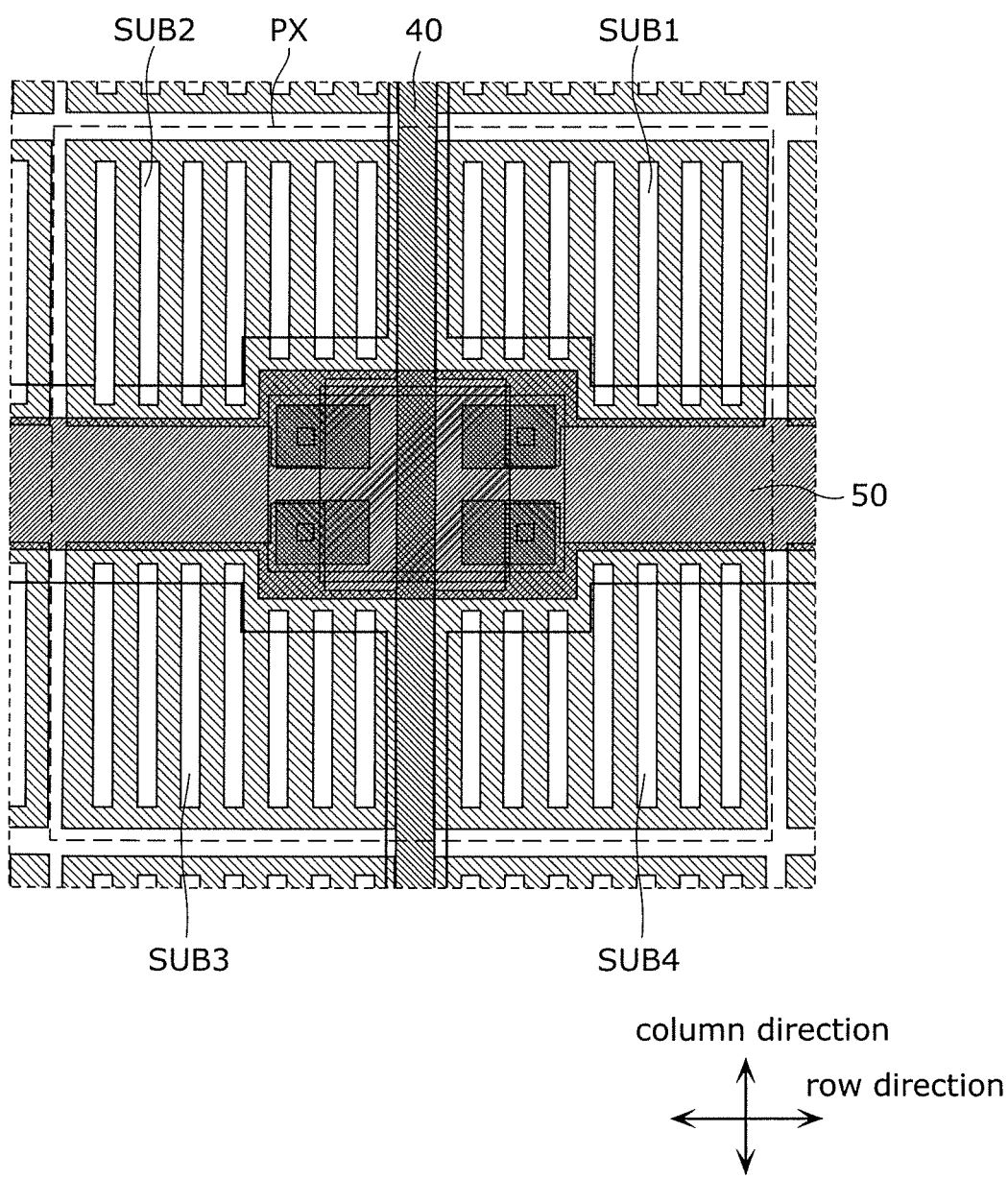
FIG. 30 is a plan view showing a layout of pixels of liquid crystal display panel according to a fourth modification.

A transverse electric field mode liquid crystal display panel employing a multi-domain mode is described in the fourth and fifth exemplary embodiments and FIGS. 27 to 29. However, a liquid crystal display panel not employing a multi-domain mode as shown in FIGS. 30 and 31 may be used. In the fourth and fifth exemplary embodiments and FIGS. 27 and 29, an intra-pixel multi-domain mode (one-pixel multi-domain mode) in which one pixel includes multi domains is employed. On the other hand, in FIG. 28, a pixel-basis multi-domain mode (two-pixel multi-domain mode) in which each of two pixels has one domain is used.

In the fourth and fifth exemplary embodiments, first pixel electrode 11 formed in first sub-pixel SUB1 and second pixel electrode 12 formed in second sub-pixel SUB2 are not directly connected. However, the present disclosure is not limited thereto. For example, as in the first exemplary embodiment, one or more bridge electrodes extending over video signal line 40 may be formed, and first pixel electrode 11 and second pixel electrode 12 may be connected by the bridge electrode. In this case, bridge electrode 13 that connects first pixel electrode 11 and second pixel electrode 12 and video signal line 40 intersect in three dimensions. The bridge electrode may be formed in the same layer as first pixel electrode 11 and second pixel electrode 12, or may be formed in a different layer from first pixel electrode 11 and second pixel electrode 12.

In the fourth and fifth exemplary embodiments, video signal line 40 and drain electrode 21D of first transistor 21 are connected, and first pixel electrode 11 and source electrode 21S of first transistor 21 are connected. However, the present disclosure is not limited thereto. For example, video signal line 40 and source electrode 21S of first transistor 21 may be connected, and first pixel electrode 11 and drain electrode 21D of first transistor 21 may be connected. Similarly, video signal line 40 and source electrode 22S of second transistor 22 may be connected, and second pixel electrode 12 and drain electrode 22D of second transistor 22 may be connected.

OTHER MODIFICATIONS

The present disclosure also includes a mode obtained by performing various modifications conceived of by a person skilled in the art on the above first to fifth exemplary embodiments and a mode achieved by combining any of constituent elements and functions in the first to fifth exemplary embodiments without departing from the spirit of the present disclosure.

What is claimed is:

1. A liquid crystal display panel having a plurality of pixels arrayed in a matrix, the liquid crystal display panel comprising:
a plurality of first signal lines extending in one of a row direction and a column direction;
a plurality of second signal lines extending in the other direction of the row direction or the column direction,
a first transistor and a second transistor provided in each of the plurality of pixels,
a first pixel electrode and a second pixel electrode provided in each of the plurality of pixels,
wherein, in one pixel,
the first pixel electrode and the second pixel electrode are separated across one first signal line corresponding to the one pixel,
the first pixel electrode and the second pixel electrode are provided in a transmissive region of the one pixel, the first transistor and the second transistor are separated across the one first signal line corresponding to the one pixel,
the first transistor is connected to the one first signal line corresponding to the one pixel,
the second transistor is connected to the one first signal line corresponding to the one pixel,
the first pixel electrode is connected to the one first signal line corresponding to the one pixel via the first transistor,
the second pixel electrode is connected to the one first signal line corresponding to the one pixel via the second transistor,
the first transistor is connected to one second signal line corresponding to the one pixel, and
the second transistor is connected to the one second signal line corresponding to the one pixel,
wherein further,
the plurality of pixels includes a first pixel and a second pixel,
the first pixel is adjacent to the second pixel in a direction along the second signal line,
the first transistor and the second transistor of the first pixel overlap with one of two adjacent second signal lines of the plurality of second signal lines corresponding to the first pixel in a planar view,
the first transistor and the second transistor of the second pixel overlap with another of the two adjacent second signal lines of the plurality of second signal lines corresponding to the second pixel in the planar view,
a first gate electrode of the first transistor and a second gate electrode of the second transistor of the first pixel connect to one of two adjacent second signal lines of the plurality of second signal lines corresponding to the first pixel, and
the first gate electrode of the first transistor and the second gate electrode of the second transistor of the second pixel connect to another of the two adjacent second signal lines of the plurality of second signal lines corresponding to the second pixel.

2. The liquid crystal display panel according to claim 1, wherein the first pixel electrode includes a plurality of first line electrodes extending in a stripe pattern in a first direction, and
the second pixel electrode includes a plurality of second line electrodes extending in a stripe pattern in a second direction different from the first direction.

3. The liquid crystal display panel according to claim 2, wherein, in the planar view, in each of the plurality of pixels, a tip of at least one of the plurality of first line electrodes and a tip of at least one of the plurality of second line electrodes overlap the one first signal line corresponding to the pixel.

4. The liquid crystal display panel according to claim 2, wherein
the first pixel electrode has a first bent portion formed by bending a part of a side of at least one of the plurality of first line electrodes in a direction inclined with respect to the first direction,
the second pixel electrode has a second bent portion formed by bending a part of a side of at least one of the plurality of second line electrodes in a direction inclined with respect to the second direction, and
in each of the plurality of pixels, at least one of the first bent portion and the second bent portion overlaps the first signal line corresponding to the pixel in a planar view.

5. The liquid crystal display panel according to claim 4, wherein
the plurality of first line electrodes includes a first finger electrode portion,
the plurality of second line electrodes include a second finger electrode portion,
the first bent portion is formed at a tip of the first finger electrode portion, and
the second bent portion is formed at a tip of the second finger electrode portion.

6. The liquid crystal display panel according to claim 1, wherein the second pixel electrode of the first pixel and the first pixel electrode of the second pixel are provided between two adjacent first signal lines of the plurality of first signal lines.

7. The liquid crystal display panel according to claim 6, wherein
the first pixel electrode includes a plurality of first line electrodes extending in a stripe pattern,
the second pixel electrode includes a plurality of second line electrodes extending in a stripe pattern, and
a second end electrode located closest to the plurality of first line electrodes in the second pixel from among the plurality of second line electrodes in the first pixel is adjacent to a first end electrode located closest to the plurality of second line electrodes in the first pixel from among the plurality of first line electrodes in the second pixel.

8. The liquid crystal display panel according to claim 7, wherein a distance between the first end electrode and the second end electrode is greater than a pitch of the plurality of first line electrodes and a pitch of the plurality of second line electrodes.

9. The liquid crystal display panel according to claim 7, wherein a distance between the first end electrode and the second end electrode is equal to a pitch of the plurality of first line electrodes and a pitch of the plurality of second line electrodes.

10. The liquid crystal display panel according to claim 6, wherein
the first pixel electrode includes a plurality of first line electrodes extending in a stripe pattern in a first direction,
the second pixel electrode includes a plurality of second line electrodes extending in a stripe pattern in a second direction different from the first direction, and
the second direction that is an extending direction of the plurality of second line electrodes in the one pixel is equal to the first direction that is an extending direction of the plurality of first line electrodes in the other pixel.

11. The liquid crystal display panel according to claim 1, wherein
each of the plurality of first signal lines is a video signal line connected to a source electrode and/or a drain electrode of the first transistor and the second transistor, and
each of the plurality of second signal lines is a scanning line connected to a gate electrode of the first transistor and the second transistor.

12. A liquid crystal display panel having a plurality of pixels arrayed in a matrix, the liquid crystal display panel comprising:
a plurality of video signal lines extending in one of a row direction and a column direction;
a plurality of scanning lines extending in another direction of the row direction or the column direction, a first transistor and a second transistor provided in each of the plurality of pixels,
a first pixel electrode and a second pixel electrode provided in each of the plurality of pixels,
wherein, in one pixel,
   the first pixel electrode and the second pixel electrode are separated across one video signal line corresponding to the one pixel,
   the first transistor having a first gate electrode and the second transistor having a second gate electrode are separated across the one video signal line corresponding to the one pixel,
   the first transistor is connected to the one video signal line corresponding to the one pixel,
   the second transistor is connected to the one video signal line corresponding to the one pixel
   the first pixel electrode is connected to the one video signal line corresponding to the one pixel via the first transistor,
   the second pixel electrode is connected to the one video signal line corresponding to the one pixel via the second transistor,
   the first transistor is connected to one scanning line corresponding to the one pixel, and
   the second transistor is connected to the one scanning line corresponding to the one pixel,
wherein further
   the plurality of pixels include a first pixel and a second pixel,
   the first pixel is adjacent to the second pixel in a direction along the scanning line,
   the first gate electrode of the first transistor and the second gate electrode of the second transistor of the first pixel connects to one of two adjacent scanning lines of the plurality of scanning lines corresponding to the first pixel, and
   the first gate electrode of the first transistor and the second gate electrode of the second transistor of the second pixel connect to another of the two adjacent scanning lines of the plurality of scanning lines corresponding to the second pixel.

13. The liquid crystal display panel according to claim 12, wherein the first pixel electrode and the second pixel electrode are provided in a transmissive region of the one pixel.

* * * * *